(12) United States Patent
Kobashi et al.

(10) Patent No.: US 7,735,004 B2
(45) Date of Patent: Jun. 8, 2010

(54) LAYOUT CONTROL METHOD, LAYOUT CONTROL APPARATUS, AND LAYOUT CONTROL PROGRAM

(75) Inventors: Kazufumi Kobashi, Yokohama (JP); Kanta Hara, Kawasaki (JP); Jun Makino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 141 days.

(21) Appl. No.: 11/043,146

(22) Filed: Jan. 27, 2005

(65) Prior Publication Data

US 2005/0172226 A1 Aug. 4, 2005

(30) Foreign Application Priority Data

Jan. 30, 2004 (JP) ............................. 2004-024589
Dec. 22, 2004 (JP) ............................. 2004-371886

(51) Int. Cl.
*G06F 17/00* (2006.01)
(52) U.S. Cl. ................... 715/243; 715/201; 715/205; 715/244; 715/255
(58) Field of Classification Search ............... 715/517, 715/518, 530, 500.1, 501.1, 201, 205, 243, 715/244, 255; 345/676, 677, 678, 661, 662, 345/619; 358/1.2
See application file for complete search history.

(56) References Cited

U.S. PATENT DOCUMENTS

| | | | | |
|---|---|---|---|---|
| 5,214,755 A | | 5/1993 | Mason | |
| 5,214,756 A | * | 5/1993 | Franklin et al. | 715/839 |
| 5,437,008 A | * | 7/1995 | Gay et al. | 715/502 |
| 5,577,189 A | * | 11/1996 | Gay et al. | 715/800 |
| 5,745,122 A | * | 4/1998 | Gay et al. | 345/619 |
| 5,745,755 A | * | 4/1998 | Covey | 707/203 |
| 5,796,401 A | * | 8/1998 | Winer | 345/619 |

(Continued)

FOREIGN PATENT DOCUMENTS

JP 8-255160 10/1996

(Continued)

OTHER PUBLICATIONS

Purvis, Lisa et al. "Creating Personalized Documents : An Optimization Approach", DocEng '03, Nov. 20-22, 2003, pp. 68-77.*

(Continued)

*Primary Examiner*—Rachna S Desai
(74) *Attorney, Agent, or Firm*—Fitzpatrick, Cella, Harper & Scinto

(57) ABSTRACT

To implement an efficient user operation by making it possible to set links between a plurality of containers at once by one operation, in a layout control method which sets a link between partial display regions to connect them to each other, the partial display regions receiving assigned data and laying out the data on a page, and adjusts the position of each partial display region on the basis of the data assigned to it, a plurality of links are set for a plurality of partial display regions, the plurality of partial display regions are designated, the position information of each designated partial display region is acquired, and in a case where setting of a plurality of links is instructed, a plurality of links are set for the plurality of designated partial display regions, on the basis of the acquired position information.

12 Claims, 85 Drawing Sheets

U.S. PATENT DOCUMENTS

| | | | | |
|---|---|---|---|---|
| 5,845,303 | A * | 12/1998 | Templeman | 715/517 |
| 5,900,002 | A * | 5/1999 | Bottomly | 715/209 |
| 5,953,733 | A | 9/1999 | Langford-Wilson | |
| 6,177,935 | B1 | 1/2001 | Munn | |
| 6,596,032 | B2 * | 7/2003 | Nojima et al. | 715/247 |
| 6,717,587 | B2 * | 4/2004 | Felser et al. | 345/630 |
| 6,826,727 | B1 * | 11/2004 | Mohr et al. | 715/235 |
| 6,931,591 | B1 * | 8/2005 | Brown et al. | 715/205 |
| 7,028,255 | B1 * | 4/2006 | Ayers | 715/202 |
| 7,051,276 | B1 * | 5/2006 | Mogilevsky et al. | 715/209 |
| 7,093,196 | B1 * | 8/2006 | Griffiths et al. | 715/518 |
| 7,194,680 | B1 * | 3/2007 | Roy et al. | 715/205 |
| 7,200,810 | B2 * | 4/2007 | Nitta et al. | 715/238 |
| 7,216,298 | B1 * | 5/2007 | Ballard et al. | 715/760 |
| 7,233,341 | B1 * | 6/2007 | Sauerbrei | 345/672 |
| 7,243,303 | B2 * | 7/2007 | Purvis et al. | 715/253 |
| 7,278,098 | B1 * | 10/2007 | Boye et al. | 715/210 |
| 7,395,510 | B2 * | 7/2008 | Diwan et al. | 715/801 |
| 7,415,452 | B1 * | 8/2008 | Ayers | 707/2 |
| 7,454,699 | B2 * | 11/2008 | Altman et al. | 715/255 |
| 7,487,444 | B2 * | 2/2009 | Lira | 715/247 |
| 7,487,445 | B2 * | 2/2009 | Purvis et al. | 715/249 |
| 2004/0205472 | A1 * | 10/2004 | Purvis | 715/500 |
| 2005/0055635 | A1 * | 3/2005 | Bargeron et al. | 715/525 |
| 2008/0130048 | A1 * | 6/2008 | Tsai | 358/1.15 |

FOREIGN PATENT DOCUMENTS

| | | |
|---|---|---|
| JP | 11-316792 | 11/1999 |
| JP | 2000-207396 | 7/2000 |
| JP | 2003-333308 | 11/2003 |
| KR | 1998-74545 | 11/1998 |
| KR | 2002-50295 | 6/2002 |

OTHER PUBLICATIONS

Simon Lok., et al. "A Survey of Automated Layout Techniques for Information Presentations", SmartGraphics, 2001.

* cited by examiner

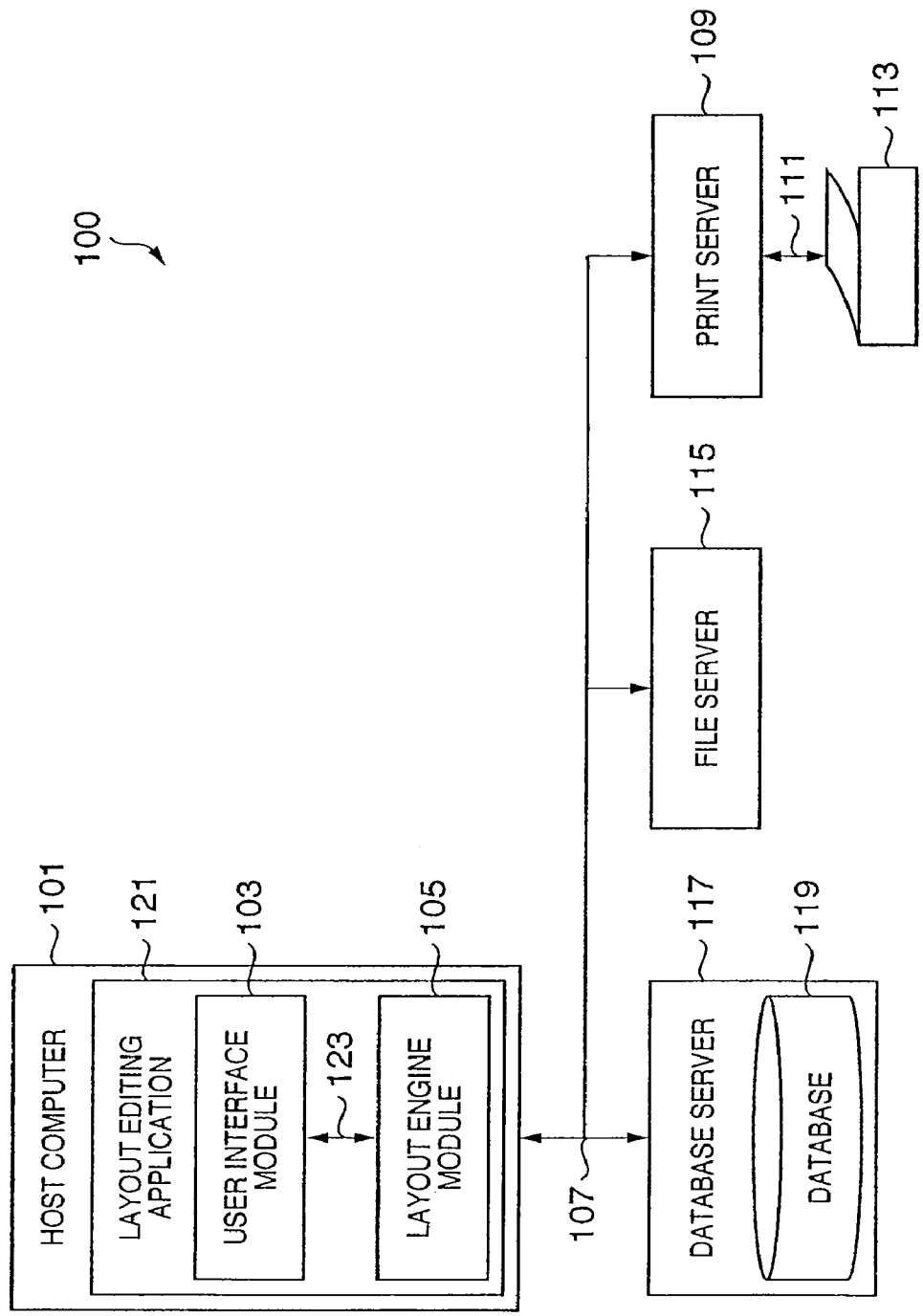

F I G. 5A
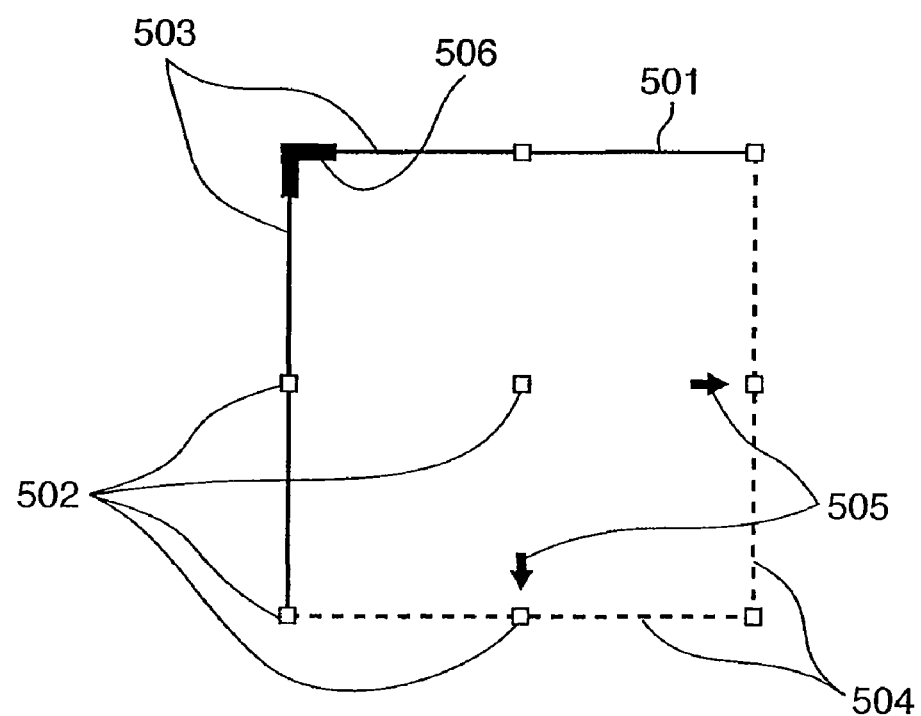

F I G. 5C
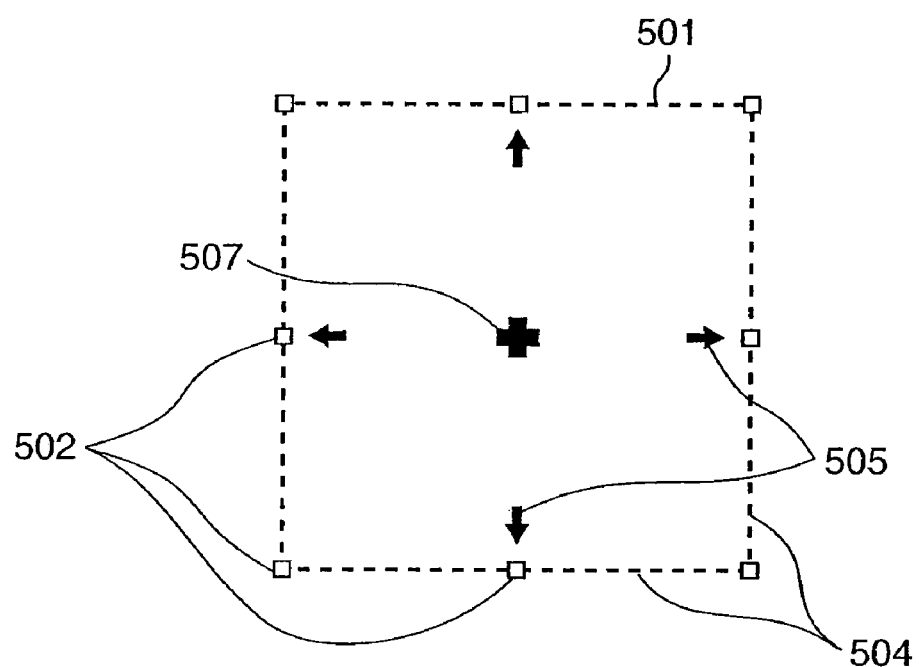

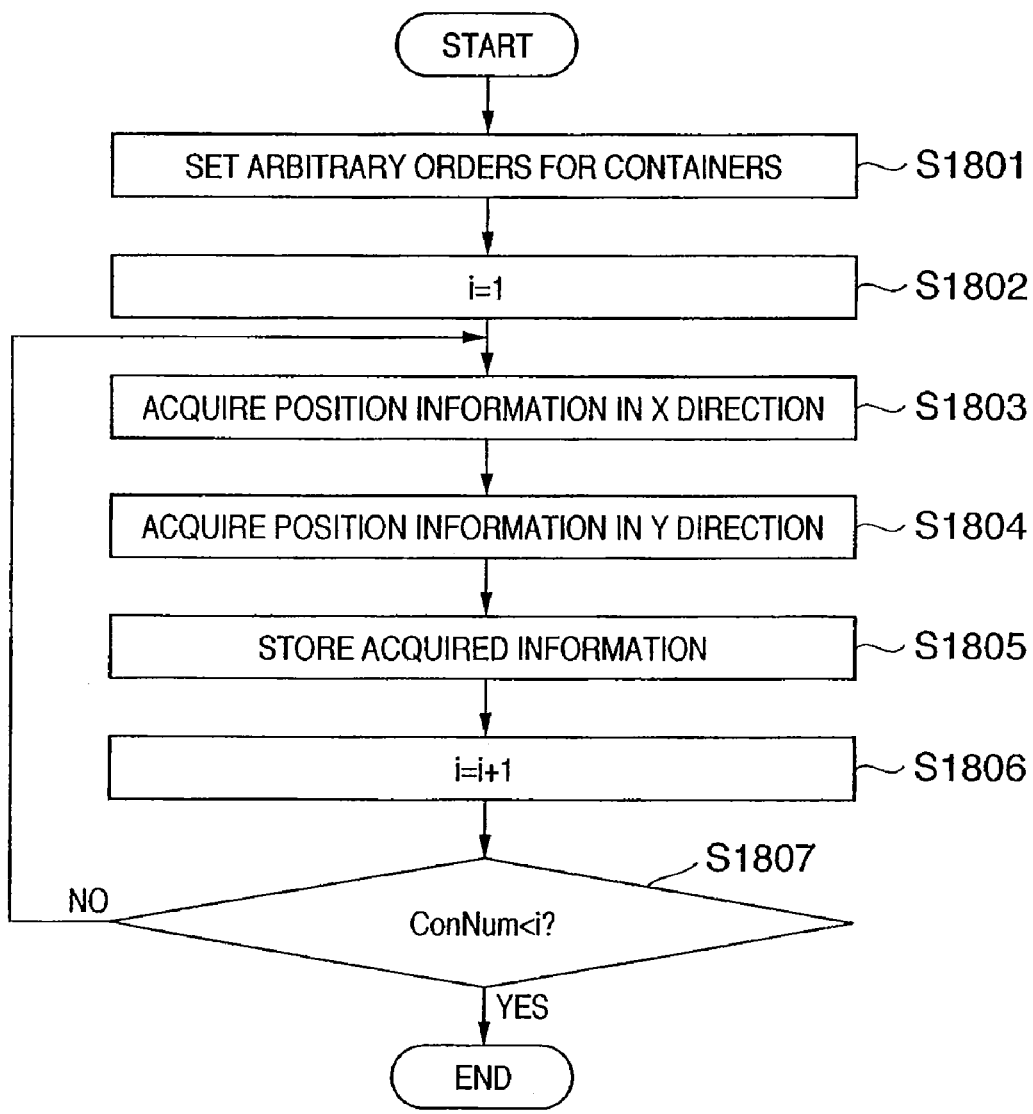

F I G. 27
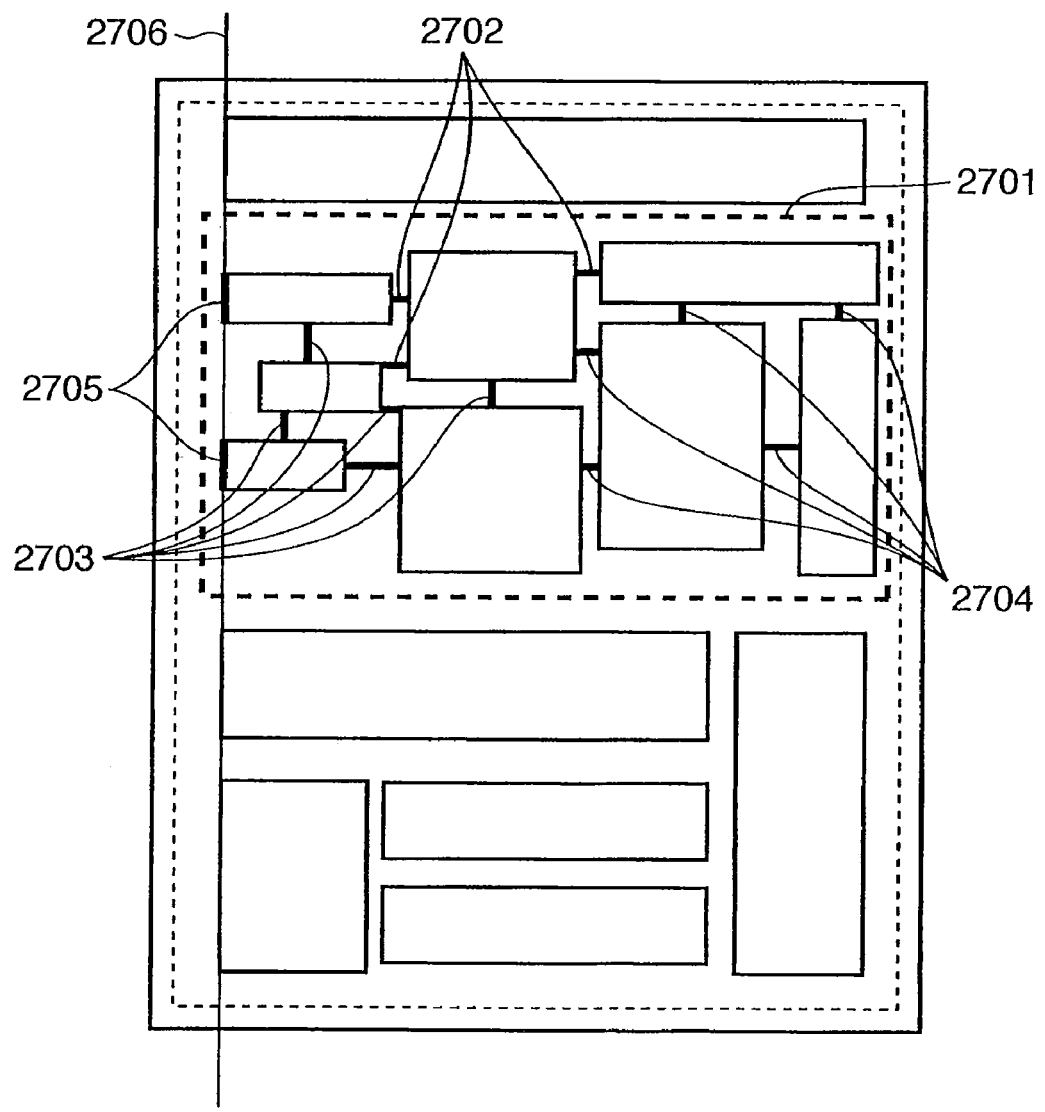

F I G. 31
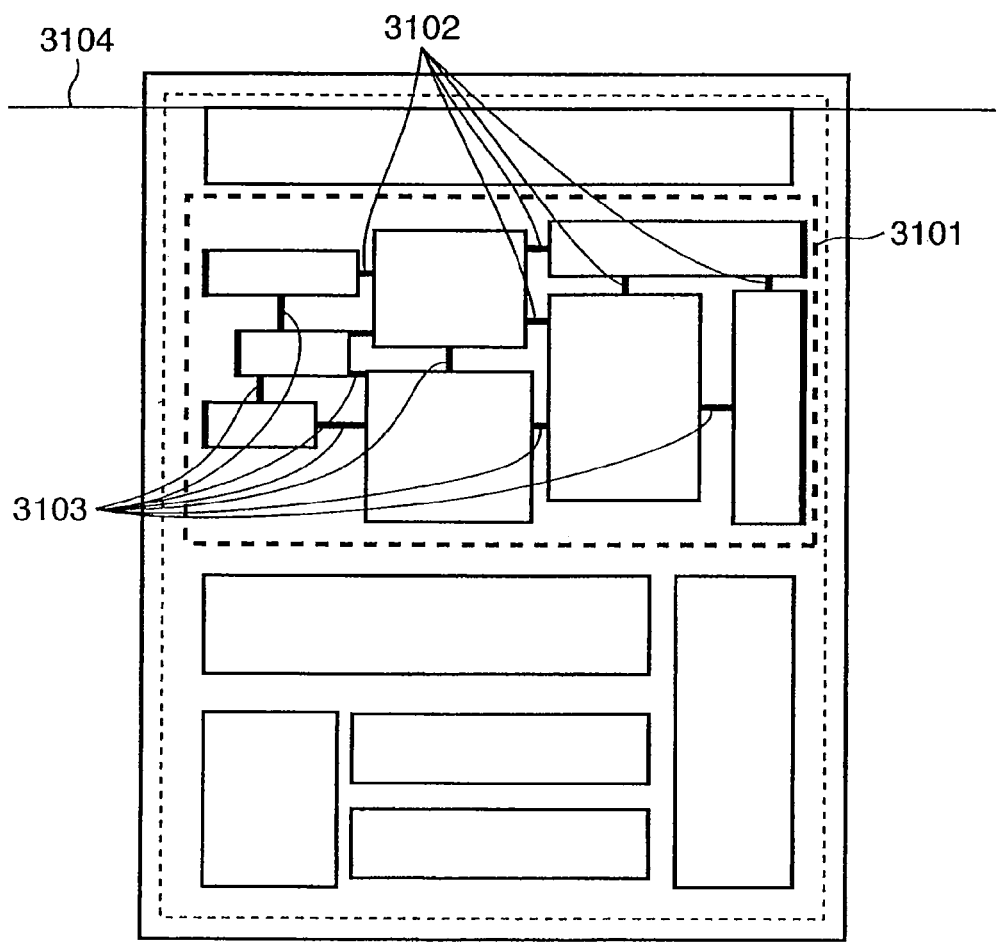

F I G. 36
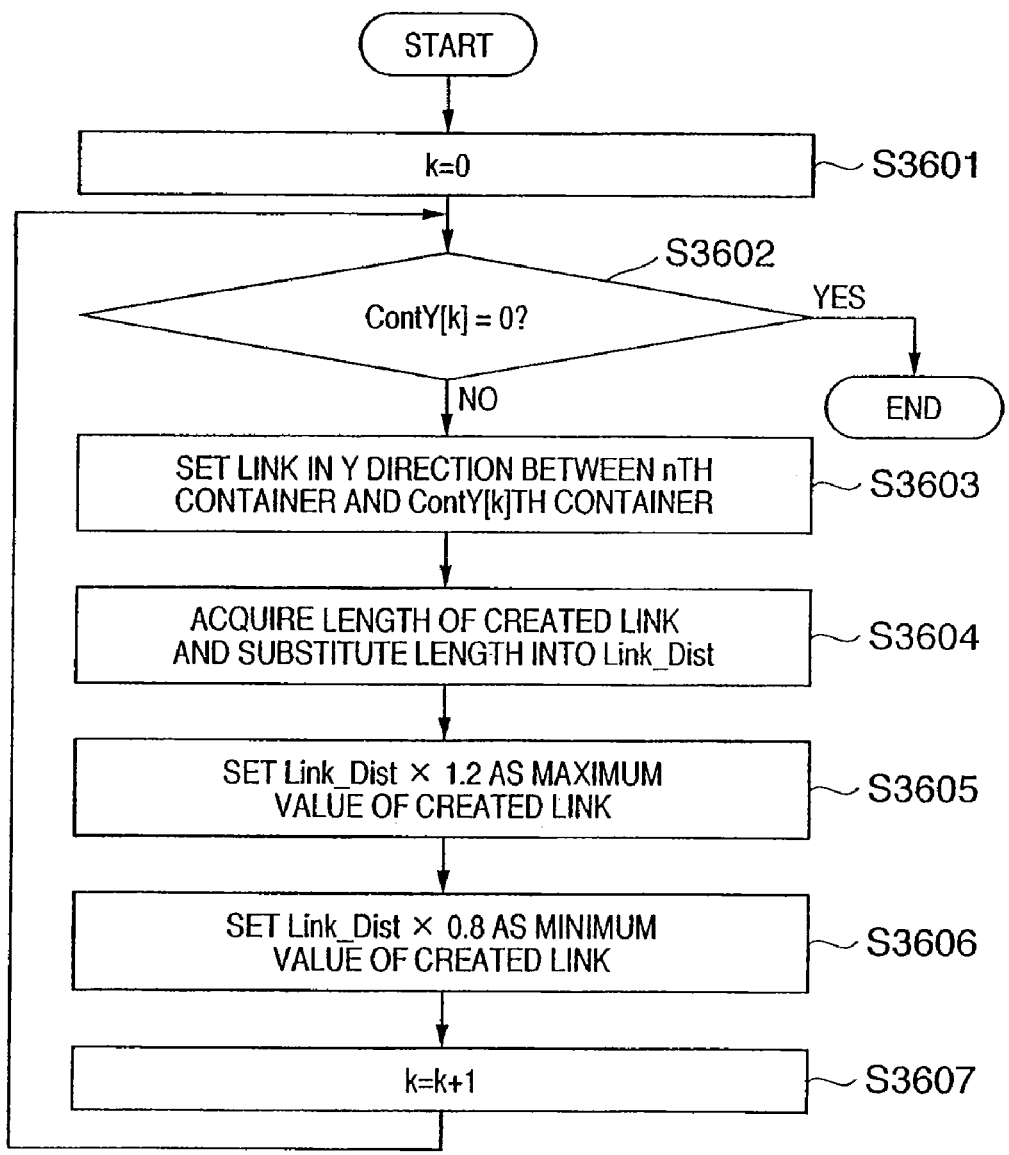

F I G. 52
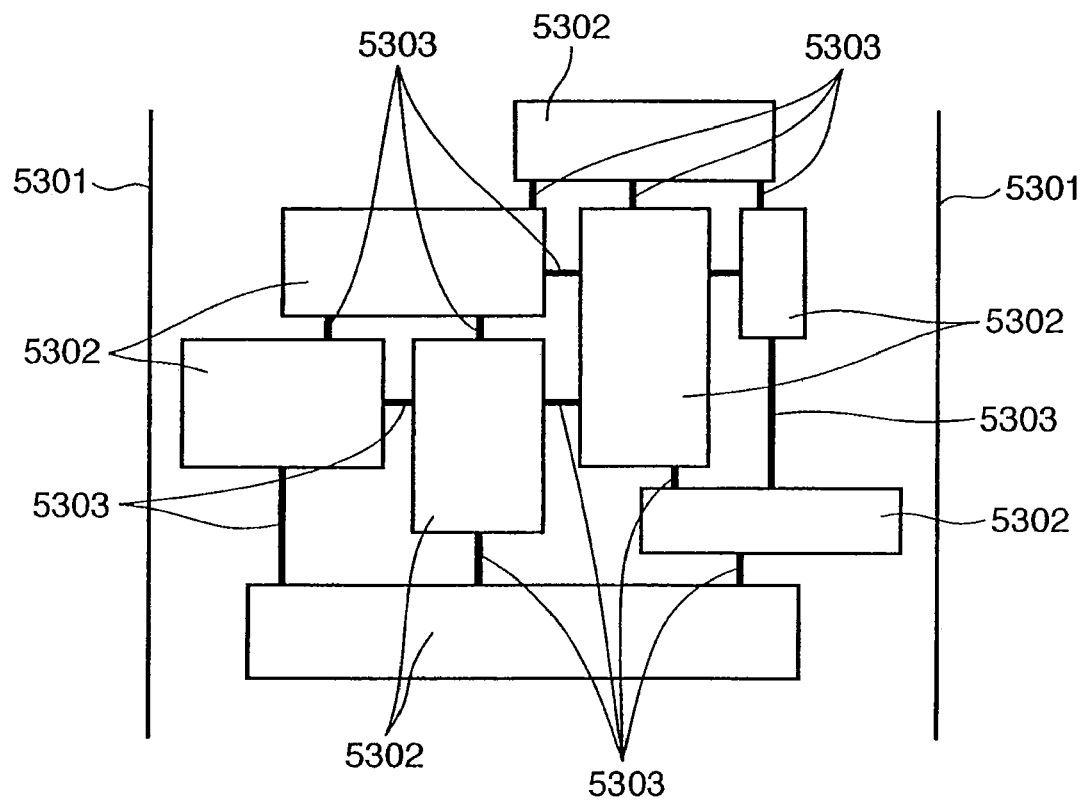

F I G. 54B
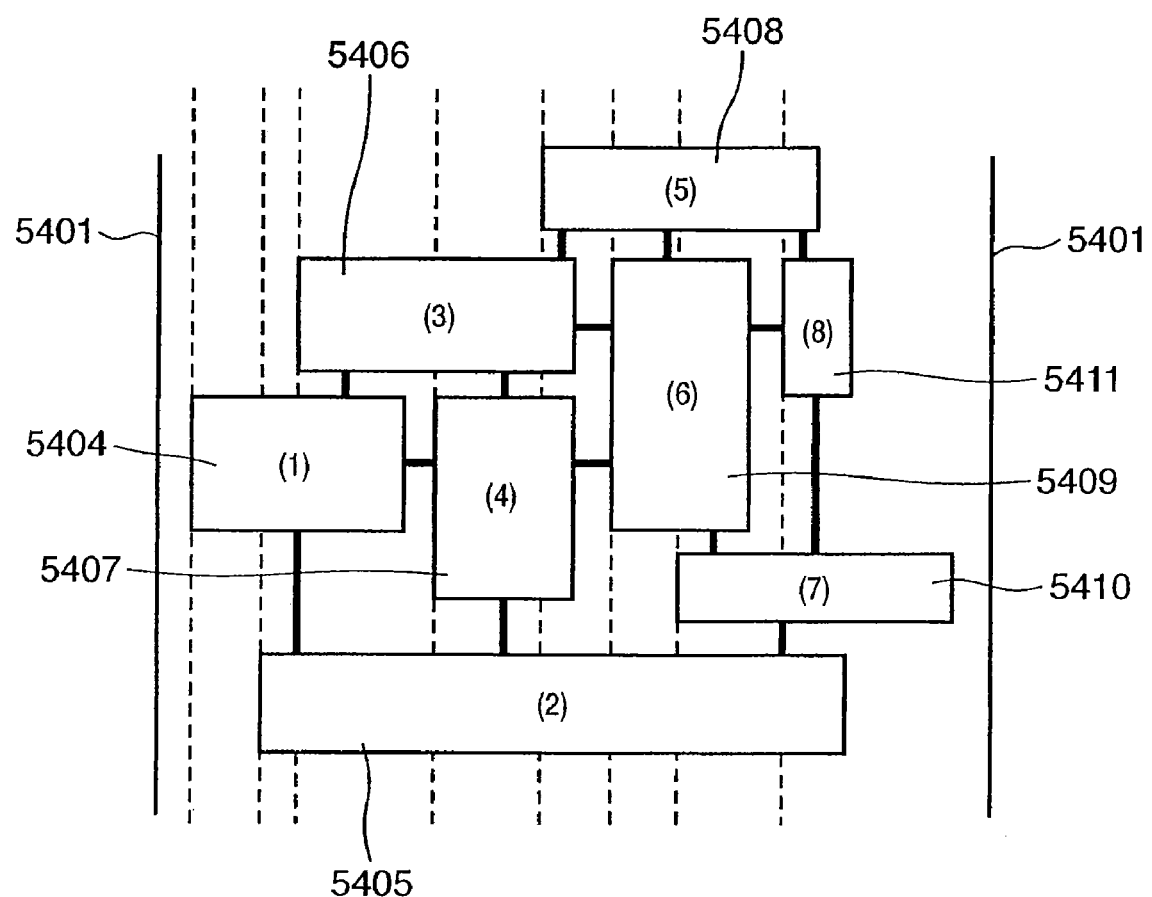

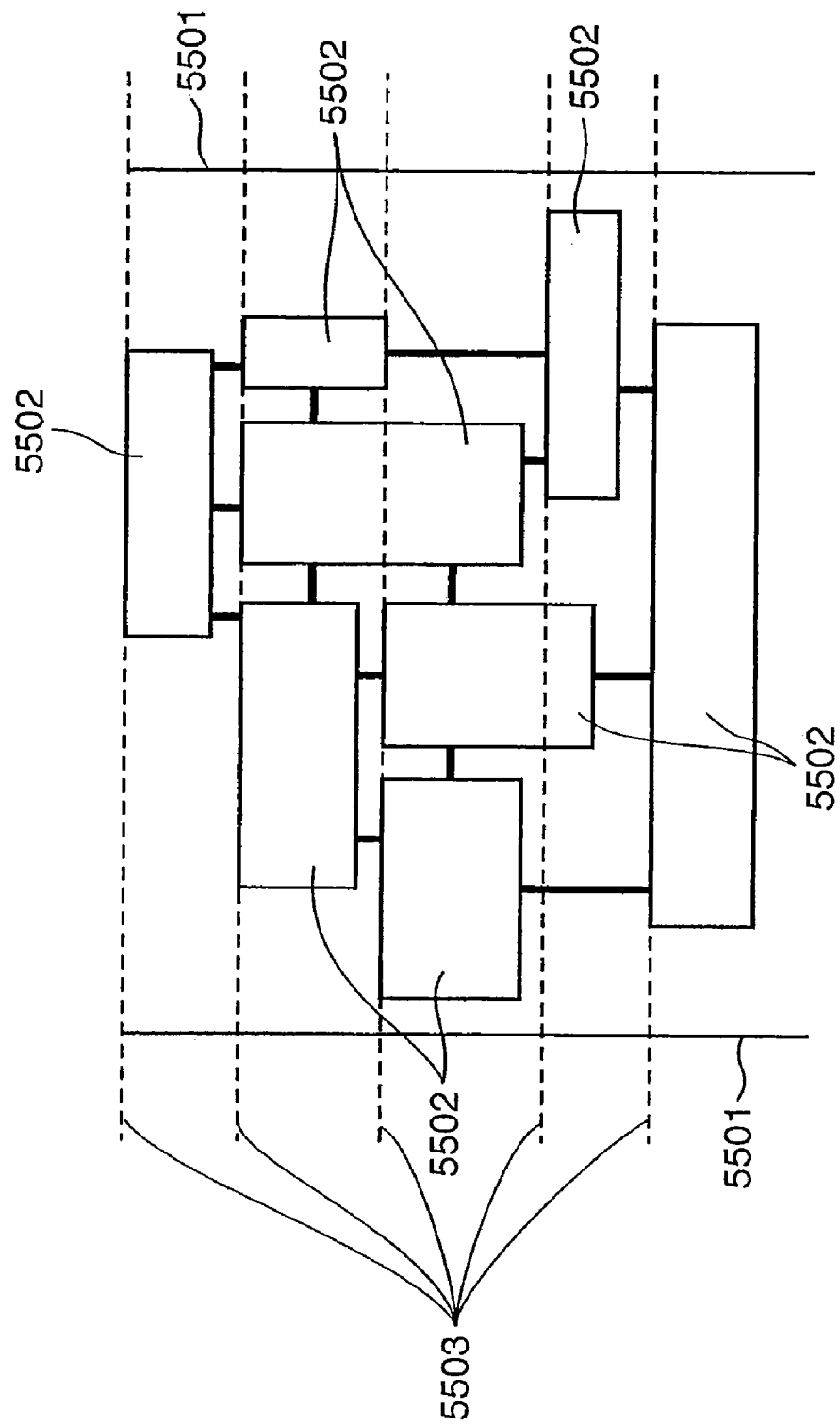

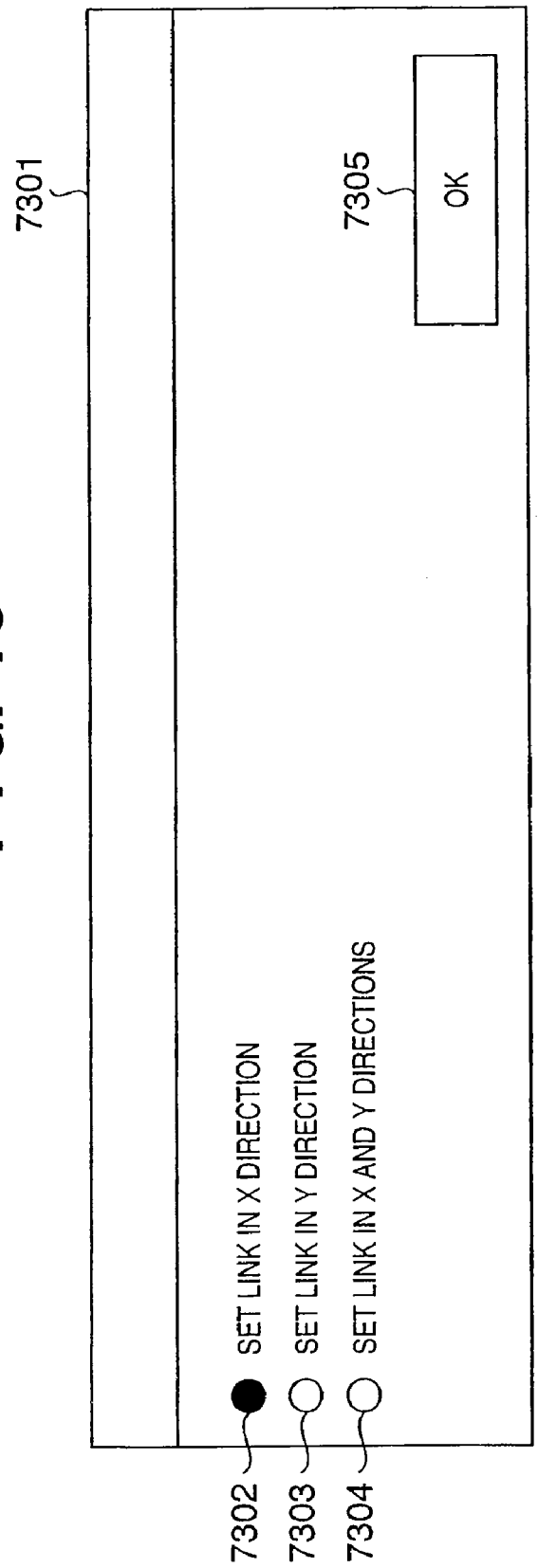

LAYOUT CONTROL METHOD, LAYOUT CONTROL APPARATUS, AND LAYOUT CONTROL PROGRAM

FIELD OF THE INVENTION

The present invention relates to a layout control technique of generating, editing, and printing a document containing texts and images and, more particularly, to generation, editing, and printing of a variable data document.

BACKGROUND OF THE INVENTION

Since the merchandise service life decreases recently due to a variety of merchandise items, and customization service orientation of consumers who use the Internet strengthens, the necessity of CRM (Customer Relationship Management) and one-to-one marketing has received a great deal of attention. These methods aim at increasing the customer satisfaction and winning and networking new customers.

The one-to-one marketing is a kind of database marketing. Personal attribute information such as the age, sex, hobby, taste, and purchase log of each customer is stored as a database. The contents of the information are analyzed, and a proposal that meets customer's needs is presented. A typical method is variable print. Along with the recent progress in DTP (DeskTop Publishing) technology and the spread of digital printers, variable print systems have been developed, which customize and output a document for each customer. Such a system is required to optimally lay out and display contents in information quantity that changes for each customer.

In a conventional variable print system, containers (also called field regions in a document form) are laid out on a document as regions where pieces of information are displayed. A database and the containers are associated with each other to achieve layout display.

However, each container serving as a partial display region in which a text or image is to be pasted has a fixed size. For this reason, in a case where data in the database is inserted in the container, and the data size is larger than the container size, text overlap or image clipping occurs. If the data size is smaller than the container size, a space is formed in the container. In either case, optimum layout display corresponding to the information amount of a text or image to be displayed cannot be implemented.

To solve this problem, automatic layout systems which change the container size in accordance with the information amount have been proposed. An automatic layout system can flexibly set the container size of a text or image. Some automatic layout systems can set a flexible container size and increase the container size in accordance with the amount of data to be inserted. In another technique, if text data larger than a fixed container size is inserted, the font size of the text is reduced to display the entire text in the container.

However, in a case where the size of a container is increased, it overlaps another container in the document. In a case where the font size is adjusted in text data with a large amount, the font size becomes too small. Another automatic layout technique to solve these problems is disclosed in the "layout design apparatus" of Japanese Patent Laid-Open No. 11-316792. In this technique, in a case where the size of a container is increased, the size of another container adjacent to it is reduced.

However, in the above-described automatic layout system, only the alignment technique is taken into consideration, in which the number of lines of a flexible table as an example of a container is increased in accordance with the data to be pasted in the container, and the remaining containers move accordingly. That is, the technique is used to create the layout design of a document in which a case where the number of lines of the flexible table increases, the remaining containers move accordingly, and page ejection occurs. However, the above-described one-to-one marketing requires to lay out containers in number desired by a user in a page of a predetermined paper size. That is, the conventional technique using the simple flexible tables cannot meet this requirement. There is a demand for an automatic layout system which dynamically lays out a necessary number of containers in a page of a predetermined paper size while inserting data in containers and changing the container sizes. In such an automatic layout system, since all containers have flexible sizes, the layout must dynamically be changed while changing the container sizes relative to each other. To dynamically change the layout, associations (to be referred to as links hereinafter) must be set between the containers. Since a link must be set for each pair of containers, the operation load of the user is large. That is, to lay out a plurality of containers and set to dynamically lay out them, links must be set between the containers. In a case where the number of containers increases, the number of links also increases. The operation load of the user who sets the links increases in proportion to the number of containers.

SUMMARY OF THE INVENTION

The present invention has been proposed to solve the conventional problems, and has as its object to implement an efficient operation by making it possible to set links between a plurality of containers at once by one operation.

The above-described object of the present invention is achieved by a layout control method which sets a link between partial display regions to connect the partial display regions to each other, the partial display regions receiving assigned data and laying out the data on a page, and adjusts a position of each partial display region on the basis of the data assigned to the partial display region, comprising: an instruction step of setting a plurality of links for the plurality of partial display regions; a designation step of designating the plurality of partial display regions; a position information acquisition step of acquiring position information of each of the designated partial display regions; and a setting step of, in a case where setting of a plurality of links is instructed in the instruction step, setting the plurality of links for the plurality of partial display regions designated in the designation step, on the basis of the acquired position information.

The above-described object of the present invention is also achieved by a layout control apparatus which sets a link between partial display regions to connect the partial display regions to each other, the partial display regions receiving assigned data and laying out the data on a page, and adjusts a position of each partial display region on the basis of the data assigned to the partial display region, comprising: instruction means for setting a plurality of links for the plurality of partial display regions; designation means for designating the plurality of partial display regions; position information acquisition means for acquiring position information of each of the designated partial display regions; and setting means for, in a case where setting of a plurality of links is instructed by the instruction means, setting the plurality of links for the plurality of partial display regions designated by the designation means, on the basis of the acquired position information.

The above-described object of the present invention is also achieved by a layout control program which causes a computer to execute layout control to set a link between partial display regions to connect the partial display regions to each other, the partial display regions receiving assigned data and laying out the data on a page, and adjust a position of each partial display region on the basis of the data assigned to the partial display region, the program comprising: an instruction module which sets a plurality of links for the plurality of partial display regions; a designation module which designates the plurality of partial display regions; a position information acquisition module which acquires position information of each of the designated partial display regions; and a setting module which, in a case where setting of a plurality of links is instructed by the instruction module, sets the plurality of links for the plurality of partial display regions designated by the designation module, on the basis of the acquired position information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1A is a block diagram showing an arrangement of a computer system according to an embodiment of the present invention;

FIG. 5A is a view for explaining rules for the sides of a container by example;

FIG. 5C is a view for explaining rules for the sides of a container by example;

FIG. 18 is a flowchart for explaining the flow of processing for acquiring the position information of a container;

FIG. 27 is a view showing the locked state of the left sides of containers;

FIG. 31 is a view showing the locked state of the upper sides of containers;

FIG. 36 is a flowchart for explaining the flow of processing for setting a flexible link having maximum and minimum values;

FIG. 52 is a view showing links created by batch link setting and their containers;

FIG. 54B is a view showing containers and links after priority orders are set by giving priority to the X direction;

FIG. 55A is a view showing containers and links before priority orders are set by giving priority to the Y direction;

FIG. 73 is a view showing a UI to select a link generation direction in the automatic link setting processing.

DETAILED DESCRIPTION OF THE PREFERRED EMBODIMENTS

Preferred embodiments of the present invention will now be described in detail in accordance with the accompanying drawings.

(System Arrangement)

Figure 1B:
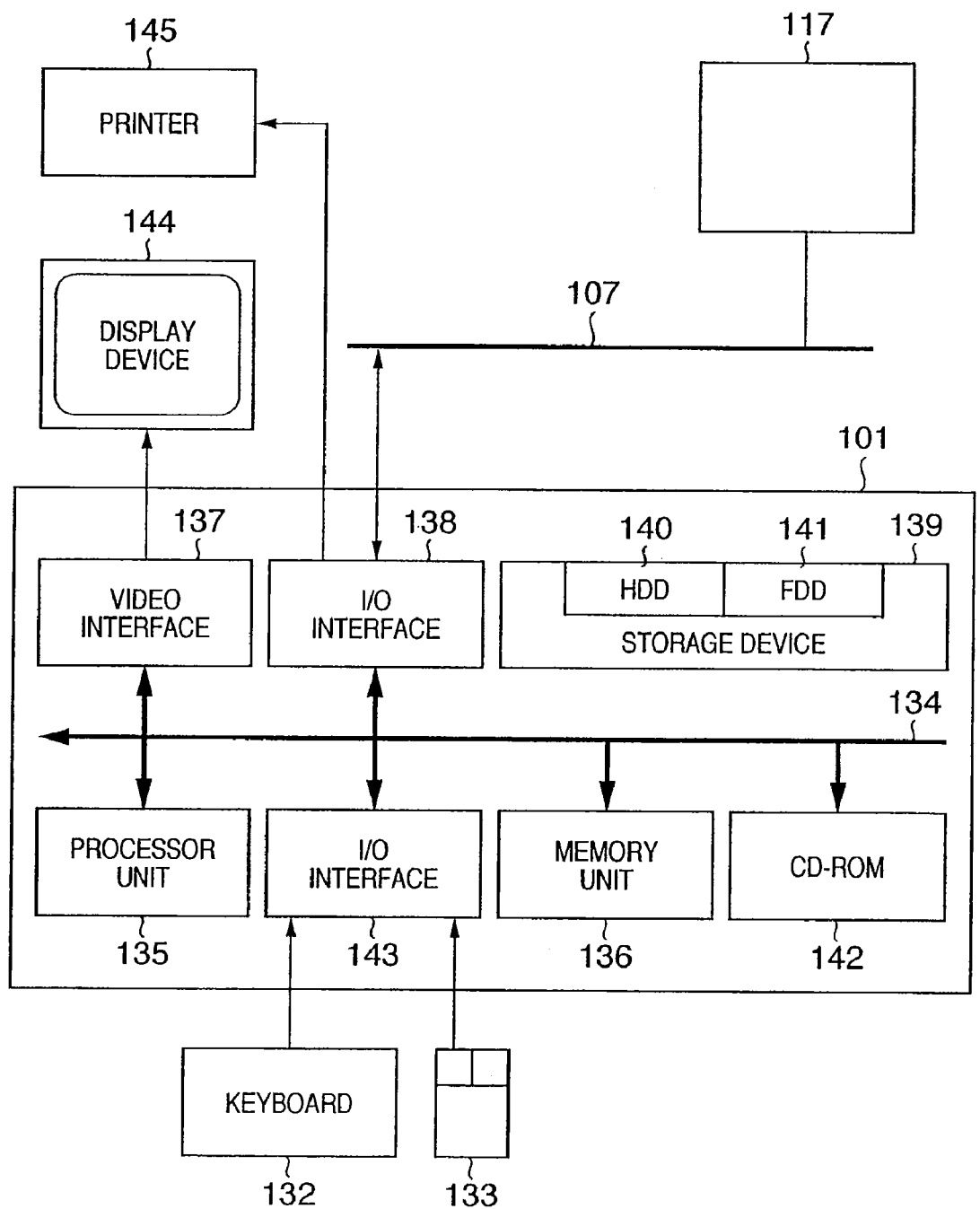
FIG. 1B is a block diagram for explaining the detailed arrangement of a host computer.
Figure 6:
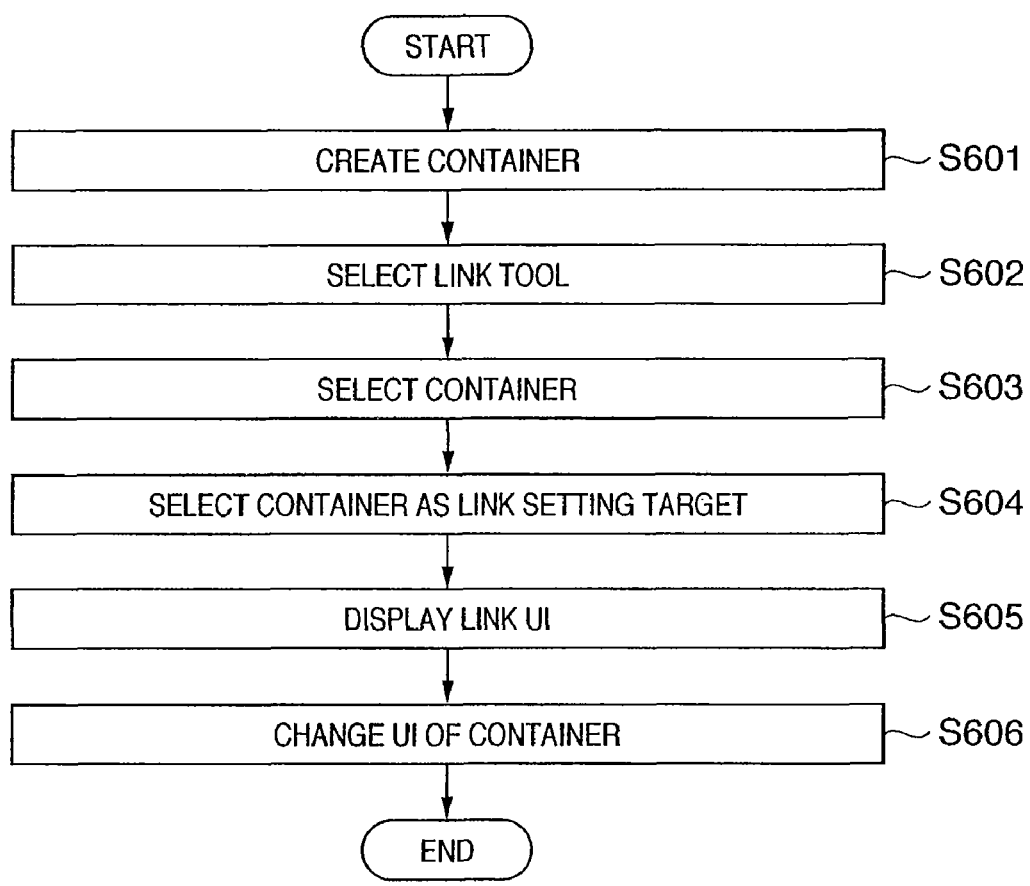
FIG. 6 is a flowchart showing a link setting method.

FIG. 1A shows a system 100 which prints a document by flexibly setting container sizes. Container size control and link setting between containers in this system are executed under the control of a host computer 101 to be described in detail with reference to FIG. 1B. The process to be described with reference to FIG. 6 is executed in the entire or part of software like a layout editing application program 121 (layout control program of the present invention) which is executed in the host computer 101 serving as a layout control device and becomes executable on the system 100. Especially, the step of layout editing or printing is executed by software by the host computer 101.

The software is stored in a computer-readable medium including, e.g., a storage device to be described below. The software is loaded from the computer-readable medium to the host computer and executed. The software, a computer program recorded on a medium, or a computer-readable medium which stores the program specifies the function of a computer as a means for executing arithmetic processing or display control necessary for layout editing of a document or variable data printing in cooperation with the computer, layout control, and information processing related to contents.

The host computer 101 is connected to an input device such as a keyboard 132 or a pointing device like a mouse 133 and an output device including a display device 144 and a local printer 145 depending on the situation. An input/output (I/O) interface 138 connects the host computer 101 to a network 107 so that the system 100 can be connected to another computer apparatus (e.g., database server 117). Typical examples of the network 107 are a local area network (LAN) and wide area network (WAN).

The host computer 101 includes at least one processor unit 135 and a memory unit 136 including, e.g., a semiconductor random access memory (RAM) or read-only memory (ROM), an input/output (I/O) interface including a video interface 137, and an I/O interface 143 for the keyboard 132 and mouse 133. A storage device 139 includes a hard disk drive 140 and floppy disk drive 141. Although not illustrated in FIG. 1B, a magnetic tape drive can also be used as the storage device.

A CD-ROM drive 142 is provided as a nonvolatile data source. Typically, the host computer 101 can use the processor unit 135 to an input/output interface 143 through an interconnection bus 134 by an operation system such as GNU/LINUX or Microsoft Windows or typically by the operation of a computer system formed in accordance with an operating system. Examples of a system including the host computer 101 shown in FIG. 1A are an IBM-compatible PC or Sparcstation available from SUN, or a computer system including them.

The layout application program 121 is typically resident in the hard disk drive 140 and loaded and executed by the processor unit 135. For data fetched from the storage device 139 which stores the program 121 and the network 107, the hard disk drive 140 or the memory unit 136 is used accordingly. The application program 121 is encoded on a CD-ROM or floppy disk, loaded through the corresponding CD-ROM drive 142 or FDD 141, and provided to the user.

The application program 121 may be installed by the user from the network 107. The software can also be loaded in the host computer 101 from another computer-readable medium having an appropriate size, including a magnetic tape, ROM, integrated circuit, magnetooptical disk, wireless communication or infrared communication between the host computer 101 and another device, a computer-readable card such as a PCMCIA card, email communication, or the Internet or an intranet having recorded information on a WEB site. However, these computer-readable media are simply standards of related computer-readable media. The medium type is not limited to these examples, and any other computer-readable medium can also be used.

The application 121 named layout editing is a program module to execute variable data print (VDP) and includes two software components. One of them is a layout engine module 105. The layout engine module 105 is a software module which loads each record of variable data stored in a database 119 in accordance with the constraints of the sizes and positions of containers (rectangular ranges) as partial display regions in which data are to be inserted and calculates, on the basis of the loaded data and the constraints of the containers, the size and position of each container in which the loaded data should be inserted. In a case where the layout engine 105 operates as an application to determine the size and position of each partial display region (container) and outputs drawing information to a printer driver (not shown), the printer driver executes image drawing processing of a variable data document and generates print data.

A user interface module 103 as the second module provides a mechanism which causes a user to create a document template and associates a data source with a container in the document template. The user interface module 103 and layout engine module 105 can communicate with each other through a communication channel 123. The data source 190 for document creation is stored in the database 119 on the database server 117 formed by another computer which is making the database application run. The host computer 101 can communicate with the database server 117 through the connection to the network 107. To execute variable data printing, the layout editing application 121 generates a document template to be stored in the host computer 101 or a file server 115 formed by another computer. The layout editing application 121 also generates a document containing a document template merged with data. The document is stored in the storage device 139 of the host computer 101 or in the file server 115, or directly printed by a printer 113.

A print server 109 is a computer to provide a network function to the printer 113 which is not connected directly to the network. The print server 109 and printer 113 are connected through a typical communication channel 111.

Figure 2:
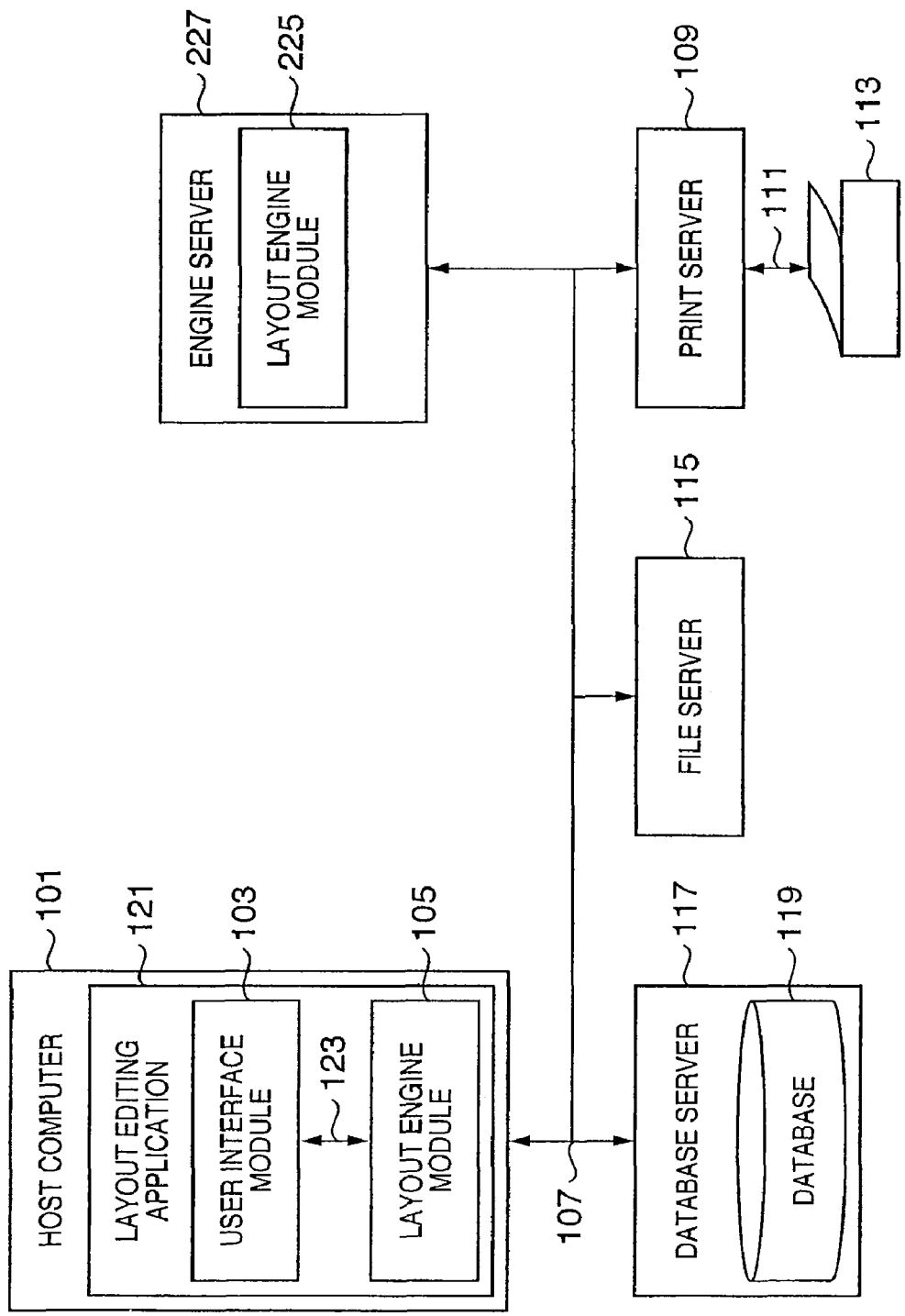
FIG. 2 is a block diagram showing an arrangement in which a layout engine 225 is arranged in an engine server 227 in addition to the layout engine module in the host computer 101.

FIG. 2 is a block diagram showing an arrangement in which a layout engine 225 is arranged in an engine server 227 in addition to the layout engine module 105 in the host computer 101. The engine server 227 is formed by a typical computer. A document template stored in the file server 115 can be merged with data stored in the database 119 to cause the layout engine 225 to generate a document for printing or another purpose. This operation is input through a user interface (UI) window under the control of the user interface module 103 and can be set to print only a specific record.

(Arrangement of Application)

(Main Window)

Figure 3:
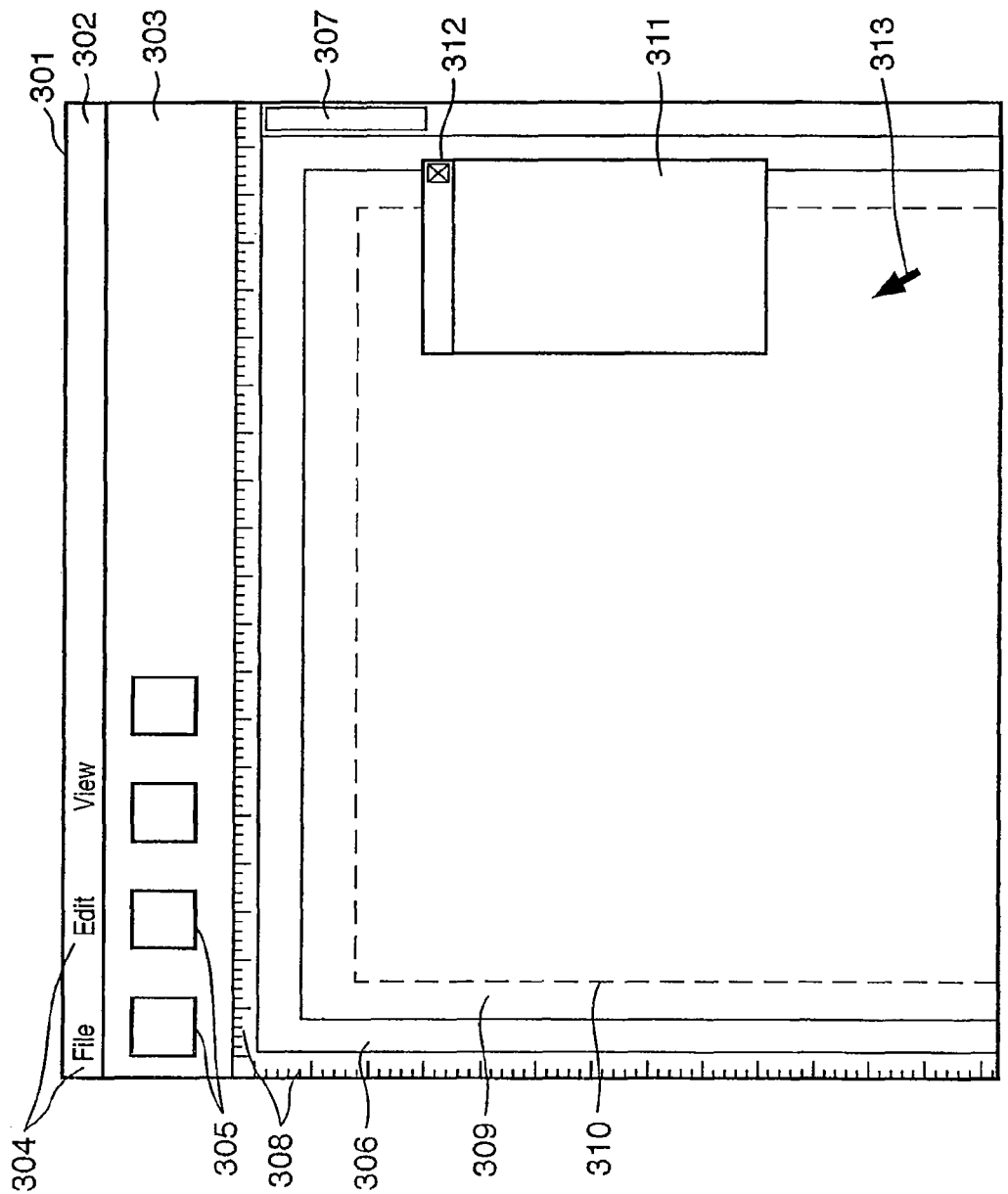
FIG. 3 is a view showing a user interface window including a menu bar, tool bar, work area, and floating palette.

An application window 301 shown in FIG. 3 is displayed on the display device 144 by the user interface module 103 (FIG. 1B) at the time of operation. The application window 301 has a menu bar 302 and tool bar 303 which can be set in a non-display state or moved to various positions on the screen, a work area 306 whose position can be moved by the position and operation of the mouse 133, an optional palette 311, and a cursor/pointer device 313. The application window 301 is characterized by these components.

The menu bar 302 as a known technique has a number of menu items 304 extended under the layer of menu options. The tool bar 303 has a number of tool buttons 305 which can be set in a non-display state or display state by a special mode of the application. An optional ruler 308 is used to indicate the position of a pointer, page, line, margin guide, container, or object in the work area. The palette 311 is used to access an additional function such as a variable data library. The palette 311 has a button 312 to provide a window control function to move, resize, or close it. The palette 311 can optionally be displayed on the foreground of the work area or hidden behind an object. By display control, the palette 311 can be displayed only within the application window 301 or can partially or wholly be displayed outside the application window 301.

Figure 4:
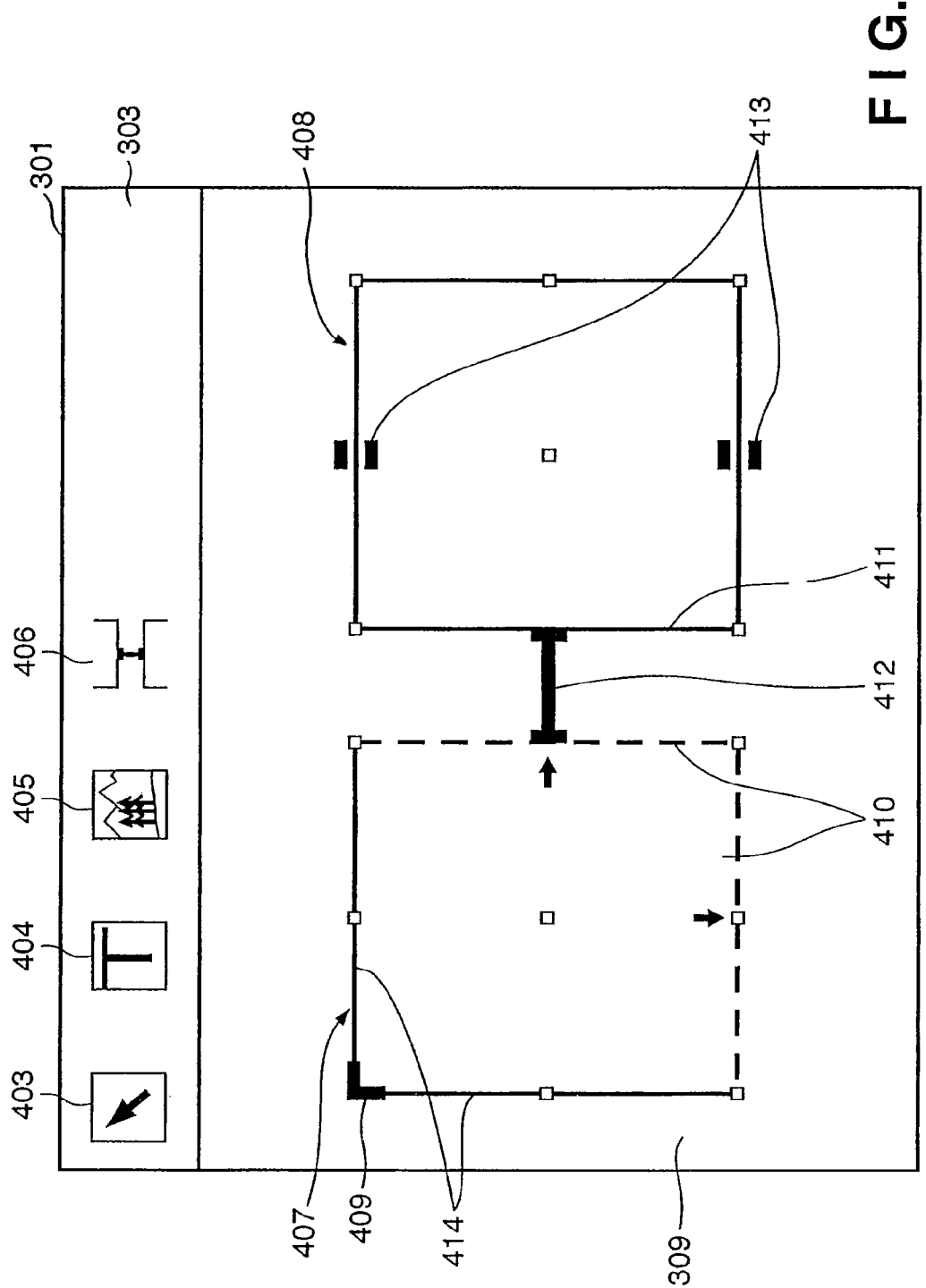
FIG. 4 is a view showing typical containers which have a link between them, an anchor, and sliders.

The tool bar 303 has at least user-selectable "buttons" (403 to 406) (FIG. 4). The buttons 403 to 406 will be described below.

The select tool button 403 is used for side selection, movement, resize, lock (fix), or unlock of a container. In a case where a select box is dragged around a plurality of containers, or a plurality of containers are selected while keeping the CTRL key pressed, the plurality of containers can be selected.

The image container tool button 405 is used to create a container having a static or variable image.

The text container tool button 404 is used to create a container having a static or variable text.

The link tool button 406 is used to create a link to associate containers with each other. This button is also used to control the distance of the link.

These buttons are mounted as icons which change in accordance with the operation situation, as is well known.

In the application window 301 of the layout editing application 121 shown in FIG. 3, in a case where containers and links are laid out in a page, a basic layout can be determined. The basic layout is a layout as a base of variable data print. In a case where all containers in the basic layout are fixed containers, all record print results have the same layout. In a case where containers in the basic layout are flexible containers (to be described later), the size or position of each container varies within the constraint range (to be described later) in accordance with the amount or size of data loaded for each record. The document template created by the layout editing application 121 is strictly used to determine the basic layout.

In a case where a flexible container is included, the final layout of a printed product is adjusted in accordance with loaded data.

(Document Template)

The work area 306 shown in FIG. 3 is used to display and edit the design of the document template. The user can understand the outline design of a printed document as preprocessing and how the merged document changes on the basis of the amount and size of variable data. In a case where an external database is linked to the template, a variable text or image can be displayed in each container so that a preview of the current document can be obtained. The document structure and variable data containers can always be displayed in a case where the cursor is moved onto a container, or a container is selected.

The work area 306 is characterized by a scroll bar 307, the optional ruler 308, and a document template 309. The document template 309 can indicate the presence of a plurality of pages. The page size of a given document template is designated by the user by a known technique. For example, "Page Setup" is selected from "File" of the menu to display a dialogue to set the page size, and the page size designated there by the user is reflected. The actual number of pages of each document can change depending on the variable data. In a case where variable data cannot be fitted in one page, and the basic layout has no constraint to fit the containers in a page having a predetermined paper size, an additional page is automatically created. In a case where a constraint (the constraint can be set by an anchor icon to be described later) to fit the containers in a page having a predetermined paper size is set in the basic layout, the size and position of each container are determined while changing their sizes relative to each other in the page, and variable data to be inserted is reduced as needed. Accordingly, the layout is determined dynamically for each record.

A border indicated by a broken line in the page shown in FIG. 3 is an arbitrarily settable page margin 310 representing the maximum width of an object printable on the page. FIG. 4 is a view showing examples of objects which can be displayed on the document template 309 of one page. A plurality of containers 407 and 408 are shown in FIG. 4. The relationship between the containers is defined by an anchor icon 409 which fixes the positions of sides 414, unfixed sides 410, a link 412, and sliders 413. The anchor icon 409 can be set at a corner or side of the rectangle of a container or the center of a container. In a case where the anchor icon 409 is set, the position of the set point is fixed. That is, in the example shown in FIG. 4, the anchor icon 409 is set at the upper left corner of the container 407. In a case where variable data is inserted in the container 407, and the image size or text amount of the variable data is large, the container can be enlarged to the right and lower sides. In a case where the anchor icon 409 is set on a side, the side is fixed. The container can be enlarged in the directions of the three remaining sides. In a case where the anchor icon 409 is set at the center of a container, the central position of the container is fixed. The container can be enlarged in four directions without changing the central position of the rectangle of the container. The link 412 (to be described later in detail) indicates that the containers 407 and 408 are associated with each other. The link 412 indicates that the container 408 can be moved to the right while maintaining the length (the range can be designated) set for the link. The sliders 413 indicate that the container can be moved in parallel to the sides on which the sliders are set.

(Container)

A container will be described. A container is a space (called a partial display region) where a fixed or flexile text or image is inserted from a variable data file to the document template for each record and drawn. A container is laid out together with other containers and objects, as shown in FIG. 4. Movement, size adjustment, and re-creation of the container are done by operating the mouse 133 on the basis of an operation instruction from the user through the user interface window.

For a container, constraints related to its deformation are defined by the anchor icon 409, link 412, and sliders 413. The container space is deformed in directions in which the deformation is permitted in accordance with the information amount of text or image data, and the text or image data is laid out in the container. If two containers must be deformed relative to each other, the shapes of the containers are controlled such that the two containers can deform in balance (without any stress on the containers) in accordance with the amount of text or image data to be fitted in the containers.

The position of each container in the work area 306 is specified by the operation of the mouse 133 serving as a pointing device (313 in FIG. 3). The container can be moved or adjusted in size in the window serving as a user interface. A new container can also be added. Various conditions about deformation such as the mutual relationship between the containers are set for containers by an anchor icon, link, and sliders. Visual expression for display of containers, interaction between the containers, and editing of information in the containers are ensured. The definition of a container will be described below.

(1) In a container, a fixed or flexible content is input. The container is dynamic in a sense that data is acquired from the data source, and the container size is changed in accordance with different data in different documents. Animated contents and contents which change over time by another method are not included in flexible contents because they are not suitable for printing. A fixed content is displayed in a similar manner in all documents generated by using containers. However, in a case where a link is set between a fixed content and a flexible content, display of the fixed content is controlled such that the display position changes between the documents by the operation of the flexible content.

(2) A container has ornament functions like text settings such as a background color, border, and font style applied to a content. This setting is called a container attribute. The container attribute can be set for each container. The setting can also be done such that a container has the same container attribute as another container.

(3) A container is merged with data from the data source in generating a document. The ornament function is reflected on an output product as a typical printed product for all fixed contents. The result on the ornament is reflected is visually displayed. A flexible content provides display of specific data from the data source. More specifically, the container size is set flexibly in accordance with conditions set for the container with respect to the specific data. The layout of the flexibly set container and specific data expression in the container can be, e.g., printed through the printer 113, displayed on the display device 144, or subjected to both printing and display.

(4) To set a container, the system has the user interface module 103 and, for example, an interactive graphical user interface (GUI) to edit the container or set display. Each element of the user interface is displayed on the screen of the display unit 144 but not printed in the document. The user interface module 103 can display some of the ornament functions of a container such as the background color and font and add the ornament functions to container setting, editing, and container display.

(5) In addition, the user interface module 103 sets a border between containers, an icon at a corner, which is set on a container to interactively change or display the size and position of the container, and an operation of a container (e.g., the number of times of overwrite, line, icon setting, and text editing) in a case where data is merged from the data source.

(Constraints of Container)

A container has constraints to combine a container with a content and control its display and layout to display the contents of the container in each document. These constraints (combining a fixed or flexible content with a container) are used as a principal method of causing the user to control a number of documents from one document template. An example of the constraint is "the maximum value is 4 inches". Another example of the constraint is "the left edge of the content of the container must be displayed at the same horizontal position in each document". As the contents described here, the constraints can be set for display and editing by using the GUI.

An image has a defined position on a page. Similarly, the position of a content is also specified in the layout. A container has a position and size. In variable data printing, the contents of a content can be displayed and edited under conditions for layout setting of a container in accordance with the contents of the content to be inserted in the container. In a case where a container is used, the user can designate the size and position of each content of a document. Some documents are generated from one document template. Hence, the container can designate a constraint for the container given by the user interface module 103.

The sides of one container define the virtual border of an associated content displayed in the document. For example, the left side of a rectangular container gives the left-side position of the layout of an associated content. Similarly, the height of the container gives a constraint of the height of the content associated with the generated document.

In the following description, the term "fixed", which defines a certain value used to restrict display of a content, applies to all documents in the same way.

(1) In a case where the width of a container is fixed, the width to be assigned to an associated content is the same in all documents.

(2) In a case where the height of a container is fixed, the height to be assigned to an associated content is the same in all documents.

(3) In a case where the constraint of a distance is fixed, the designated distance is a constraint in all documents.

(4) In a case where the left and right sides of a container are fixed, the container size can be changed in the height direction or vertical direction in which deformation is permitted to completely fit the content in the container.

(5) In a case where the upper and lower sides of a container are fixed, the container size can be changed in the width direction or horizontal direction in which deformation is permitted to completely fit the content in the container.

(6) The vertical axis of a container is a virtual vertical line which is parallel to the right and left sides of the container and is located at the intermediate position therebetween. In a case where the vertical axis of the container is fixed, the average of the horizontal positions of the left and right sides of the container is the same in all documents. In this constraint, the width of the container can change. The left and right sides are closest to or farthest from the vertical axis in different documents. However, the axis is located at the same horizontal position in all documents. The height and vertical position of the container are not affected by this constraint.

(7) Similarly, in a case where the horizontal axis is fixed, a constraint is given to locating the upper and lower sides vertically. However, the height is not affected by this constraint.

(8) In a case where both the horizontal and vertical axes are fixed, the central position of the container is fixed. However, the width and height are not affected by this constraint.

(9) In a case where a corner of a container, the intermediate position of a side of a container, or the central position of a container is fixed, the container is displayed at the same position associated with the container. For example, in a case where the upper left corner of a container is fixed, the upper left position of the container laid out is the same in all documents.

(10) The vertical sides or vertical axis can be fixed in association with the left or right side of the page, left or right page margin, or another horizontal position. Similarly, the horizontal sides or horizontal axis can be fixed in association with the upper or lower side of the page, upper or lower page margin, or another vertical position.

A term opposite to "fixed" is "flexible" which indicates that a side, axis, corner, or intermediate position of a container or a document constraint can change between documents (between records). For example, in a page, the layout is expected to dynamically change depending on the size or amount of variable data. However, the user may want that the size or position of a specific container is fixed, or the four corners of a container at a corner of the page are fixed. For this purpose, the layout editing application 121 can appropriately set, for each container (partial display region), whether to fix or change a side, axis, corner, or intermediate position. Hence, the user can create a desired basic layout in determining the basic layout of a document template 180.

(Display/Editing of Container)

(Method of Creating New Container)

Containers are classified into two types, i.e., text container and image container. A text container has a text and an embedded image. An image container has only an image. As shown in FIG. 4, a new text container or image container is created on the document template 309 by clicking the mouse 133 on the text container tool 404 or image container tool 405 and dragging a rectangle on the template 309. A container is created by activating the appropriate tool 404 or 405 and clicking the mouse 133 on the document template 309. A container having a default size is inserted. Alternatively, a dialogue box or prompt is provided to input the size of the new container. The container size can be set by various methods. The container is defined automatically in advance, and created and laid out on the document template 309 by a calculated schema. In a case where the generated container is selected by an input means such as the mouse, and its properties are designated by clicking on the right button of the mouse, the container property dialogue is displayed so that constraints for the container can be set. In the container property dialogue UI (corresponding to a partial display region setting means), various kinds of constraints described above can be set. In the container property dialogue, the size (width and height) and position of the container can be set. To set a flexible size, the basic pattern (basic size and reference position) of the container is set. In addition, the maximum container size (width and height) and the minimum container size (width and height) can be set.

(Container Display Method)

FIGS. 5A to 5D are views for explaining rules for the sides of a container. To express the state of a side, the layout editing application 121 draws a side by a solid line (503) or dotted line (504). The layout editing application 121 has anchors (line, shape, and icon indicated by 506, 507, and 509 drawn near the sides), handles (control points 502 drawn on or near the sides or shapes for movement and correction), sliders (short parallel lines drawn on both sides of a side, 403 in FIG. 4), enlarge/reduce icons (505), and colors as characteristic features.

The rules of the container display method shown in FIGS. 5A to 5D are as follows.

1. To fix a side, the side is drawn by a solid line.
2. In a case where the width is fixed, the left and right sides are drawn by solid lines.
3. In a case where the height is fixed, the upper and lower sides are drawn by solid lines.
4. The axes are not drawn.
5. Enlarge/reduce icons are drawn near each of all sides which are not drawn yet, and the sides are drawn by dotted lines.
6. In a case where the pair of vertical sixes or the pair of axes are fixed, an anchor is drawn at the intersection between them.
7. In a case where no anchor is drawn anywhere on a fixed side, a slider is drawn at the center of the edge.
8. In a case where neither anchor nor slider is drawn for the pair of vertical sides or the pair of axes, a handle is drawn at the intersection between them.

The lines defined by the above-described rules 1, 2, and 3 are fixed or restricted, as described above, and drawn by solid lines. Flexible sides defined by the rule 5 are drawn by dotted lines. Fixed points defined by the rules 6, 7, and 8 represent anchors. Some fixed sides represent sliders. Remaining points represent handles.

In the above-described rules, higher priority is given to a constraint set by the user later. That is, in a case where another constraint is set later, and it can affect sides which should be drawn in accordance with the above-described rules, the drawing contents of solid line or dotted lines are changed.

The location where a flexible side is drawn depends on the content of the container. As will be described later, "dynamic calibration processing" is used, which indicates that a content is merged with a document template and made visible by the user interface. An alternative execution means can be used by another means for determining the layout position of a flexible side in the user interface or the content area of the container averaged in all documents. The layout editing application 121 can execute container display control and layout control in accordance with the above rules.

The expression of a content is visualized by inserting the content in a container whose size can be changed in accordance with the anchor icon or slider icon set on each side of the container. Detailed icons set for a container and its sides function in the manner to be described below.

A dotted line indicates that the position of the side in the document can be moved depending on the content to be inserted in the container, like the side 410 shown in FIG. 4. A solid line indicates a side whose position is restricted.

An anchor indicates that the point where sides or axes cross is fixed. The icon 409 in FIG. 4 is an example of an anchor icon which indicates that the crossing sides 414 are fixed.

A slider indicates that the associated side can be translated although it is fixed in the vertical direction of the side. The sizes of the width and height are displayed in a secondary dialogue window under the control of the layout editing application 121 so that a basic pattern of the basic value, minimum value, and maximum value permitted as a container size can be set.

Figure 5B:
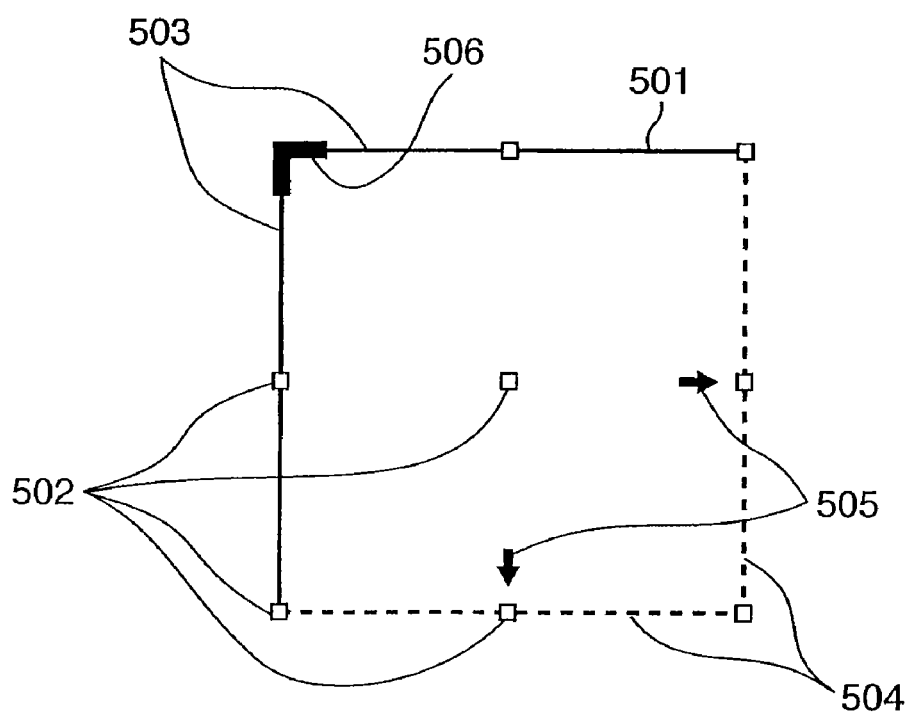
FIG. 5B is a view for explaining rules for the sides of a container by example.

Referring to FIG. 5A, the sides 503 of a container 501, which are indicated by solid lines, are fixed sides. The sides 504 indicated by dotted lines can change in both the width and height. The enlarge/reduce icons 505 represent that the adjacent sides 504 are flexible. Referring to FIG. 5B, the sides 503 of the container 501, which are indicated by solid lines, are fixed sides. Referring to FIG. 5B, the anchor icon 506 indicates that the displacement is restricted in the directions of the height and width in which the sides 503 cross.

Figure 5D:
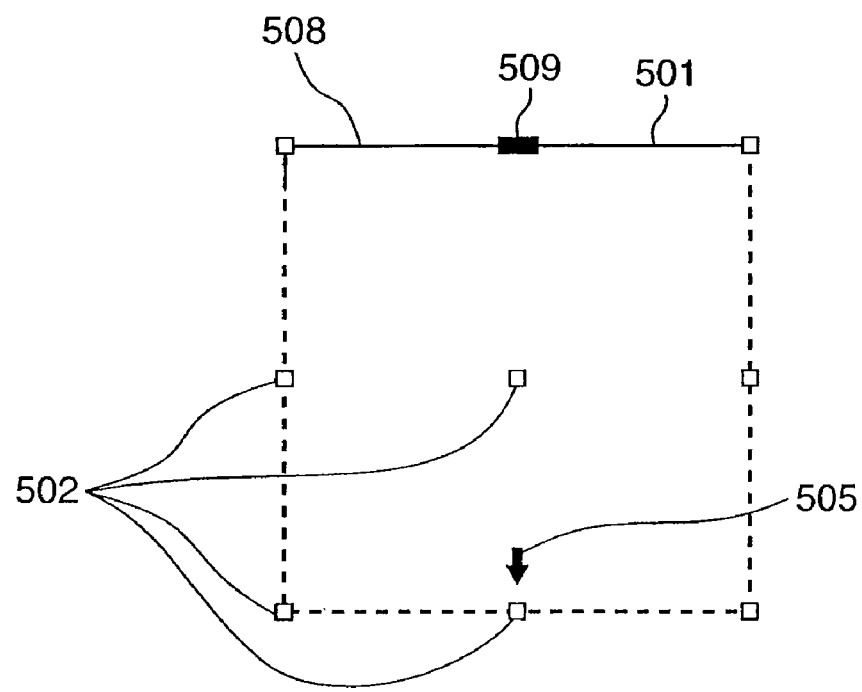
FIG. 5D is a view for explaining rules for the sides of a container by example.

Referring to FIG. 5C, the container 501 is set such that it can extend equally in the directions of width and height from the central point indicated by the anchor icon 507 which indicates that the container can arbitrarily be enlarged or reduced. That is, the sides can be changed in both the directions of width and height. Referring to FIG. 5D, in the container 501, the slider icon 509 is set for an upper side 508, and the upper side 508 is fixed. The sides 502 indicated by dotted lines can change in both the width and height. In this case, the container can be displaced in the horizontal direction and vertical direction of the sides 502 with respect to the central axis (vertical axis) passing through the anchor icon 509. Accordingly, the container size can be changed. In the enlargement/reduction, the layout is adjusted such that the anchor icon 507 is always located at the center of the container 501.

(Link Setting Method)

Figure 7A:
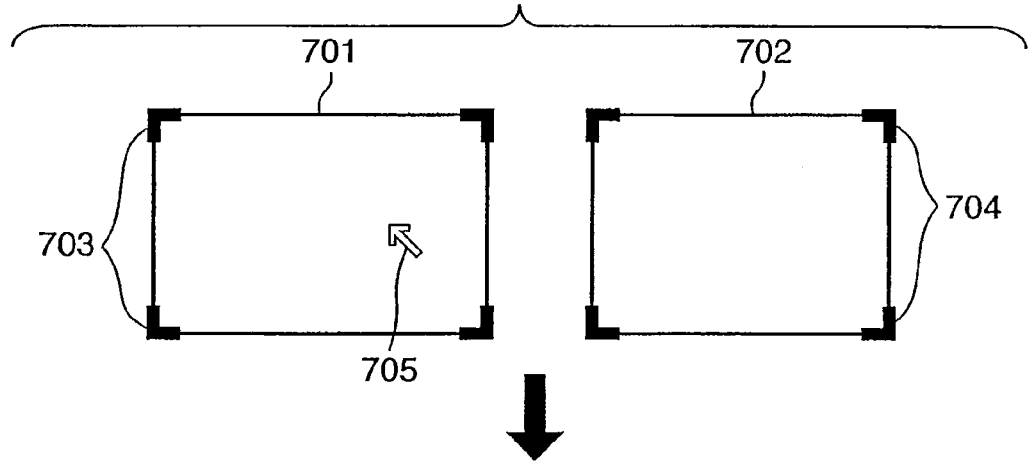
FIGS. 7A to 7C are views showing display examples of a user interface window in creating a link.
Figure 7B:
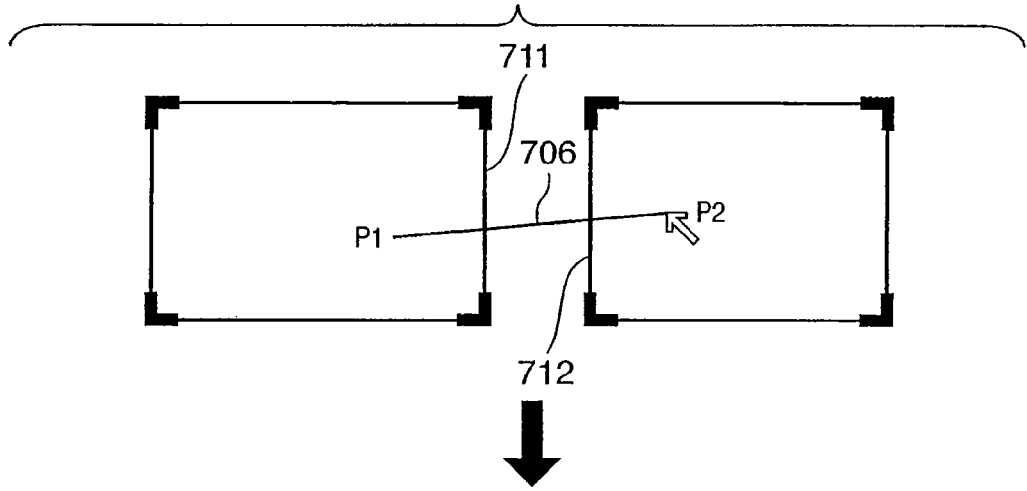
Figure 7C:
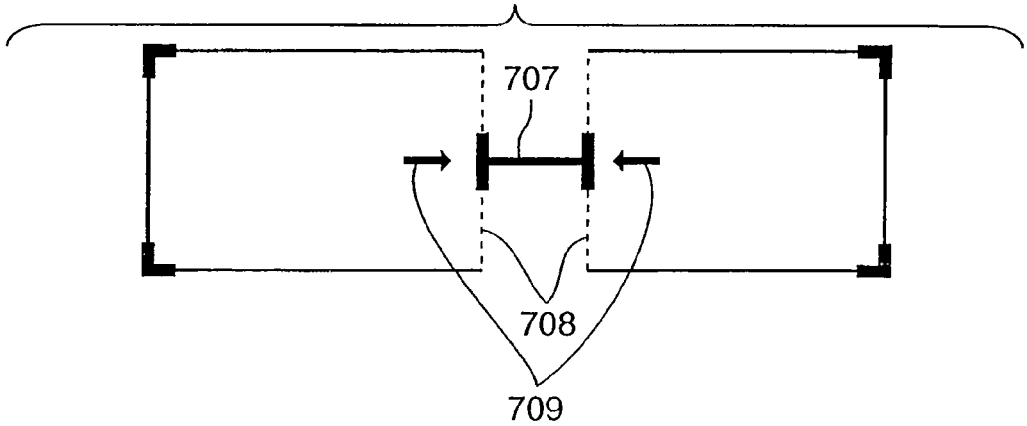

FIG. 6 is a flowchart showing a link setting method by the layout editing application 121. FIGS. 7A to 7C are views showing display examples of a user interface window. An operation method of setting a link between containers will be described below with reference to FIGS. 6 and 7A to 7C. First, to set a link between containers, containers (at least two containers) as link setting targets are created (S601). FIG. 7A shows a state in which two containers 701 and 702 are created.

Next, the above-described link tool button (FIG. 4) is selected (S602). The containers 701 and 702 shown in FIG. 7A indicate the same contents as those of the above-described containers 407 and 408 in FIG. 4. The containers are formed from fixed sides (indicated by solid lines). Icons 703 and 704 are anchor icons which are the same as the anchor icon 409 in FIG. 4. Reference numeral 705 denotes a mouse pointer 705.

In a case where the link tool button 406 is selected in step S602, containers are selected (S603). In a case where the user clicks the mouse 133 on one (e.g., container 701) of the containers as the link setting targets, the container is selected. Next, the user clicks the mouse 133 on the other (e.g., container 702) of the containers as the link setting targets, the other container for which a link is to be set is selected (S604).

A line segment 706 in FIG. 7B indicates the schematic locus of the mouse pointer 133 which connects the click point (P1) of the mouse 133 in step S603 and the click point (P2) of the mouse in step S604 (S605 in FIG. 6). A link 707 is set between sides 711 and 712 of the containers which cross the line segment. Finally, the interface window is updated to a state in which the link 707 is set between the containers (S606). In a case where the link 707 is set, the window display to display the containers is also changed automatically. In the changed window (FIG. 7C), sides 708 are indicated by dotted lines which represent flexible sides, as described above. The sides 708 are changed from fixed sides (corresponding to the sides 711 and 712 before link setting) to flexible sides because the sides of the containers 701 and 702 need to be changed to flexible sides in accordance with setting of the link 707. If all sides are fixed even after setting of the link 707, the relative relationship between the containers is specified by the link. The above processing aims at preventing this contradiction and is automatically executed under the control of the layout editing application 121.

Indicators 709 for identification function like the icons 505 in FIGS. 5A to 5D and visually present, to the user, directions in which the containers 701 and 702 can be displaced due to setting of the link 707. In the example shown in FIG. 7C, the right side of the left container 701 and the left side of the right container 702 flexibly change. This is merely an example. The left container 701 and right container 702 may have the flexible side 708 by setting the slider 413 in FIG. 4. The above processing can be executed under the control of the layout editing application 121.

(Link with Flexible Length)

Figure 46:
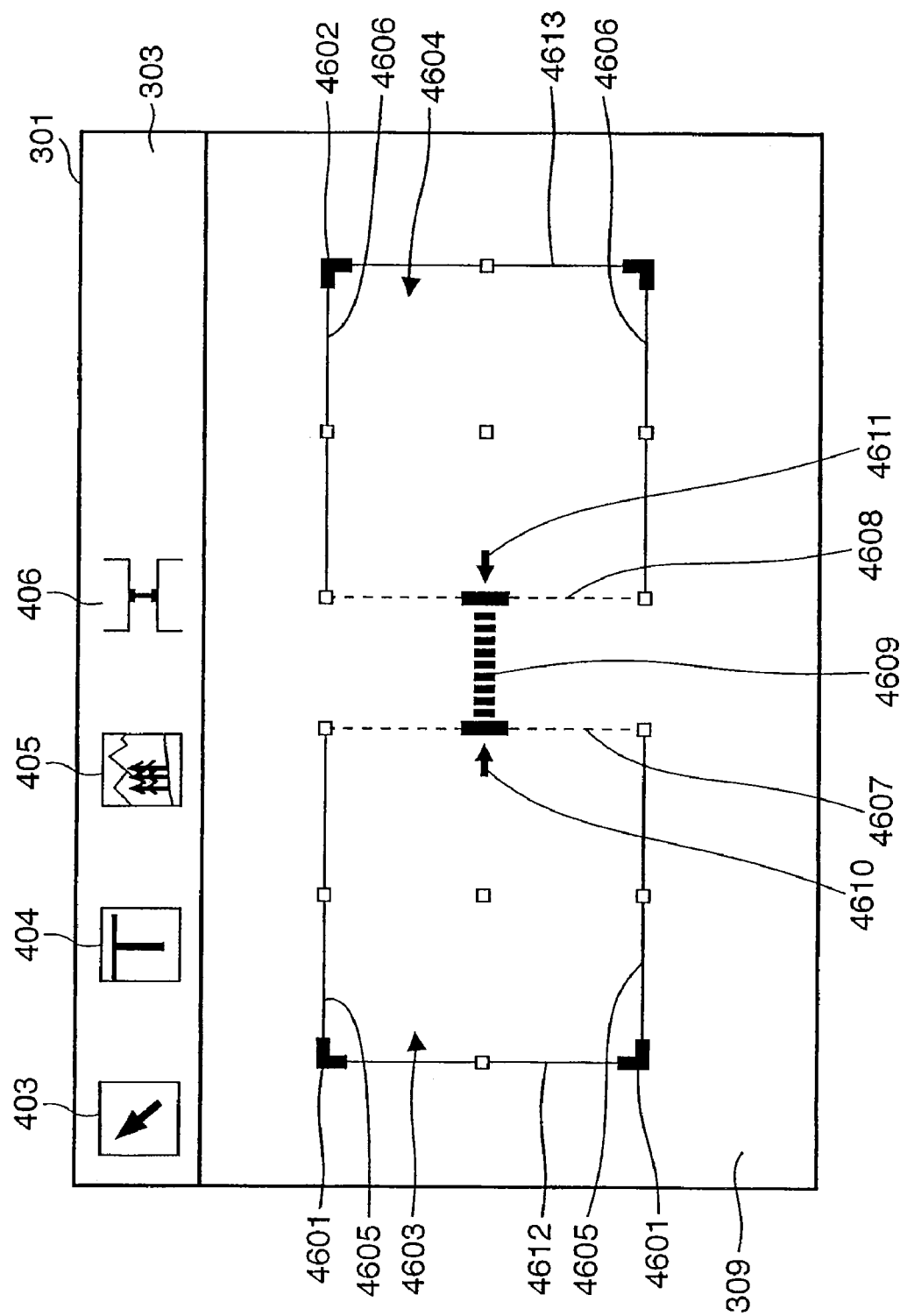
FIG. 46 is a view for explaining the layout of containers by a typical flexible link in the automatic layout system.

A general flexile link 4609 is shown in the interface window in FIG. 46. As in FIG. 4, the interface has the application window 301 and tool bar 303. Containers 4603 and 4604 are present on the document template 309. The containers typically include anchor icons 4601 and 4602 and fixed sides 4605 and 4606. The link 4609 having a flexible size is set between the containers 4603 and 4604 to connect them. Since the link is set between the containers 4603 and 4604, a right side 4607 of the container 4603 and a left side 4608 of the container 4604 are expressed by dotted lines. Hence, indicators 4610 and 4611 are displayed in the containers to indicate that the sides 4607 and 4608 are flexible.

Figure 48:
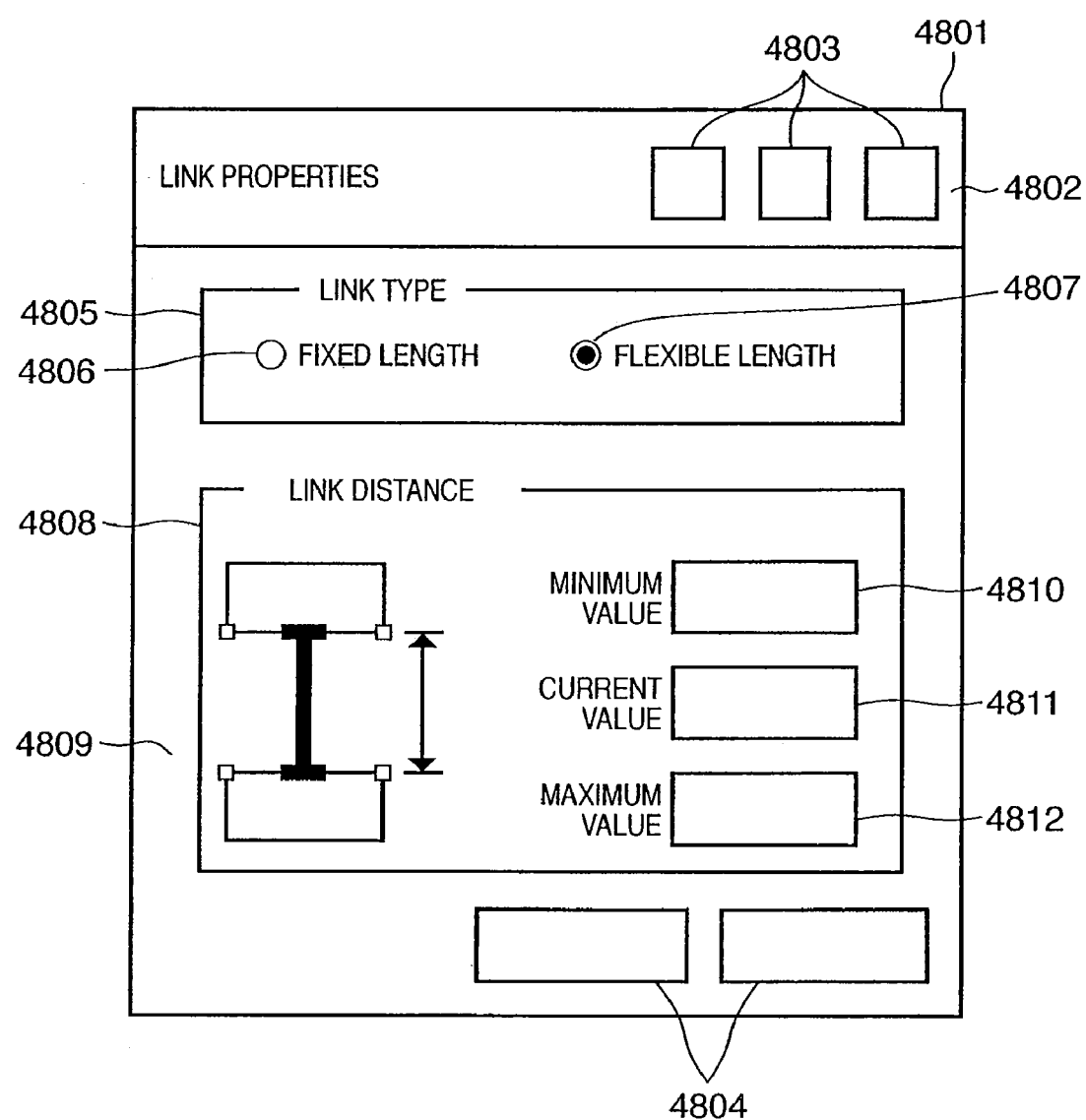
FIG. 48 is a view showing an example of a dialogue window in which the information of a link 4609 is set.

FIG. 48 is a view showing an example of a dialogue window 4801 in which the information of the link 4609 is set. This dialogue typically includes a title bar 4802, a tool button 4803, a button 4804 to open/close the dialogue window, and an area 4809 to set various kinds of information. In this dialogue window, the link type can alternatively be selected from a flexible length (4807) and a fixed length (4806). For a flexible length, a maximum value (4812), minimum value (4810), and reference value (4811) of the link length can be set. The reference value 4811 of the distance between the containers indicates a link length used in a case where the size of each container does not change at the time of data insertion.

Figure 47:
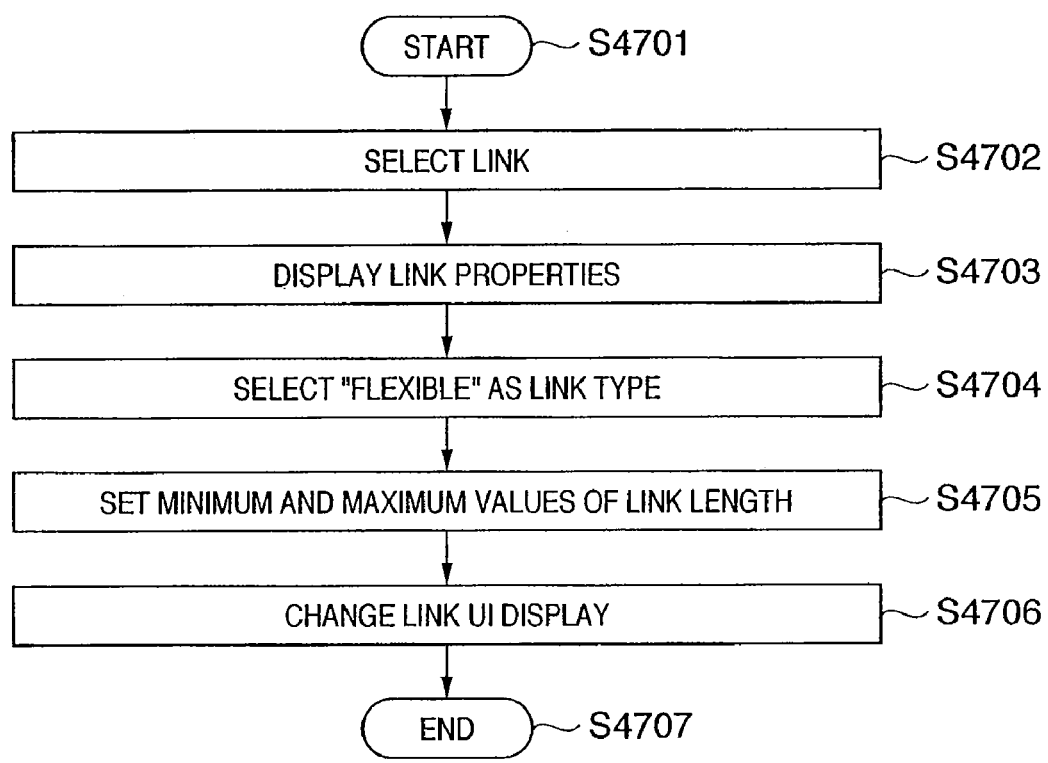
FIG. 47 is a flowchart showing a flow of setting a flexible link in the automatic layout system.

FIG. 47 is a flowchart of flexible link setting in the automatic layout system. The link 4609 is clicked on by the mouse 133 and selected (S4702). The layout editing application 121 displays the property dialogue window 4801 of the link 4609 selected by clicking on the right button of the mouse or operating a specific key of the keyboard (S4703). In this state, the link size is not flexible but fixed. Hence, "fixed" 4806 is selected in a link type 4805. To change the link from the fixed size to the flexible size, "flexible" 4807 to set a flexible link size is selected in the link type 4805 (S4704). Accordingly, the maximum value 4812, minimum value 4810, and reference value 4811 arranged in a link distance 4808 are validated, and numerical values can be set. To set the flexible size of the link, the user sets the maximum value of the link length in the maximum value 4812, the minimum value in the minimum value 4810, and the reference value in the reference value 4811 (S4705). In a case where the setting is applied by the general dialogue window open/close button 4804, the UI display of the link changes to the link 4609 shown in FIG. 46 (S4706). The pieces of setting information of the dialogue window 4801 are stored in the memory.

Figure 49:
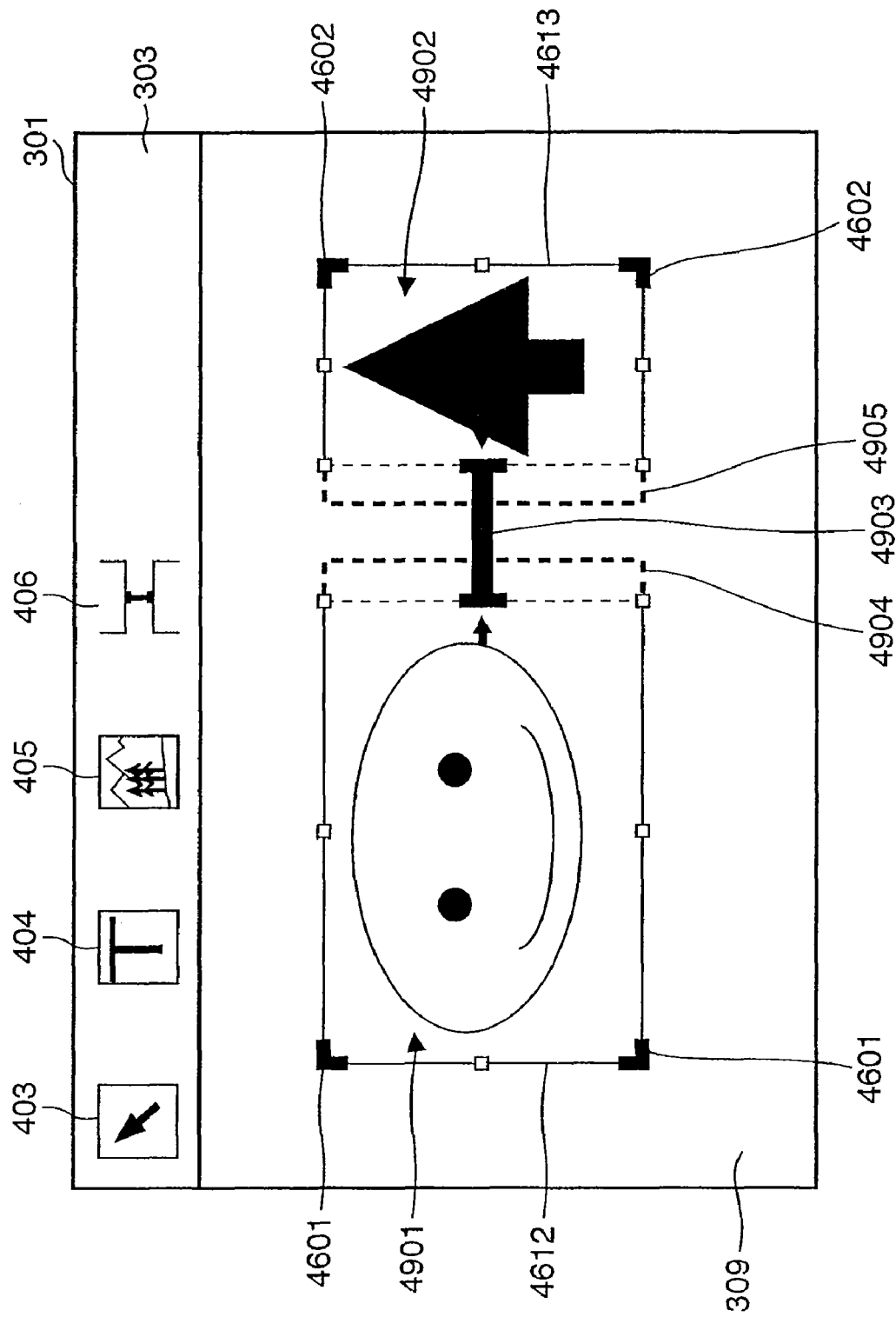
FIG. 49 is a view showing a layout result by a fixed link in the automatic layout system.

FIG. 49 is a view showing a layout result in a case where a link having a fixed size is used. Layout calculation by the layout engine 105 of the layout editing application 121 is executed in accordance with the above-described procedures.

For example, assume that data having different sizes are inserted in the containers 4603 and 4604 shown in FIG. 46. In this case, each container regards the data size as optimum. The container 4603 changes its size rightward to a frame 4904 (optimum container size) corresponding to the size of the inserted image. Similarly, the container 4604 changes its size leftward to a frame 4905 (optimum container size) corresponding to the size of the inserted image.

However, a link 4903 having a fixed size is set between the containers 4603 and 4604. The left side 4612 of the container 4603 and the right side 4613 of the container 4604 cannot be moved because of the anchors 4601 and 4602. For this reason, the change size becomes larger than the link size. Since the link size is fixed and calculated preferentially in layout calculation, the sizes of the container 4603 (FIG. 46) and container 4604 (FIG. 46) are changed. As a consequence, the containers 4603 and 4604 cannot ensure the optimum sizes corresponding to the data. Finally, the container sizes are smaller than the optimum sizes, i.e., the frames 4904 and 4905, like containers 4901 and 4902 in FIG. 49. That is, since the size of the link 4903 is fixed, the containers 4901 and 4902 cannot achieve the optimum sizes.

Figure 50:
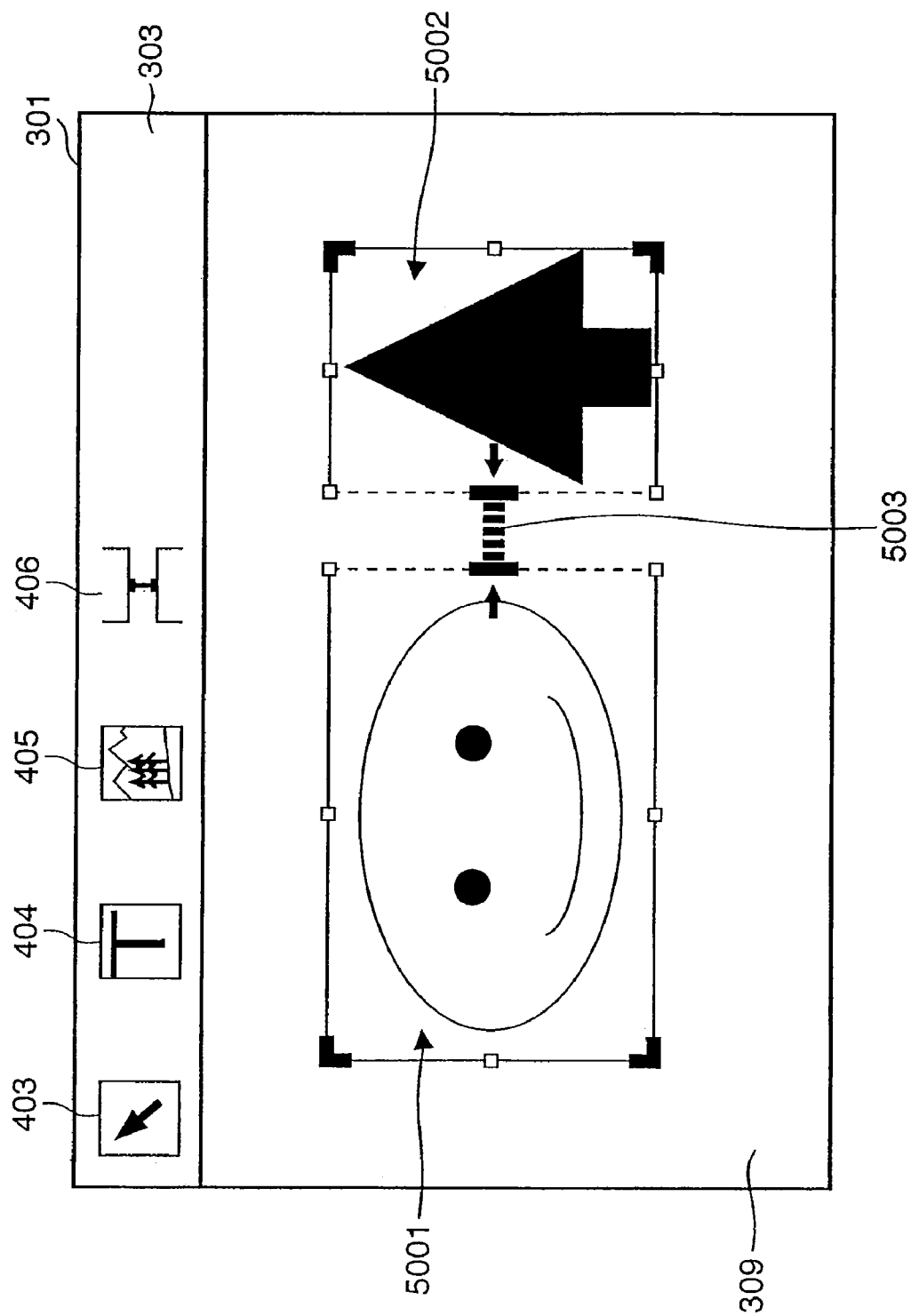
FIG. 50 is a view showing a layout result by a flexible link in the automatic layout system.

FIG. 50 shows a case in which the link is changed to a flexible size. In this case, a link 4609 (FIG. 46) having a flexible size is set between the containers 4603 and 4604 of the above example. In a case where the sizes of the containers 4603 and 4604 are changed, the link size decreases so that the containers 4603 and 4604 can be larger than in the example shown in FIG. 49. Optimum sizes corresponding to the inserted data sizes can be achieved. Alternatively, container frames close to the inserted data sizes (optimum sizes) can be calculated. Containers 5001 and 5002 shown in FIG. 50 indicate this result. The size of the flexible link 4609 changes to a size indicated by a flexible link 5003 as a result of layout calculation. In this case, the containers 5001 and 5002 deform in synchronism with each other and have optimum sizes (sizes corresponding to the data sizes). The above processing can be executed under the control of the processor unit 135 and layout editing application.

(Layout Calculation Method (Overall Flow))

Figure 8:
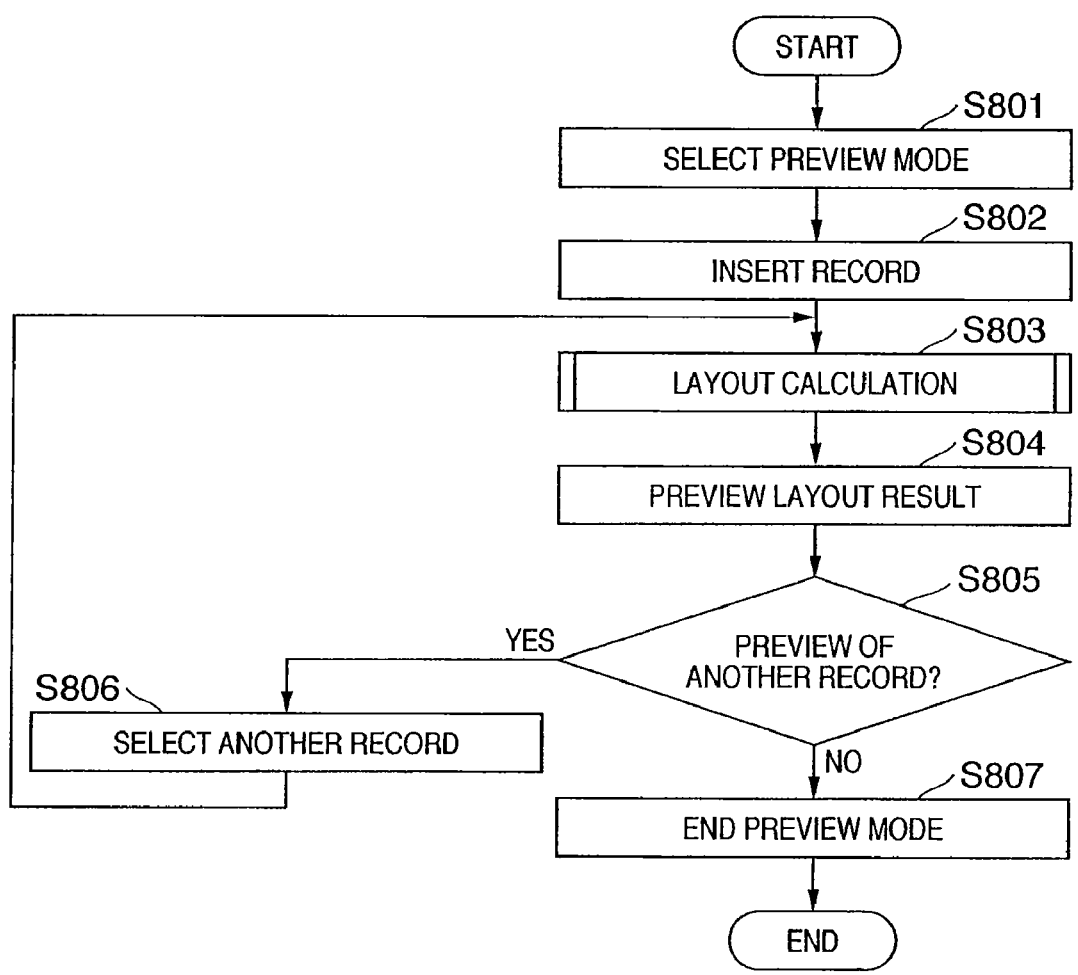
FIG. 8 is a flowchart for explaining the flow of processing of layout calculation.

The layout editing application of this embodiment has a layout mode in which containers are created by using the user interface 103, and a layout is created by associating the containers with each other (link setting), and a preview mode in which each record of a data source is inserted in the created layout by the layout engine 105, and the layout result after actual record insertion is previewed. In the preview mode, actual records are inserted, and a layout is calculated in accordance with the above-described priority order. In the preview mode, however, the layout for display is calculated. Even in actual printing, the layout is calculated by causing the layout engine 105 to insert data in each container. The calculation method at this time is the same as in the preview mode. FIG. 8 shows the flow of layout calculation.

First, the preview mode is selected (step S801). The automatic layout system has a layout mode in which containers are created, and a layout is created by associating the containers with each other, and a preview mode in which data records (to be referred to as "records" hereinafter) to be displayed are inserted in the created layout, and the layout result after actual record insertion is previewed. In the preview mode, actual records are inserted, and a layout is calculated. In the preview mode, however, the layout for display is calculated. Even in actual printing, the layout is calculated by inserting records. The calculation method is the same as in the preview mode. In a case where the preview mode is set, a record to be previewed is selected and inserted (step S802). In a case where the record is inserted, layout calculation is executed to lay out the record (S803). The layout calculated in processing step S803 is displayed (S804). It is determined whether to preview another record (S805). If it is determined in processing step S805 that no preview of another record need be executed (NO in step S805), the processing advances to step S807 to end the preview mode. If it is determined in step S805 that another record is to be previewed, another record is selected, layout calculation is executed again (S803), and preview is done (S804). In a case where not the preview mode but the print mode is set, layout calculation is done sequentially for all records to be printed. Hence, the processing in step S804 is unnecessary in the print mode. In step S805, it is determined whether all records to be printed are processed. The layout result calculated in step S803 is output, and print data is generated by using the printer driver and output to the printer. In this case, in a case where print data output is ended for all records (all records designated for printing), the processing is ended. The above processing can be executed under the control of the processor unit 135.

(Layout Calculation Method)

Figure 9:
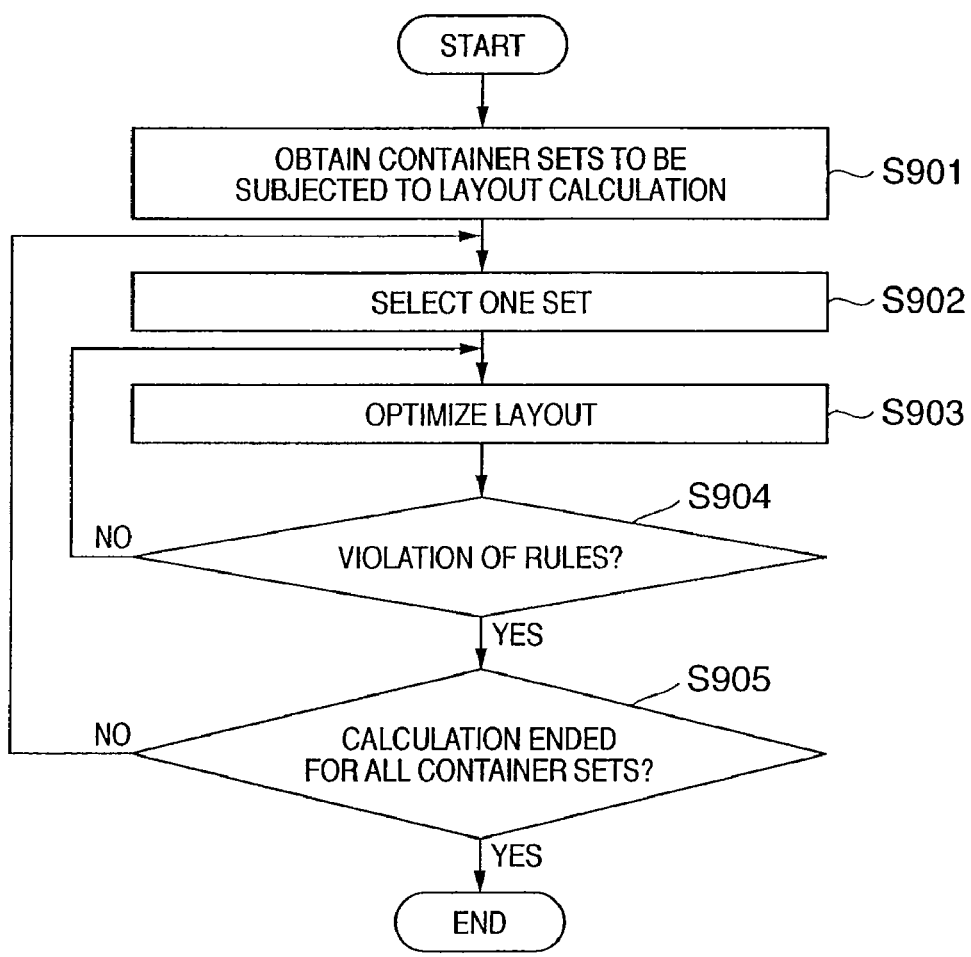
FIG. 9 is a flowchart for explaining the detailed flow of processing of layout calculation.
Figure 10A:
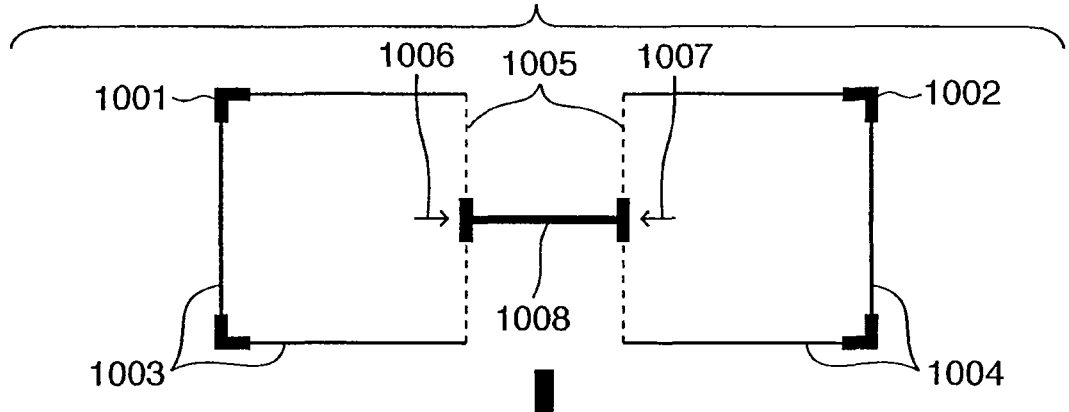
FIGS. 10A to 10C are views showing display examples of the user interface window corresponding to the flow shown in FIG. 9.
Figure 10B:
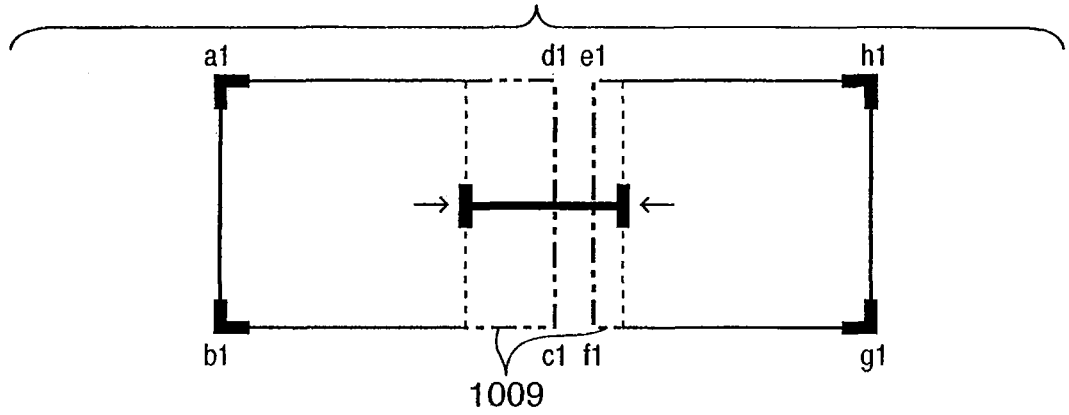
Figure 10C:
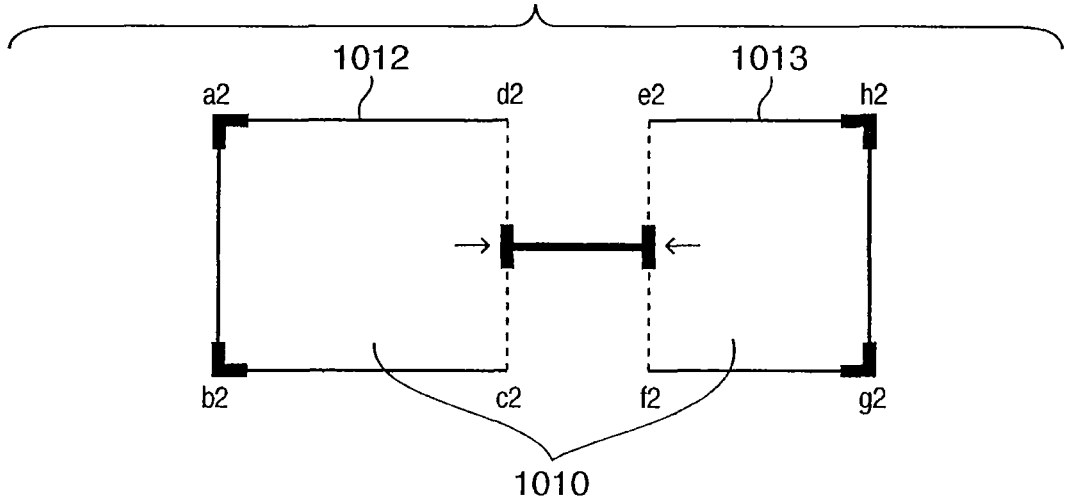

FIG. 9 is a flowchart for explaining the detailed flow of processing of layout calculation. FIGS. 10A to 10C are views showing display examples of the user interface window in this processing. FIG. 9 is a flowchart for explaining only the layout calculation processing method. This corresponds to the layout calculation method in printing/previewing one record of variable data print. In a case where a plurality of records are present, the following processing is repeated.

Figure 11:
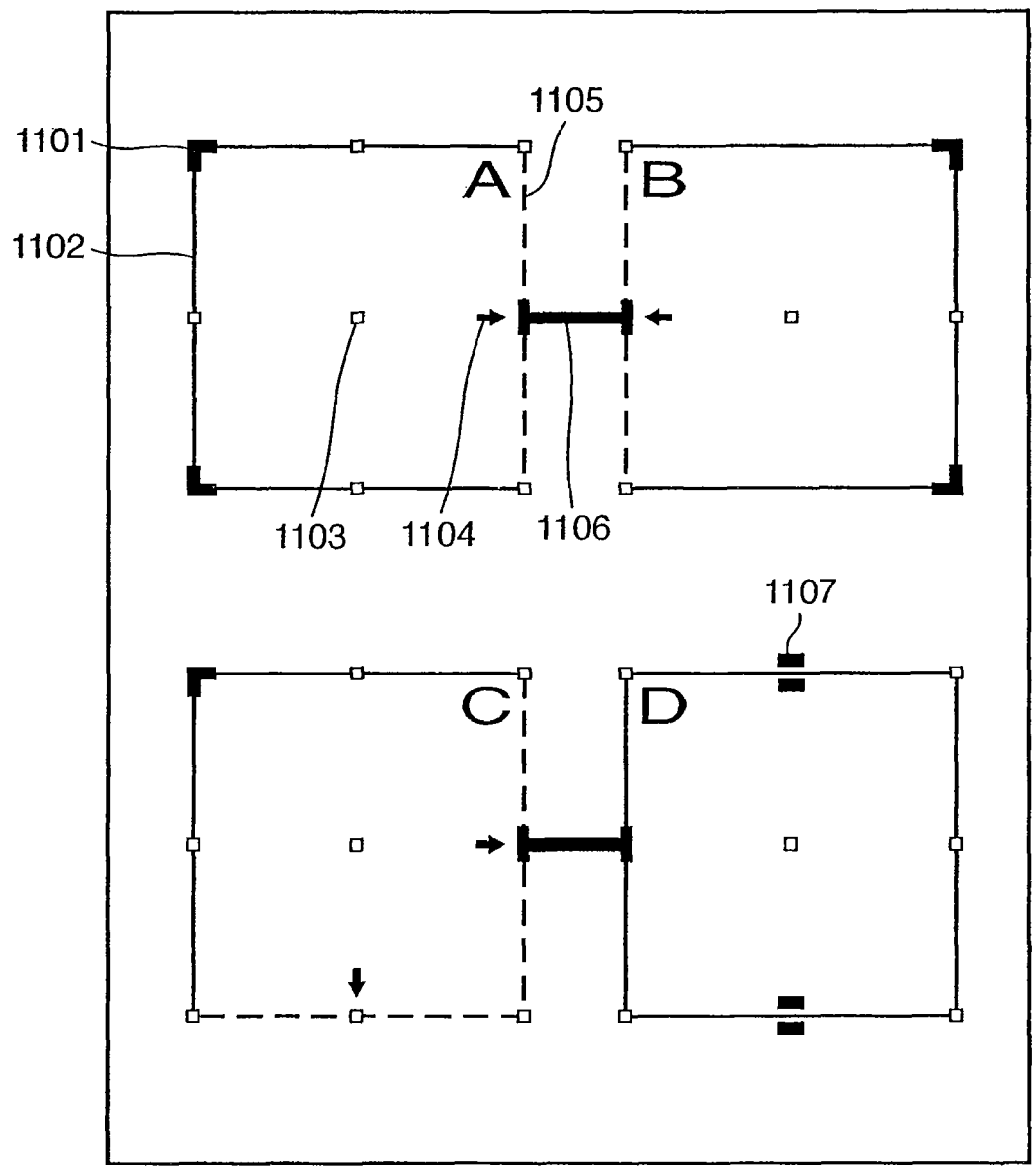
FIG. 11 is a view for explaining a set of containers in layout calculation.

First, the layout editing application 121 obtains a set of containers whose layout should be calculated (step S901). Layout calculation is executed for a set of associated containers. Referring to, e.g., FIG. 11, four containers A, B, C, and D are laid out on a page and associated with each other. In this case, the containers A and B are associated by a link, and containers C and D are also associated by a link. Hence, the containers A and B form set 1, and containers C and D form set 2. Reference numeral 1101 denotes an anchor; 1102, a fixed side; 1103, a control point; 1104, an arrow which indicates the change direction of a flexible side; 1105, a flexible side; 1106, a link; and 1107, a slider.

The layout editing application 121 selects a set for layout calculation from the container sets obtained in step S901 (S902). For the selected container set, layout calculation is executed. First, the sizes of the two containers (A and B) as flexible elements included in the selected container set are calculated assuming that the containers are not affected by the image size or text amount of data to be inserted. More specifically, the layout editing application 121 determines whether the container A is an image data container or text container. This determination can be done on the basis of the attribute set for the container, as described above. Next, the layout editing application 121 loads the data to be inserted in the container A. In a case where the container A is an image data container, the size (the number of horizontal pixels, the number of vertical pixels, and the resolution) of the image data is defined as the size of the container A without any constraint. In a case where the container A is a text container, the amount of data to be inserted in the container A can be calculated on the basis of the number of characters of text data and the character attribute such as a font type, font size, character pitch, and line pitch designated by the container attribute of the container A. For the text container, a constraint is applied because the aspect ratio of the container A cannot be determined without considering a constraint. In the example shown in FIG. 11, since anchors are set at the upper left and lower left corners of the container A, the height (vertical direction) is fixed. Hence, the layout editing application 121 determines whether characters corresponding to the calculated data (text amount) can be inserted in the container A having the width (horizontal direction) set as the basic pattern of the container A. If it is determined that all characters can be inserted, the size (width and height) set by the basic pattern does not change in the container A. If it is determined that not all characters can be inserted, the container A expands in the horizontal direction because the height is fixed by setting the anchors. In this case, the layout editing application 121 calculates the width of the container A, which allows insertion of characters in the calculated amount, thereby calculating the size of the container A.

Next, the layout editing application 121 optimizes the layout such that the difference between the size of each container to be laid out and the actual content size becomes as small as possible (S903). The layout is optimized such that the difference between the size of the content to be inserted and the size of layout becomes as equal as possible between the containers associated with each other to dynamically change their sizes. The layout editing application 121 obtains the size of the container set selected in step S902, i.e., the total size of the container A, container B, and link 1506 (fixed link). Then, the layout editing application 121 calculates the difference between the total size and the size of the container set in the basic layout (in the example shown in FIG. 11, the size of the container set corresponds to the distance between the anchor icons of the containers A and B). If the width of the container A or B is increased as the result of calculation in the preceding step, a different value is generated. The layout editing application 121 equally distributes the difference value to the elements of the container set, thereby adjusting the layout.

The layout editing application 121 optimizes the layout. In optimizing calculation, if a violation of rules (constraints applied to the containers) has occurred, the container sizes are calculated again to prevent any violation of rules (S904). The rules described here are constraints set by the user in creating the layout. Examples of the constraints are the size and position of a container and the length of a flexible link. In a case where the layout is calculated without any violation of rules, the layout of the set selected in step S902 is completed. The processing in steps S902 to S904 is executed for all container sets on the page. The layout of the entire page is calculated (S905). The layout calculation processing is thus ended.

FIGS. 10A to 10C are views showing examples of the user interface window displayed at the time of layout calculation. FIG. 10A shows a state in which records are inserted, and the layout is determined. Reference numerals 1001 and 1002 denote anchors; 1003 and 1004, fixed sides; 1005, a flexible side; 1006, an arrow which indicates the change direction of a flexible side; and 1008, a link. In this state, in a case where the records are changed, and contents having different sizes are inserted, the state shown in FIG. 10B is obtained. The displacement of each flexible side in the state shown in FIG. 10A is indicated by an alternate long and two-dashed line. Layout calculation is executed in consideration of the rules. FIG. 10C shows the result of layout calculation. The sizes of containers 1012 and 1013 are calculated such that they have the same difference to the size of the content to be actually inserted (such that the containers deform in synchronism with each other), and no violation of the above-described rules occurs. As shown in FIG. 10C, the content sizes (a1b1c1d1 and e1f1g1h1) to be inserted shown in FIG. 10B and the content sizes (a2b2c2d2 and e2f2g2h2) after calculation are calculated such that they have the same difference between the left and right containers. The above processing can be executed under the control of the processor unit 135 and layout engine module 105.

(Priority Order of Container)

(Setting Method)

Figure 56:
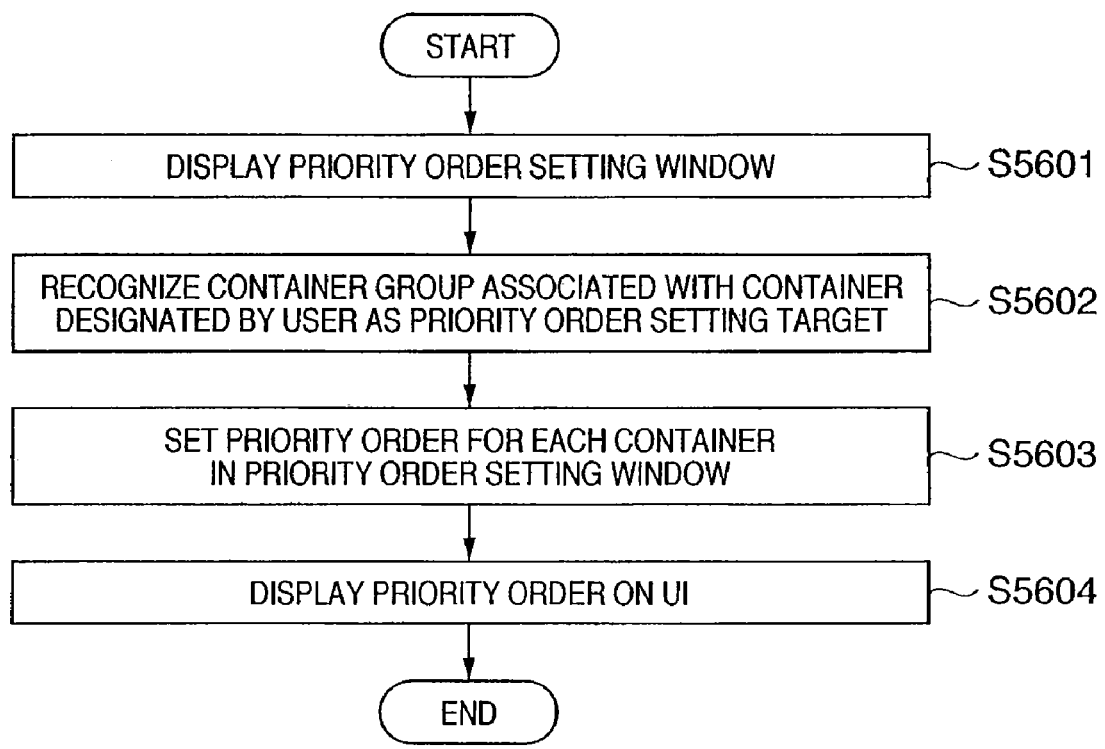
FIG. 56 is a flowchart for explaining the flow of priority order setting processing.
Figure 57:
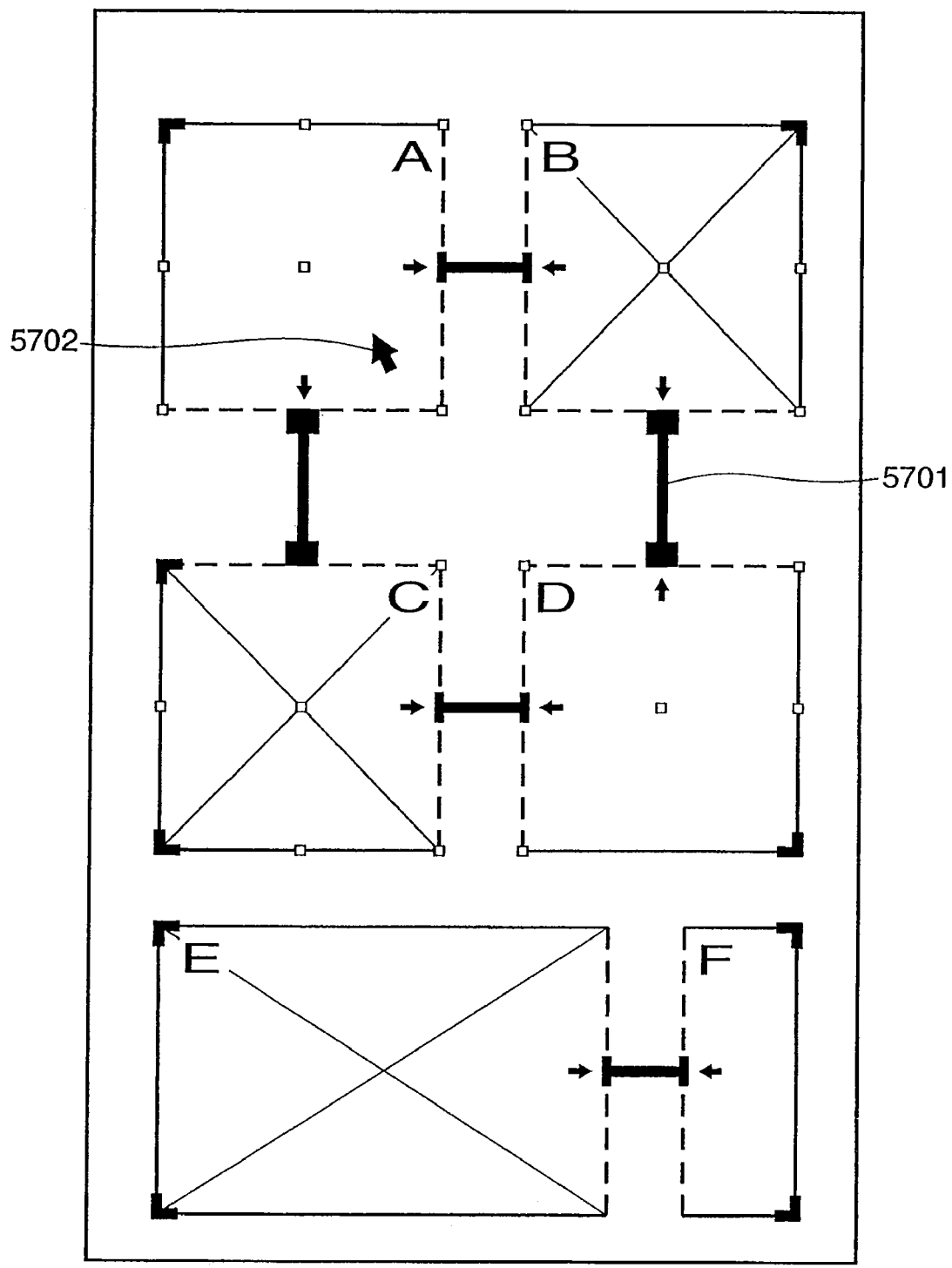
FIG. 57 is a view for explaining contents of setting the priority orders for each container set.

FIG. 56 is a flowchart for explaining the flow of priority order setting processing. The processing in each step will be described with reference to examples of the user interface window shown in FIGS. 57 to 60.

Figure 60:
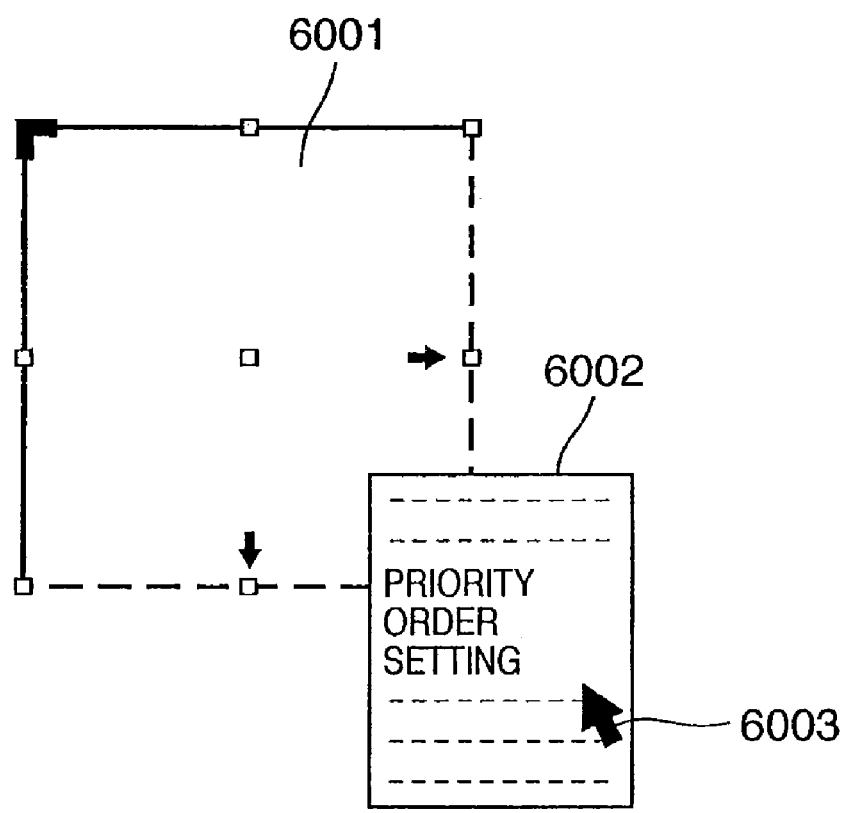
FIG. 60 is a view showing an example of a pop-up menu to change the mode to a priority order setting mode.

First, the layout editing application 121 displays a pop-up menu 6002 to make the user to select a container for which the priority order is to be set, as shown in FIG. 60. In a case where priority order setting is selected, a priority order setting window is displayed (S5601). Referring to FIG. 60, reference numeral 6001 denotes a container; 6002, the pop-up menu; and 6003, a mouse pointer. The priority order setting is selected on the pop-up menu in FIG. 60. Instead, the priority order setting may be selected on a container property dialogue.

The layout editing application 121 recognizes containers associated with the container selected in step S5601 as one set (S5602) and sets priority orders (S5603). In the automatic layout system, the relative layout of the associated containers is calculated in accordance with their sizes and optimized (see a layout calculation method). The priority order designates the order of calculation of the associated containers. The priority orders are set by recognizing the associated containers as one set. For example, referring to FIG. 57, text containers A, D, and F and image containers B, C, and E are laid out. The containers are associated with each other by links (5701) so that two sets, i.e., a set of containers A, B, C, and D and a set of containers E and F are formed. In a case where the container A is selected by a mouse pointer (5702), and the priority order is set, the priority orders are set for the containers A, B, C, and D.

Figure 58:
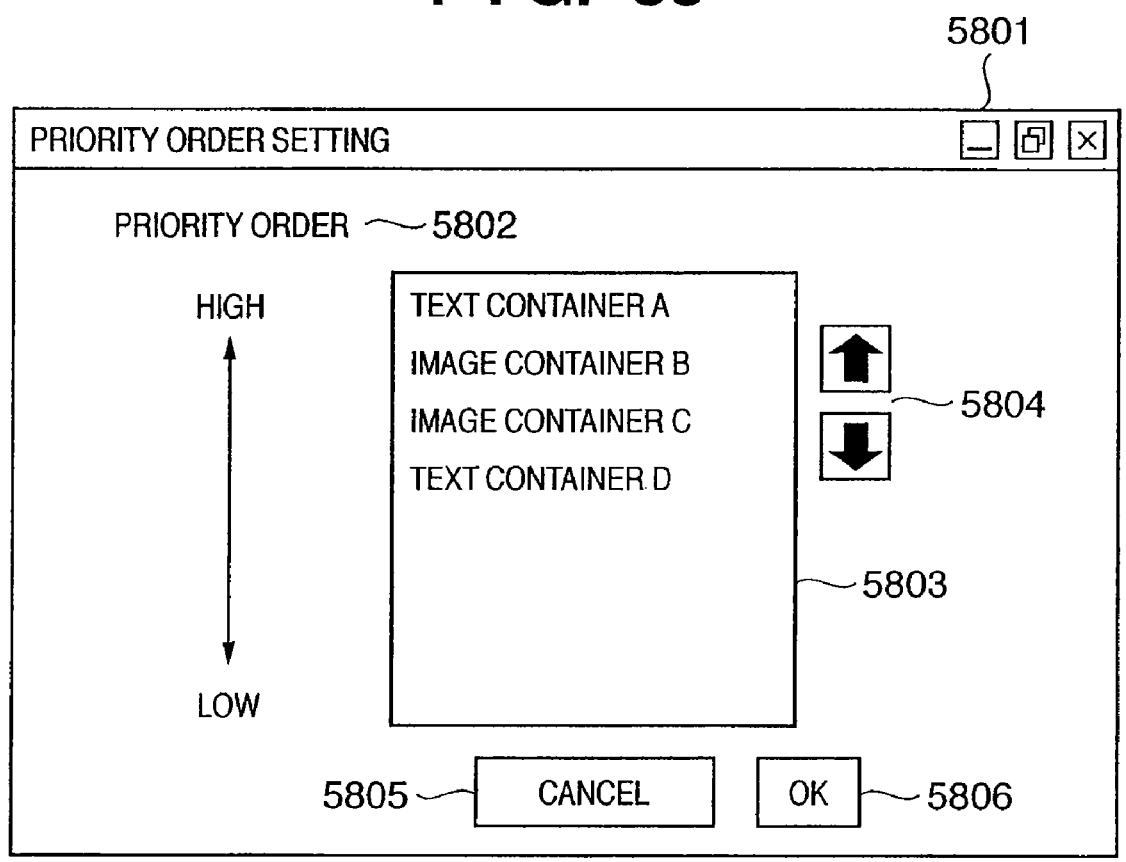
FIG. 58 is a view showing an example of a dialogue user interface (UI) window to set the priority order.

Next, the layout editing application 121 sets the priority orders set by the user for the containers on the priority order setting window (FIG. 58) displayed in step S5601. FIG. 58 is a view showing an example of a dialogue user interface (UI) window to set the priority order. Referring to FIG. 58, reference numeral 5801 denotes a dialogue; 5802, a UI representing the priority order; and 5803, a list box in which containers for which the priority orders are to be set are displayed. All containers recognized as one set in step S5602 are displayed. Arrow buttons 5804 are used to change the priority order. A cancel button 5805 is used to cancel the setting. An OK button 5806 is used to reflect the setting. As indicated by the UI 5802, the priority order of the container displayed in the list box (5803) becomes high to the upper side and low to the lower side. Layout calculation is executed in descending order. Referring to FIG. 58, calculation is done for the text container A, image container B, image container C, and text container D in this order.

Figure 59A:
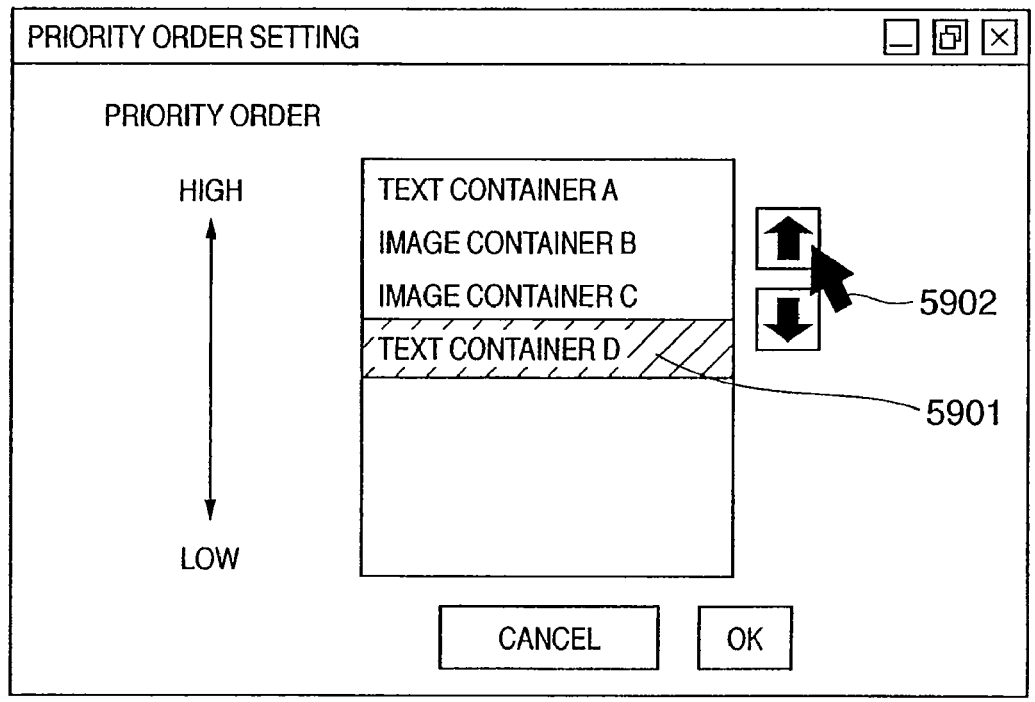
FIGS. 59A and 59B are views for explaining procedures for changing the priority orders to be set for containers.
Figure 59B:
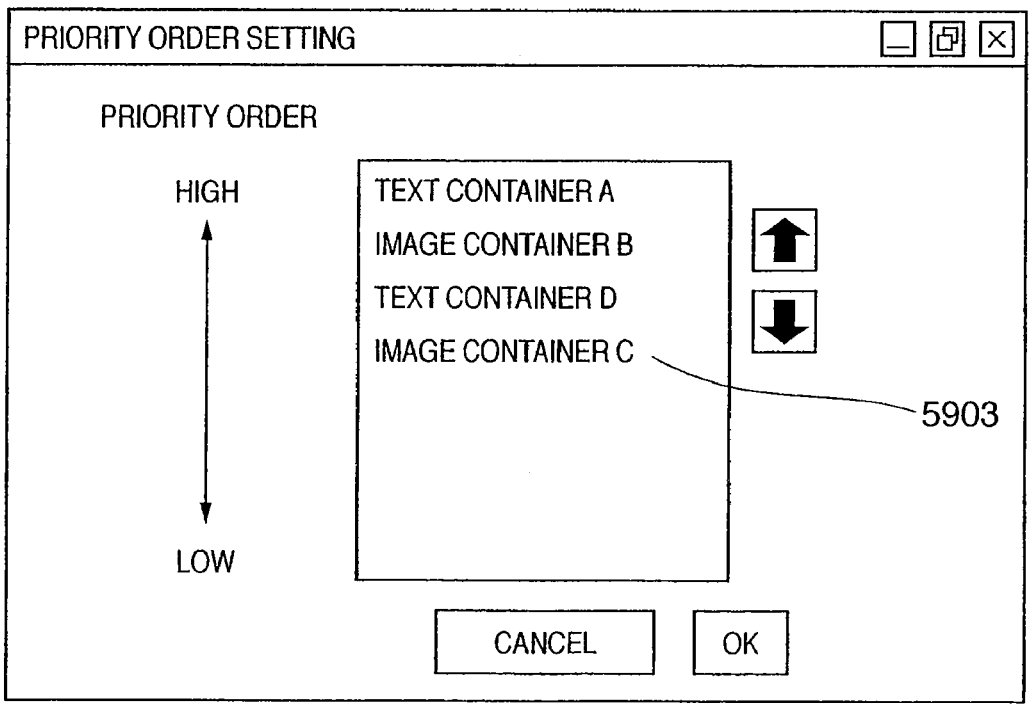

FIGS. 59A and 59B are views for explaining procedures for changing the priority orders to be set for the containers. For example, as indicated by 5901 in FIG. 59A, a container name whose priority order is to be changed is selected by the mouse pointer. To raise the priority order, the up button of an arrow buttons 5902 is clicked on. To lower the priority order, the down button is clicked on. Assume that the text container D is selected, and the operation of raising the priority order is performed. In this case, as shown in FIG. 59B, the priority order of the text container D rises by one, and the priority order of the image container C drops by one. The priority order setting method is not limited to this. In this example, the priority orders are set for the four containers A, B, C, and D.

The priorities of the containers may be designated by numbers, like No. 1, No. 2 . . . . The above processing can be executed under the control of the processor unit 135.

(Display Method)

Figure 61:
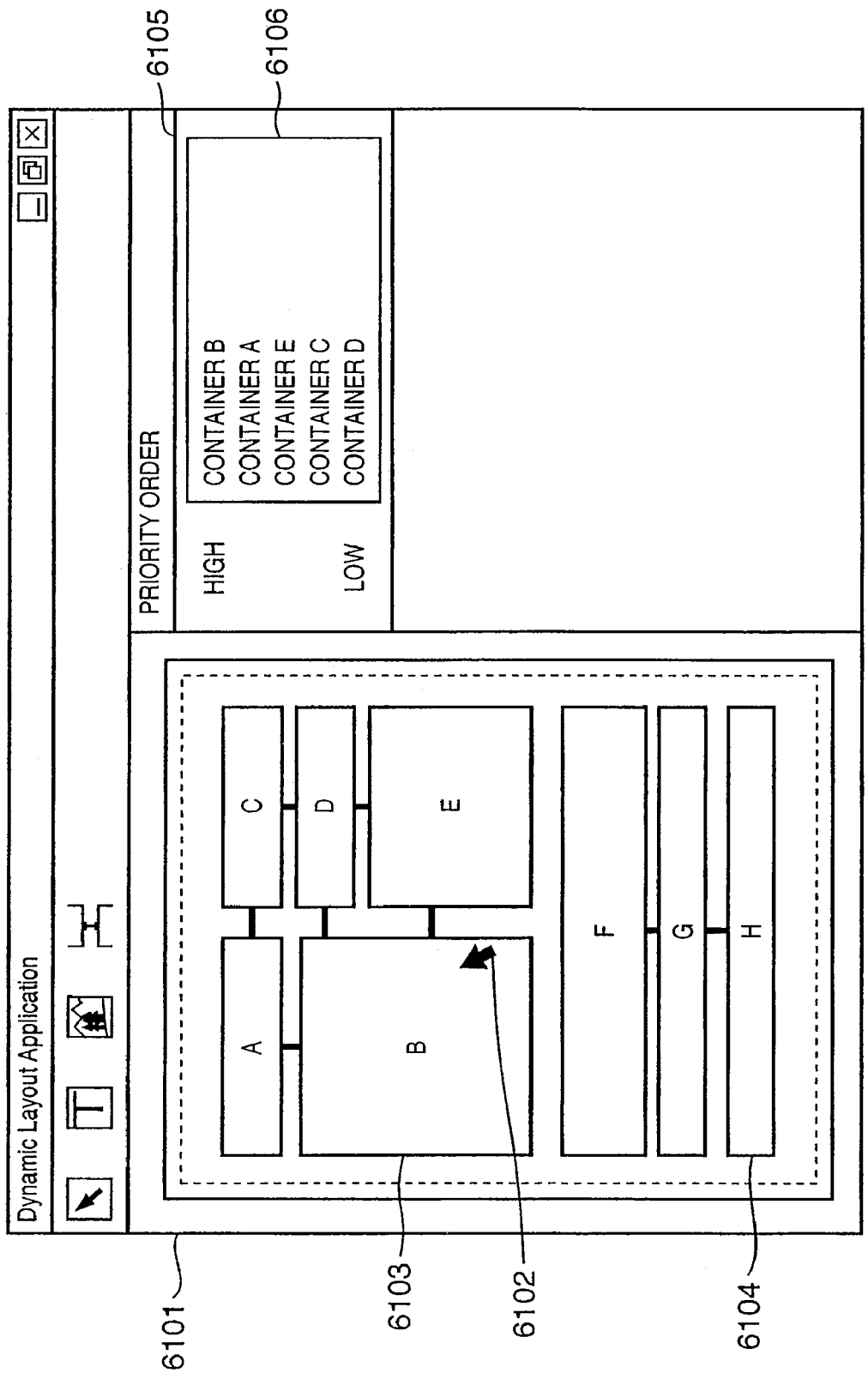
FIG. 61 is a view showing an example of a UI window to present priority order setting to the user.
Figure 62:
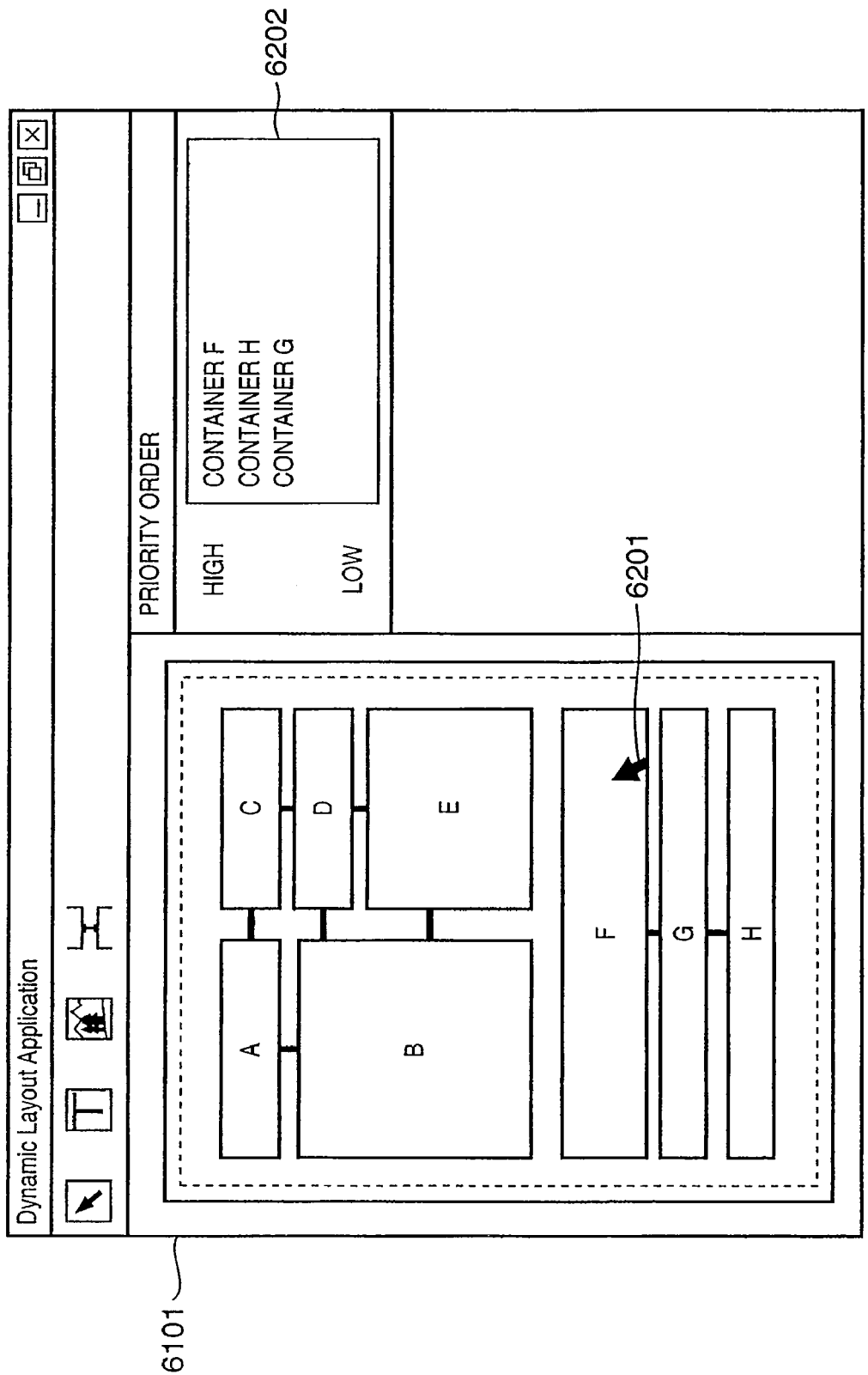
FIG. 62 is a view showing an example of a UI window to present priority order setting to the user.
Figure 63:
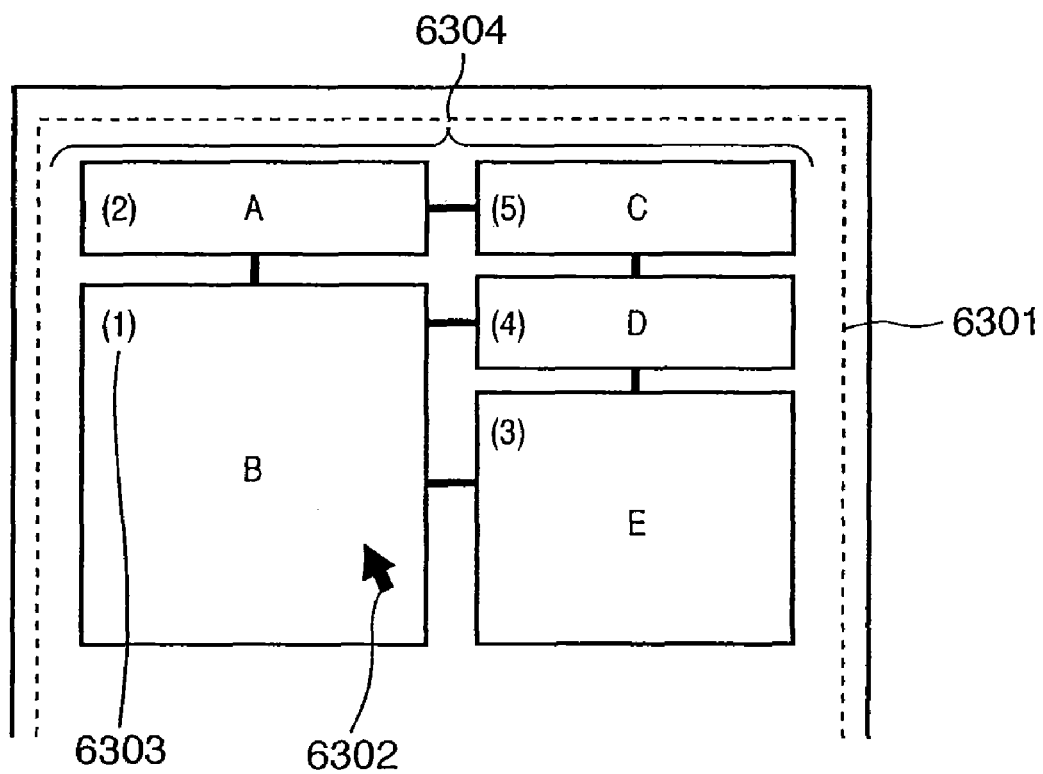
FIG. 63 is a view showing an example of a UI window to present priority order setting to the user.

FIGS. 61, 62, and 63 are views showing examples of a user interface (UI) window to visually present, to the user, the priority orders set for the containers. FIGS. 61 and 62 show a UI window which displays the layout display of containers and the priority order setting in separate windows. Referring to FIGS. 61 and 62, reference numeral 6101 denotes an automatic layout application window. The page area, tool bar, and the like included in this window are the same as in FIG. 3. The remaining components are not illustrated in FIGS. 61 and 62. Reference numeral 6102 denotes a mouse pointer; 6103 and 6104, container sets for which the priority orders are set; 6105, a property palette in which the priority order is displayed; and 6106, a list box in which container names are displayed. Even referring to FIG. 62, reference numeral 6201 denotes a mouse pointer; and 6202, a list box. The priority orders of containers can visually be presented to the user by the property palette 6105 and list boxes 6106 and 6202. In the list boxes 6106 and 6202, the container names are displayed in descending order of priority. As shown in FIG. 61, in a case where the mouse pointer 6102 is placed on the container set (6103), the containers (containers A, B, C, D, and E) in the set are displayed in descending order of priority. In this example, the priority becomes low in the order of containers B, A, E, C, and D. As shown in FIG. 62, in a case where the mouse pointer 6201 is moved to another container set, the display in the list box 6202 is updated, and the containers F, G, and H are displayed in descending order of priority. In this example, the priority becomes low in the order of containers F, H, and G.

FIG. 63 is a view showing an example of a UI window in a form different from the display method shown in FIGS. 61 and 62. Referring to FIG. 63, reference numeral 6301 denotes a page margin which indicates a page area; 6302, a mouse pointer; 6303, a display portion in which the priority order of each container is indicated by a number; and 6304, a container set in which the priority order is set. In the UI window shown in FIG. 63, in a case where the mouse pointer 6302 onto a container, the priority orders set for containers associated with the container are displayed by the numbers 6303. In this example, the mouse pointer is moved onto the container B. Then, the priority orders set for the containers A, C, D, and E associated with the container B are displayed on them. The smaller the number is, the higher the priority order is. That is, (1) indicates the container with the highest priority order, and (5) indicates the container wit the lowest priority order. Referring to FIG. 63, the priority orders are set in the order of containers B, A, E, D, and C. The above processing can be executed under the control of the processor unit 135 and layout editing application.

(Layout Calculation Method)

Figure 64:
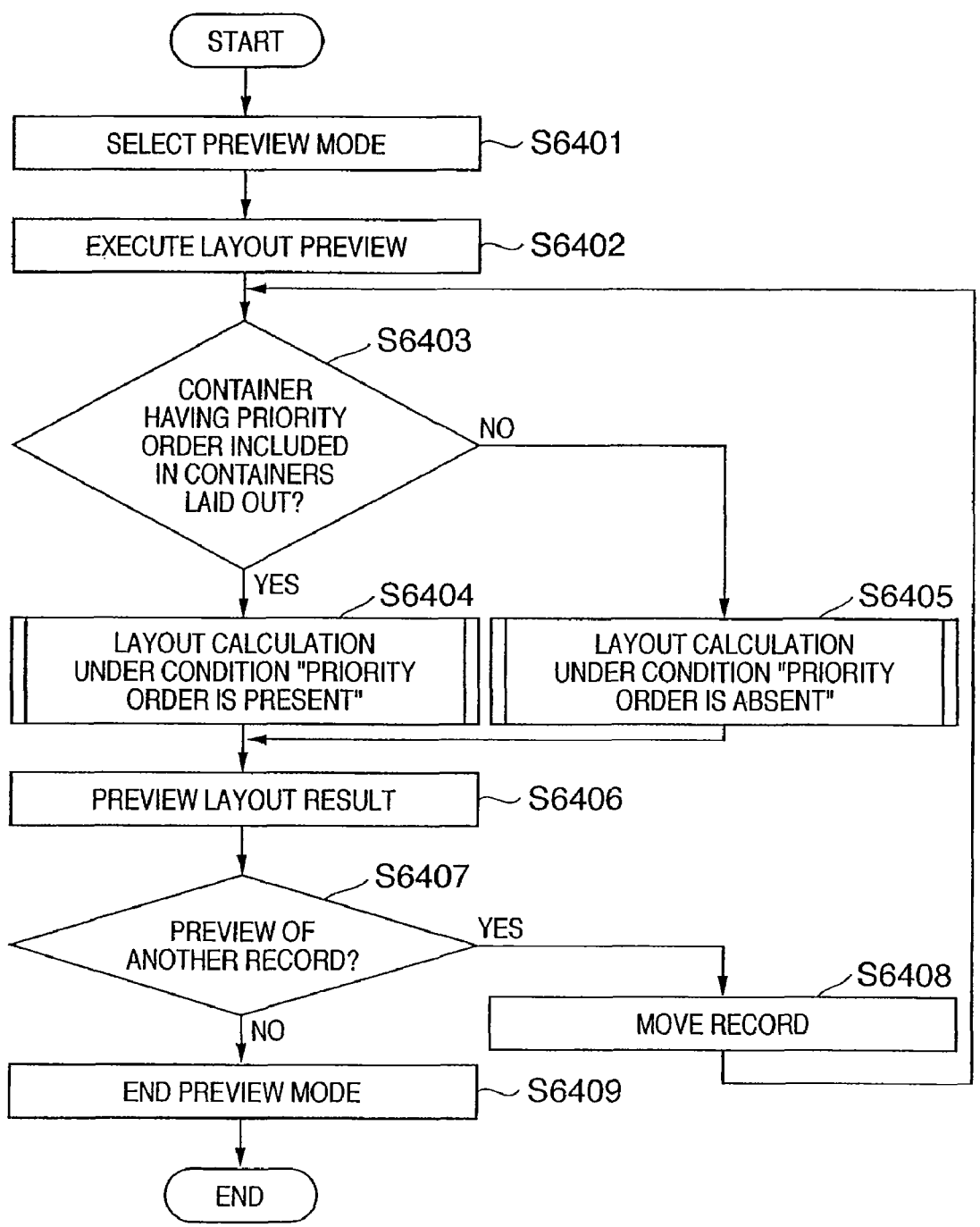
FIG. 64 is a flowchart for explaining the flow of layout calculation processing for containers with the set priority orders.

Calculation processing of a layout including a container having a set priority order will be described next with reference to the flowchart of layout calculation shown in FIG. 64.

First, in step S6401, a preview mode is selected. The automatic layout system has a layout mode in which containers are created, and a layout is created by associating the containers with each other, and a preview mode in which data records are inserted in the created layout, and the layout result after actual record insertion is previewed.

In the preview mode, actual records are inserted, and a layout is calculated in accordance with the above-described priority order. In the preview mode, however, the layout for display is calculated. Even in actual printing, the layout is calculated by inserting records. The calculation method is the same as in the preview mode. In a case where the preview mode is activated in step S6401, a record to be previewed is selected for the data source stored in the database 119, and preview is executed (S6402).

In a case where the record is selected, and preview is executed, the layout editing application 121 executes calculation to lay out the record. At this time, it is checked whether the above-described priority order is set for a container (S6403). If it is determined in step S6403 that a container having a set priority order is present (YES in step S6403), the layout is calculated under a condition "priority order is present" (S6404). The layout calculation method under the condition "priority order is present" will be described later in detail.

If it is determined in step S6403 that no container having a set priority order is present (NO in step S6403), the processing advances to step S6405. The layout editing application 121 calculates the layout under a condition "priority order is absent".

In step S6406, the layout editing application 121 displays the result obtained by executing layout calculation under the condition "priority order is present" (S6404) or the result obtained by executing layout calculation under the condition "priority order is absent" (S6405). In step S6407, it is determined whether to preview another record. If it is determined that no preview of another record need be executed (NO in step S6407), the preview mode is ended (S6409). If another record is to be previewed (YES in step S6407), another record is selected, layout calculation is executed again (S6404 or S6405), and preview is done (S6404).

In layout calculation not in the preview mode but in the print mode, layout calculation is done sequentially for all records to be printed. Hence, the processing in steps S6407 and S6408 of moving the record and executing layout calculation is unnecessary in layout calculation in the print mode. In a case where printing is ended for all records, the processing is ended.

(Details of Layout Calculation Method for Container Having Set Priority Order)

The flow of layout calculation processing in a case where layout priority orders are set for containers will be described with reference to the flowchart shown in FIG. 65. FIGS. 66 and 67A to 67C are views showing display examples of a UI window presented to the user in accordance with the layout calculation processing.

Figure 66:
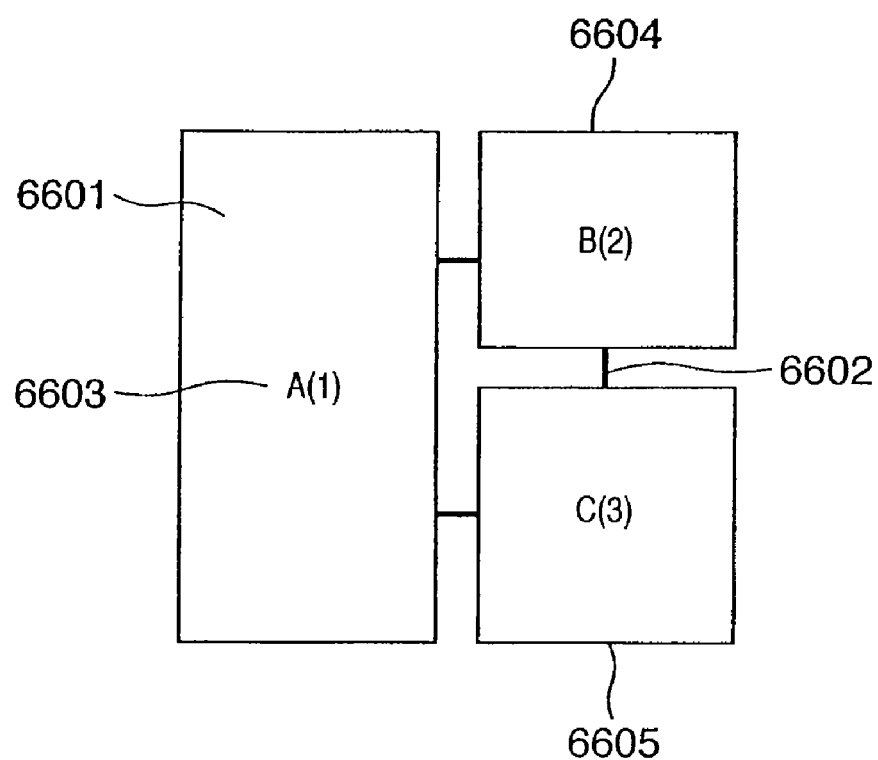
FIG. 66 is a view showing an example of a UI window displayed in layout calculation processing shown in FIG. 65.
Figure 67A:
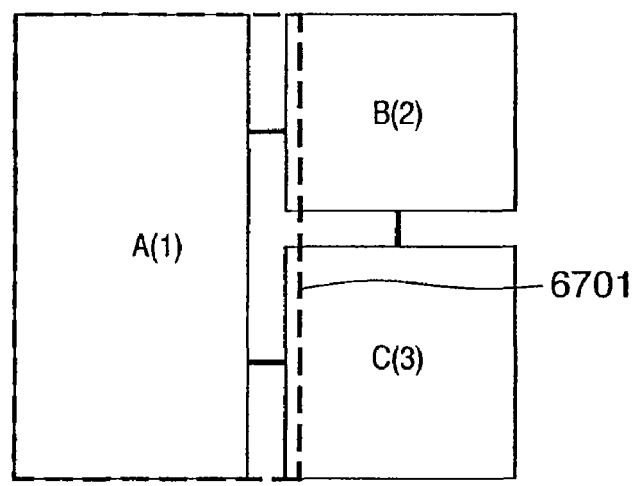
FIGS. 67A to 67C are views showing examples of a UI window displayed in layout calculation processing shown in FIG. 65.
Figure 67B:
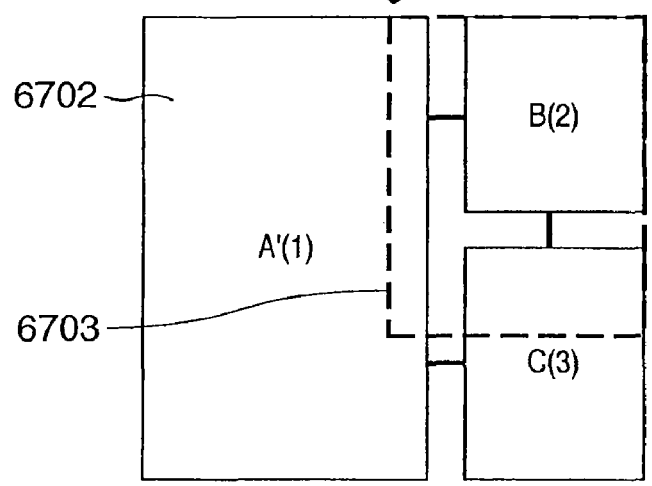
Figure 67C:
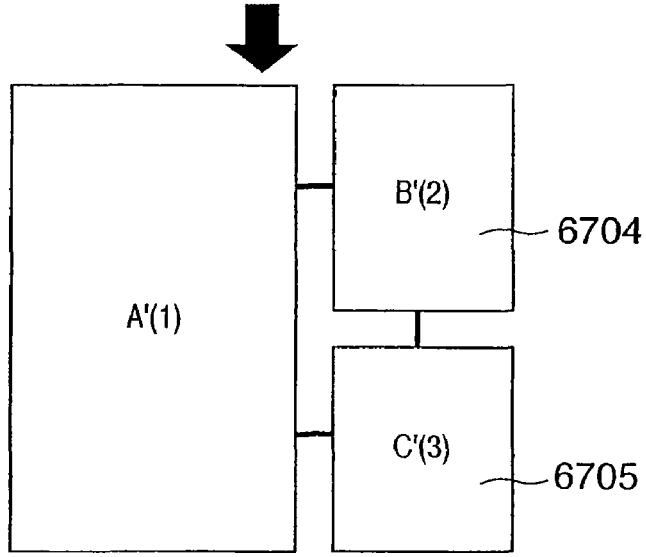

Referring to FIG. 66, reference numeral 6601 denotes a container A; 6603, a priority order set for the container A; and 6602, a link set between a container B (6604) and a container C (6605). The smaller the number is, the higher the priority order 6603 is. In this example, layout calculation is executed in the order of containers A, B, and C in accordance with the priority orders (1), (2), and (3). A region 6701 indicated by a broken line in FIG. 67A represents the size of the content to be inserted in the container A. Reference numeral 6702 denotes a container A' after the layout calculation of the container A. A region 6703 indicated by a broken line represents the size of the content to be inserted in the container B. Reference numeral 6704 denotes a container B' after the layout calculation of the container B; and 6605, a container C' after the layout calculation of the container C.

Figure 65:
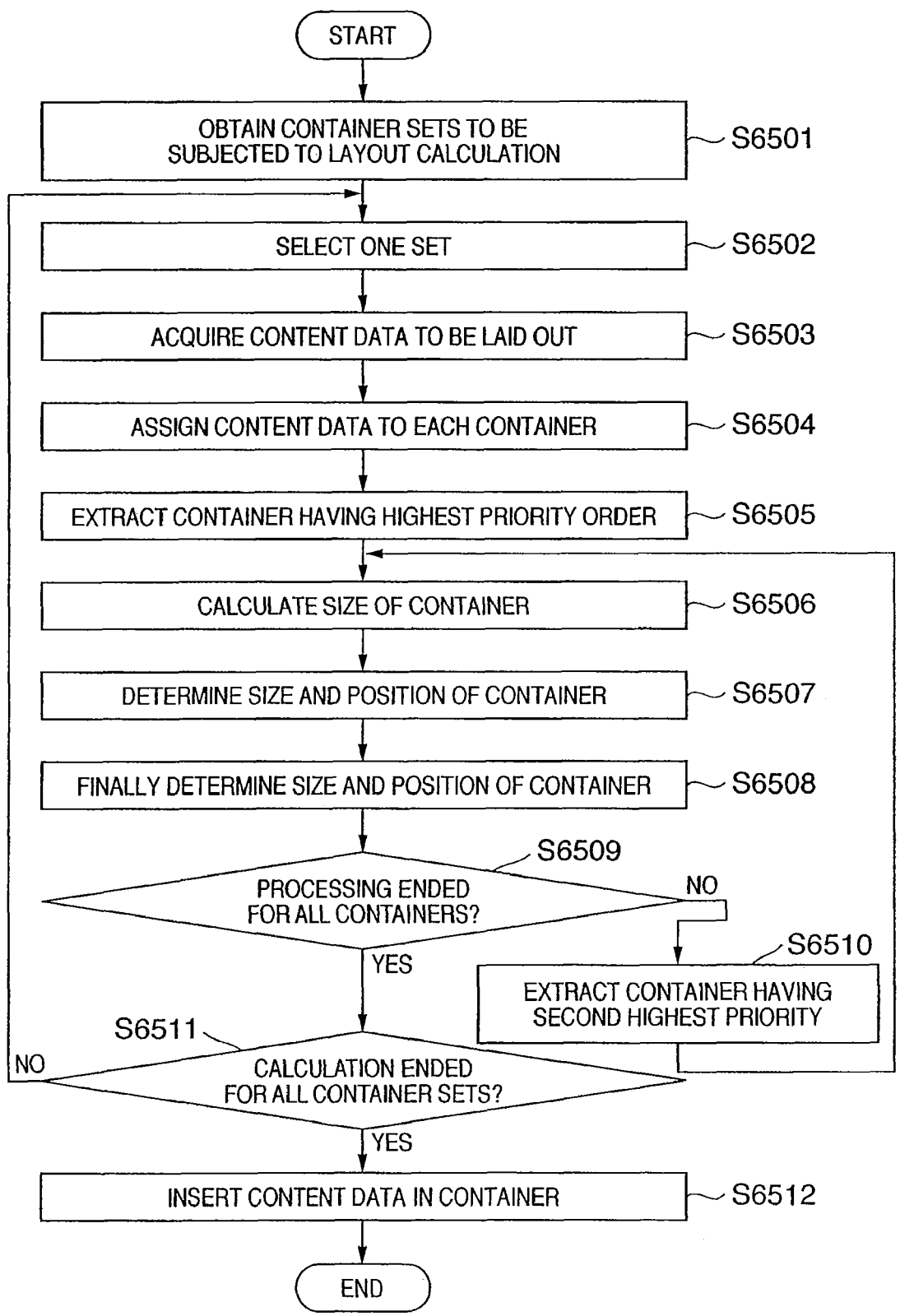
FIG. 65 is a flowchart for explaining the flow of layout calculation processing in a case where the layout priority orders are set for containers.

First, in step S6501 in FIG. 65, container sets to be subjected to layout calculation are obtained. A set for calculation is selected (S6502). In this case, the container set corresponds to the containers A, B, and C in FIG. 66, which are associated with each other by the links 6602 between them.

The layout editing application 121 acquires content data to be laid out from the database 119 (S6503). The content data described here contains the contents, size, and amount of contents. The processor unit 135 assigns one of the content data acquired from the database 119 through the I/O interface 138 to a container in which the content is to be inserted (S6504).

In step S6505, the layout editing application 121 extracts the container with the highest priority order. In FIG. 67A, since the priority order of the container A is the highest, the container A is extracted. Layout calculation is executed for the extracted container A on the basis of the content data assigned in step S6504 (S6506). Reference numeral 6701 in FIG. 67A denotes the region corresponding to the size of the content data assigned to the container A. The calculation method can affect the containers (B and C) with lower priority orders than the container A as the current calculation target unless a violation of rules occurs. Instead, the calculation method cannot affect any container (e.g., the container A having a higher priority order in a case where viewed from the container B) with a higher priority order than the container as the layout calculation target. In the example shown in FIG. 67A, the layout calculation of the container A can be executed independently of the container sizes of the containers B and C which have lower priority orders than the container A. The container B is affected by the layout calculation result of the container A. The layout calculation result of the container B can affect the container C having a lower priority order. The container C having the lowest priority order undergoes layout calculation while being affected by the layout calculation results of the containers A and B.

The processing advances to step S6507. The layout editing application 121 determines the size and position of the container on the basis of the result of layout calculation in step S6506. The size and position of the container determined in step S6507 are finally determined (S6508). Reference numeral 6702 in FIG. 67B denotes the container after the calculation of the container A is ended, and the size and position are finally determined.

In step S6509, the layout editing application 121 confirms whether calculation is ended for all the containers A, B, and C in the selected set. If calculation is not ended for all the containers A, B, and C (NO in step S6509), the container having the highest priority order next to the calculated container is extracted (S6510). The processing in steps S6506 to S6508 is executed for the container. In the state shown in FIG. 67B, after calculation of the container A is ended, processing for determining the size and position is executed for the container B having the second highest priority order. Reference numeral 6703 in FIG. 67B denotes the region corresponding to the size (content size) of content data assigned to the container B. Layout calculation of the container B is executed on the basis of the content size. The priority order of the container B is lower than that of the container A. Since the size and position of the container A are finally determined in the preceding step, the calculation result of the container B cannot affect the layout result of the container A.

Hence, a constraint is applied to the layout calculation of the container B so that its container size must be calculated without affecting the container A. As indicated by 6703 in FIG. 67B, the size of the content to be actually inserted in the container B overlaps the container A'. Hence, calculation is done to make the layout of the container B smaller than the actual size such that the calculation result does not overlap the finally determined container A'. Reference numeral 6704 in FIG. 67C denotes the container B' after the calculation of the container B is ended, and the size and position are finally determined.

After the layout calculation of the container B is ended, the container C having a priority order lower than the container B is extracted (step S6510 in FIG. 65). Layout calculation of the container C is executed (S6506 to S6508). In the example shown in FIGS. 67A to 67C, the priority order of the container C is lowest in the set. The sizes and positions of all of the remaining containers (A and B) having higher priority orders are finally determined. For this reason, the layout calculation of the container C must be executed without making the layout calculation result affect the remaining containers (A and B). Hence, in a case where the container having the lowest priority order is extracted in step S6510, its size and position are already finally determined. Although calculation is done even for the container having the lowest priority order in steps S6506 to S6508, the layout of the container has already been finally determined in fact in accordance with the calculation results of the remaining containers having higher priority orders. In a case where layout calculation is ended for all containers in the set (YES in step S6509), it is confirmed whether an uncalculated set remains in the page (S6511). If an uncalculated set remains (NO in step S6511), the processing returns to step S6502. The layout editing application 121 executes layout calculation in accordance with the above-described procedures. If calculation is ended for all sets, the layout editing application 121 loads the contents of variable data for the database, inserts the contents in the calculated containers (S6512), and ends the processing. The above processing can be executed under the control of the processor unit 135 and layout editing application 121 (user interface module 103 and layout engine module 105).

(Automatic Link Setting)

Figure 12A:
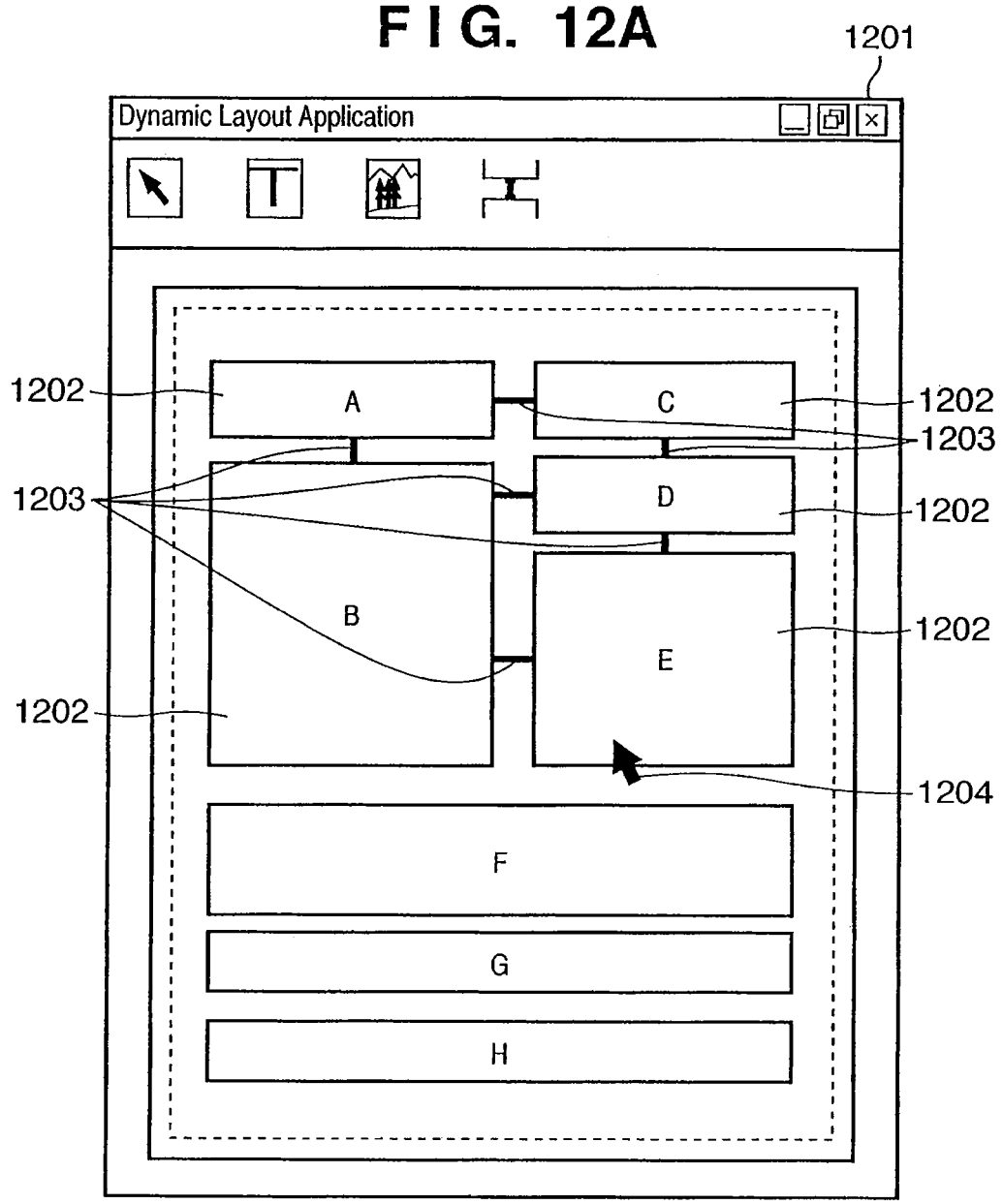
FIGS. 12A and 12B are views showing a UI window related to automatic link setting.
Figure 12B:
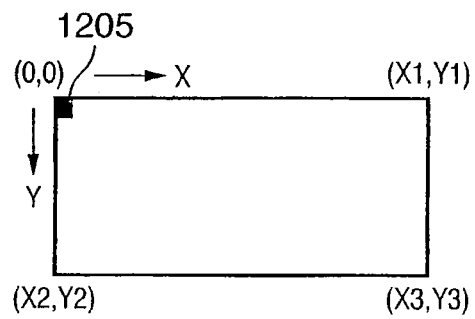

The contents of automatic link setting as a characteristic feature of the present invention will be described next. FIG. 12A is a view showing an example of a UI window related to automatic link setting. Reference numeral 1201 denotes an application window; 1202, containers; 1203, links set between the containers; and 1204, a mouse pointer. This embodiment includes a description of a container position. An origin 1205 is set at the upper left corner of the document. The coordinates are defined to increase to the right side along the X direction and to the lower side along the Y direction (FIG. 12B). The position information of a container can be described by the position coordinates of a corner of the container ((X1,Y1), (X2,Y2), (X3,Y3), or the like). The positional relationship between a plurality of containers can be obtained as a relative positional relationship by obtaining the position coordinate information of a reference container and that of another container.

Figure 16:
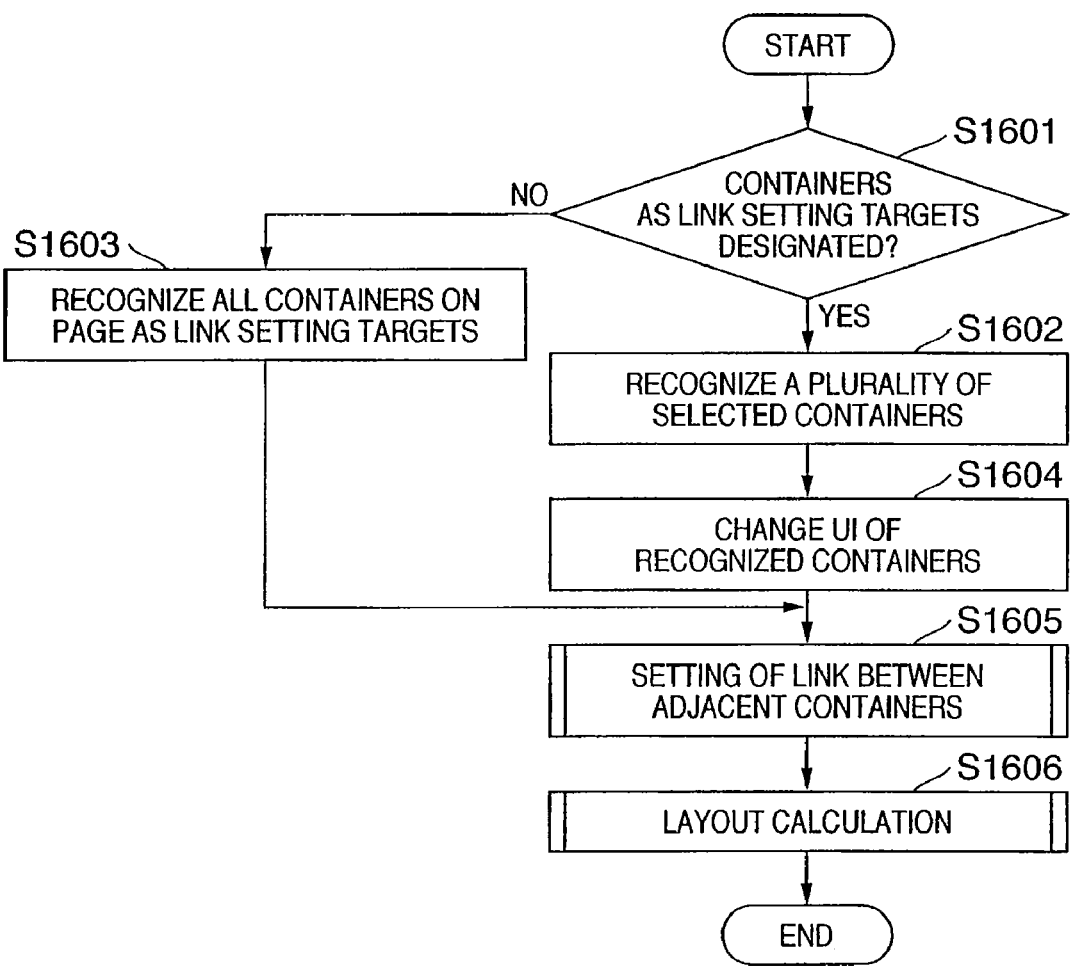
FIG. 16 is a flowchart for explaining the overall flow of automatic link setting.

FIG. 16 is a flowchart for explaining the overall flow of automatic link setting. First, in step S1601, the layout editing application 121 determines whether containers as batch link setting targets are designated. Containers can arbitrarily set by the user. If no container is designated (NO in step S1601), all containers on the page are selected (S1603). In a case where the layout editing application 121 determines that a plurality of containers are designated (YES in step S1601), the processing advances to step S1602. The processor unit 135 recognizes the plurality of containers selected by the user (S1602).

Figure 13:
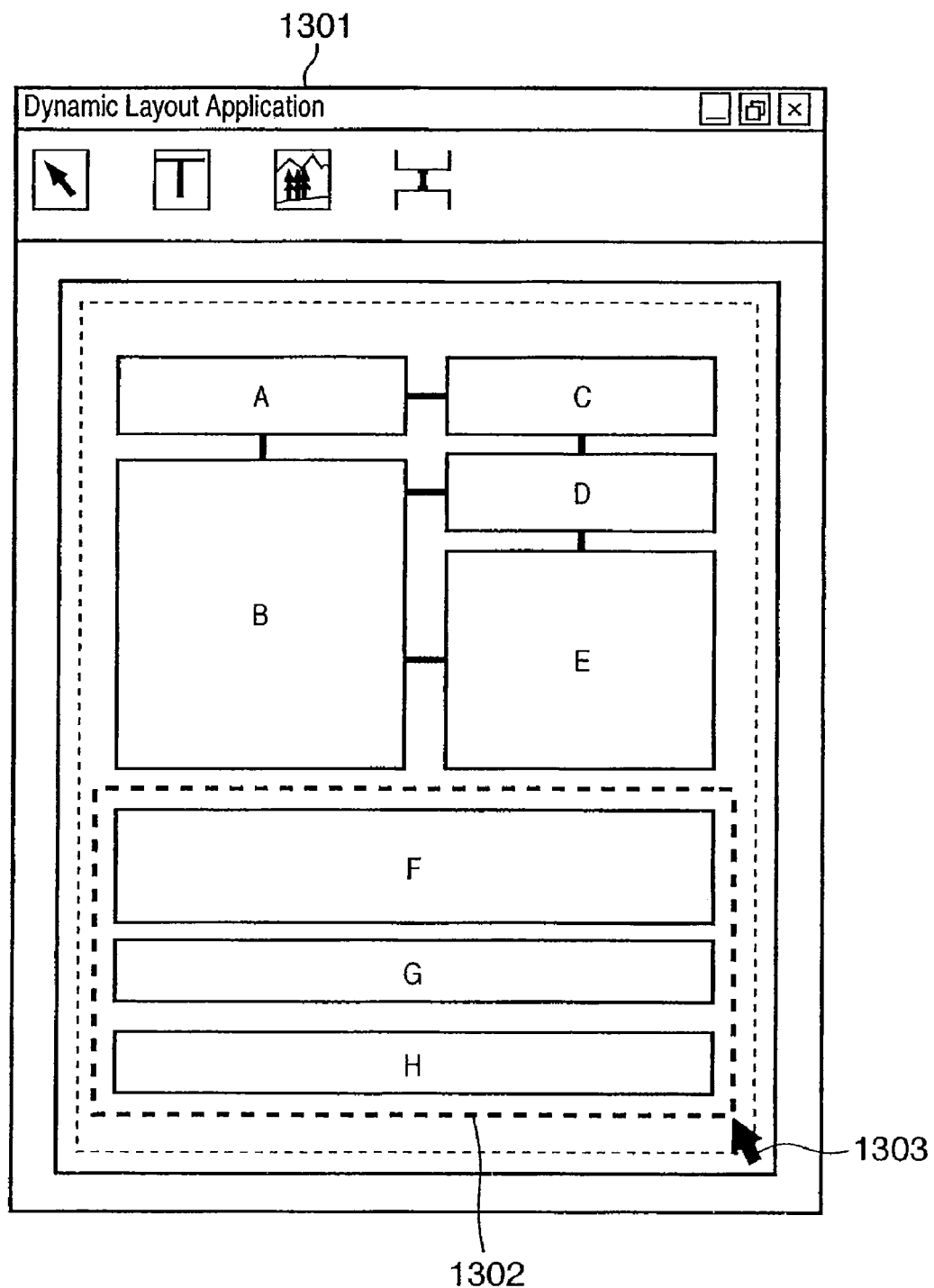
FIG. 13 is a view showing an example of the UI window in which a plurality of containers F, G, and H are selected.

The UI window is changed to visually present the recognized containers to the user under the control of the processor unit 135 and user interface module 103 (S1604). FIG. 13 is a view showing an example of the UI window in which the plurality of containers F, G, and H are selected. In a case where a rectangle 1302 is dragged by an instruction input means such as a mouse pointer 1303, and the plurality of containers are put in the rectangle 1302, the plurality of containers in the rectangle can be selected. The method of selecting a plurality of containers is not limited to this. Each container to be selected may be dragged and designated by the mouse pointer 1303.

Figure 14A:
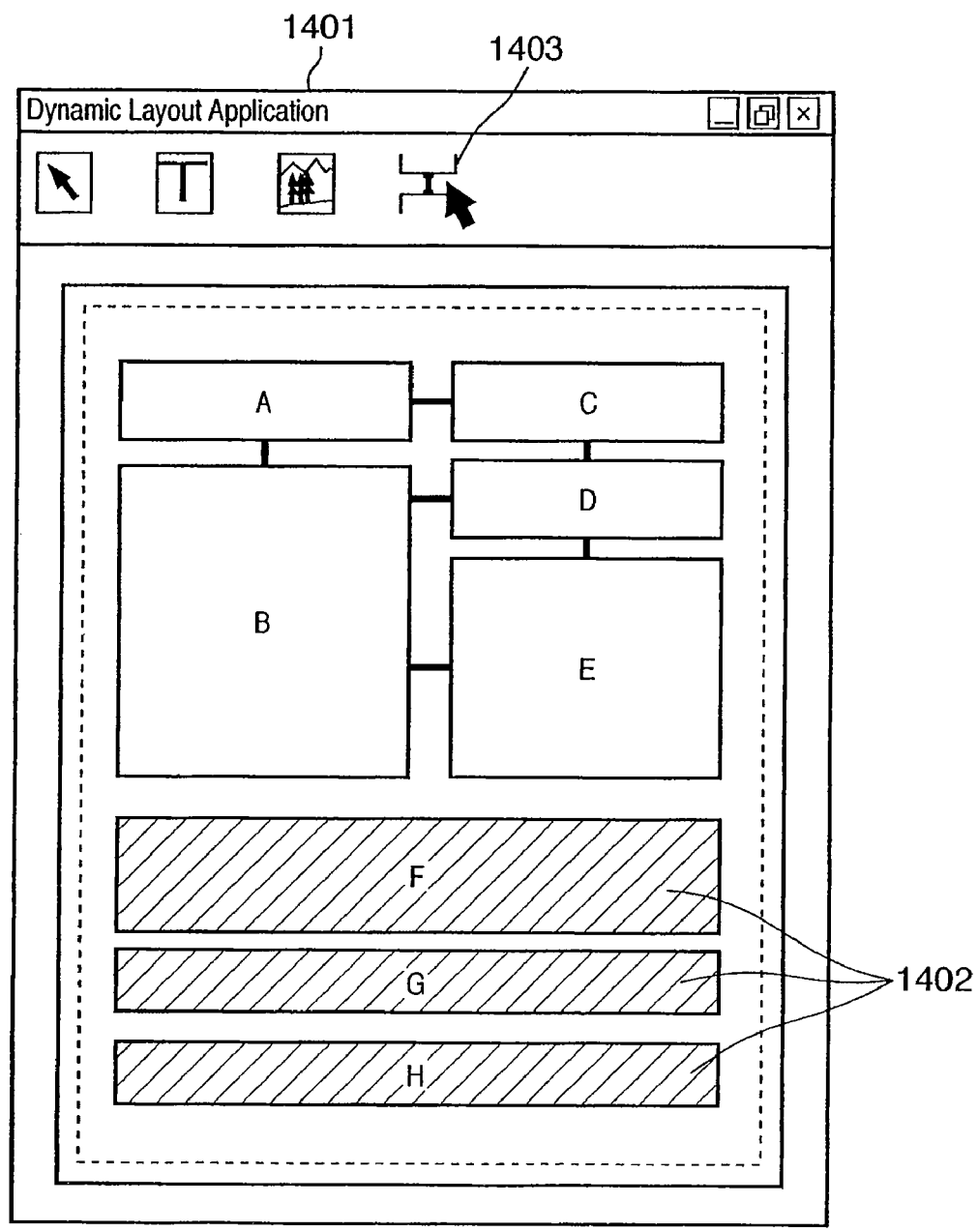
FIG. 14A is a view showing a state in which the UI window is switched to show the user that the containers F, G, and H are selected by the operation described in FIG. 13.

FIG. 14A is a view showing a state in which the UI window is switched to show the user that the containers F, G, and H are selected by the operation described in FIG. 13. Referring to FIG. 14A, indicators 1402 (hatching in the example in FIG. 14A) representing that the containers F, G, and H are selected are displayed.

Figure 14B:
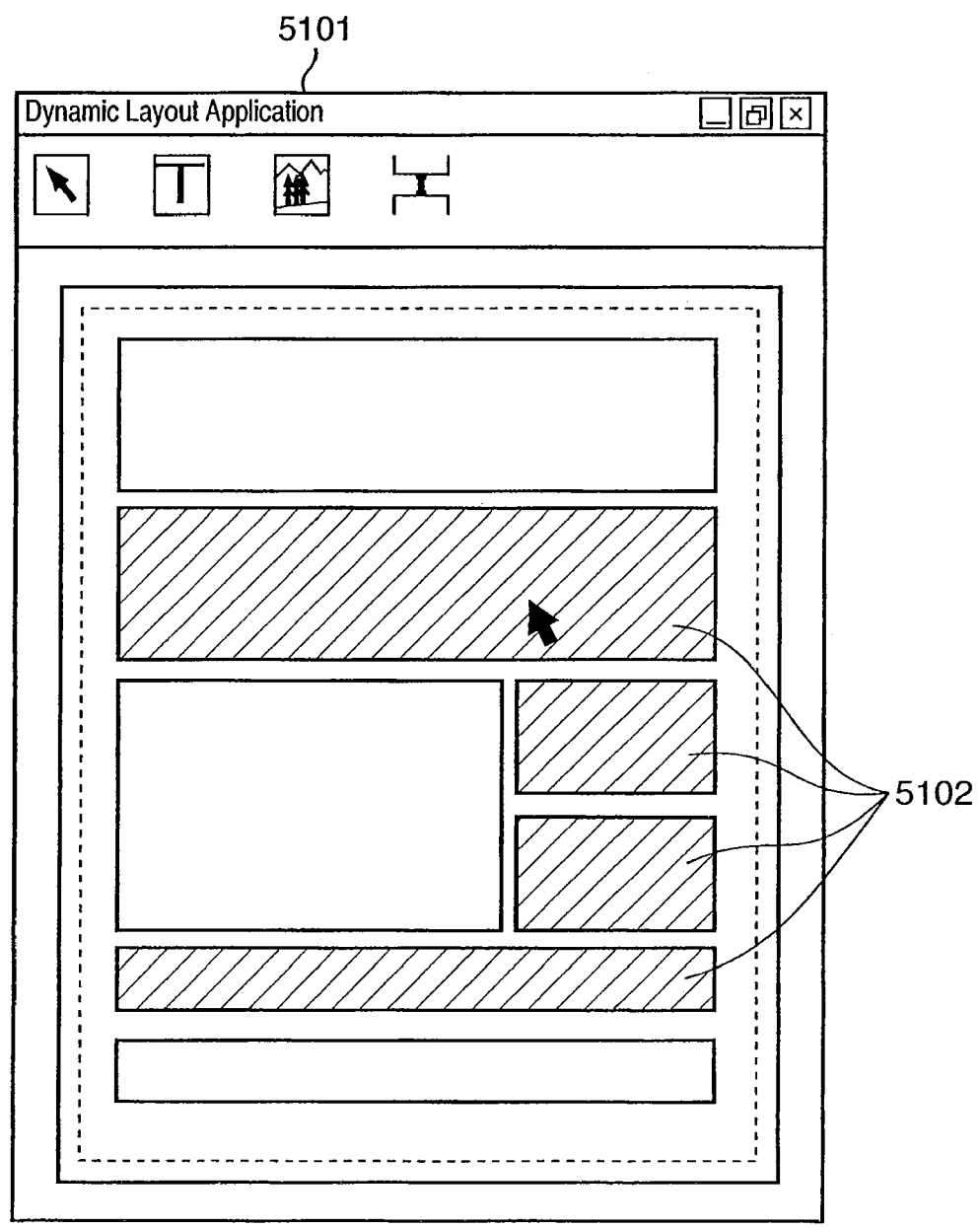
FIG. 14B is a view showing an example of selection of a plurality of containers by clicking on (designating) the containers by a mouse pointer 1303.

FIG. 14B is a view showing an example of selection of a plurality of containers not by designating the containers by using a rectangular region as in FIG. 14A but by clicking on (designating) the containers by the mouse pointer 1303. In this method, a plurality of containers in a layout which impedes the selection by using the rectangular region described in FIG. 14A (a layout partially including a container not to be selected) can be selected.

As in FIG. 14A, indicators 5102 which represent that the containers are selected are displayed.

Figure 15:
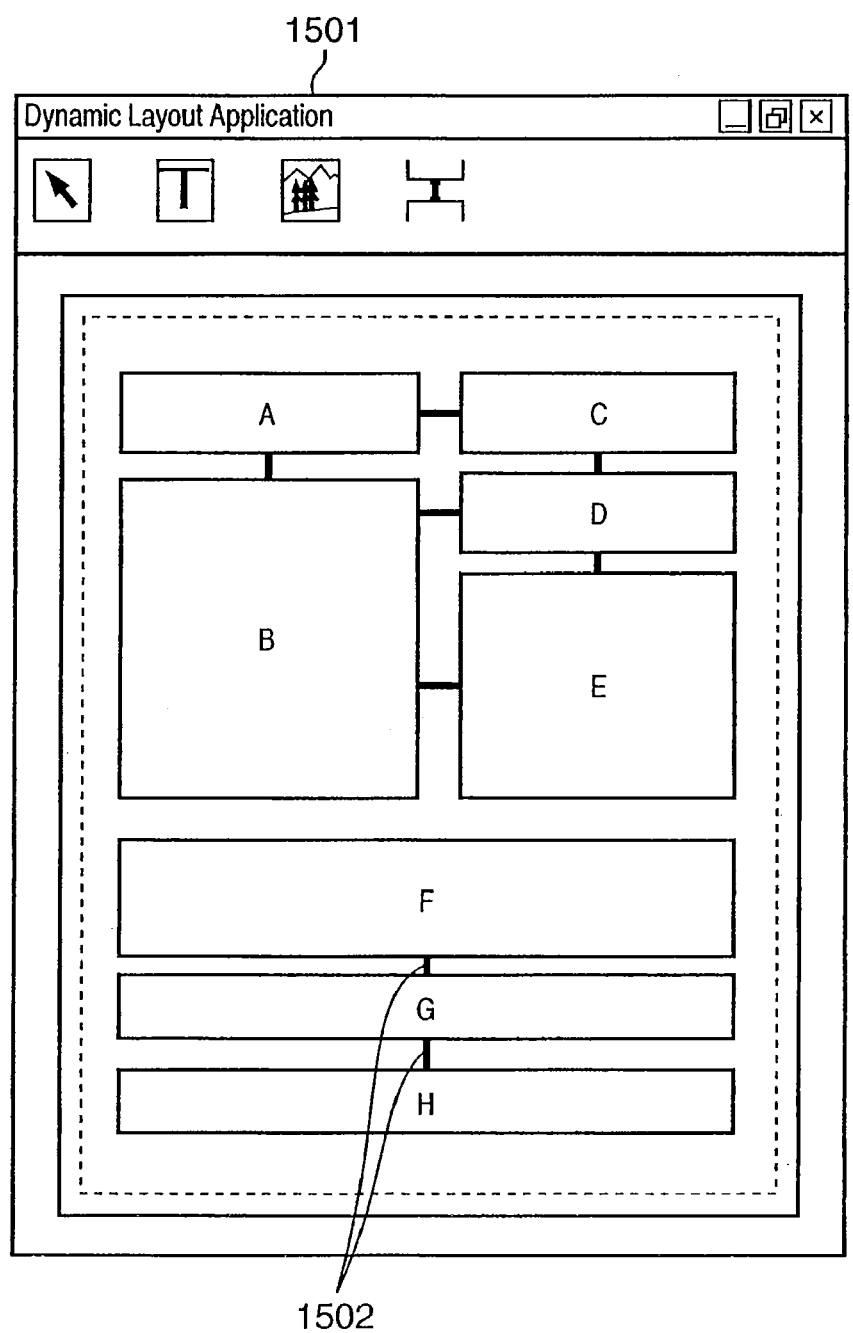
FIG. 15 is a view showing a state in which links are set at once between the plurality of selected containers F, G, and H.

Referring back to FIG. 16, in step S1605, the layout editing application 121 sets links between the plurality of selected containers at once. This step also includes a step of changing the setting of containers such that the layout does not violate the rules set for the links upon batch link setting. In the state in which the plurality of containers are selected, in a case where a link tool button 1403 shown in FIG. 14A is clicked on by the mouse pointer, a link creation direction UI as shown in FIG. 73 is displayed. In this embodiment, the mode for setting links at once includes three setting direction modes. The first link setting direction mode is "set links in X direction" 7302. In a case where the layout editing application 121 recognizes that this mode is selected by the user, links are set in the X direction at once. The second link setting direction mode is "set links in Y direction" 7303. In a case where the layout editing application 121 recognizes that the mode 7303 is selected by the user, links are set in the Y direction at once. The third link setting direction mode is "set links in X and Y directions" 7304. In a case where the layout editing application 121 recognizes that the mode 7304 is selected by the user, links are set in the X and Y directions at once. In this embodiment, X direction is horizontal direction and Y direction is vertical direction. A dialogue may be displayed to make the user confirm the presence/absence of batch link setting. In this case, batch link setting is done in a case where confirmation input is done by the user. FIG. 15 is a view showing a state in which links are set at once between the plurality of selected containers F, G, and H. By the batch link setting, links 1502 are set between the containers F, G, and H. The contents of link setting will be described later in detail. In this processing, next, variable data is loaded and inserted in each container. If the layout editing is being executed during preview processing for obtaining a preview of the automatic layout result, layout calculation is executed in consideration of the state of the set links 1502 (S1606). The layout calculation is the same as that described in FIGS. 9 and 10A to 10C, and a description thereof will be omitted. If it is simple basic layout editing, and no preview display request or print request is input, the processing in step S1606 is not executed.

(Batch Link Creation)

Figure 17:
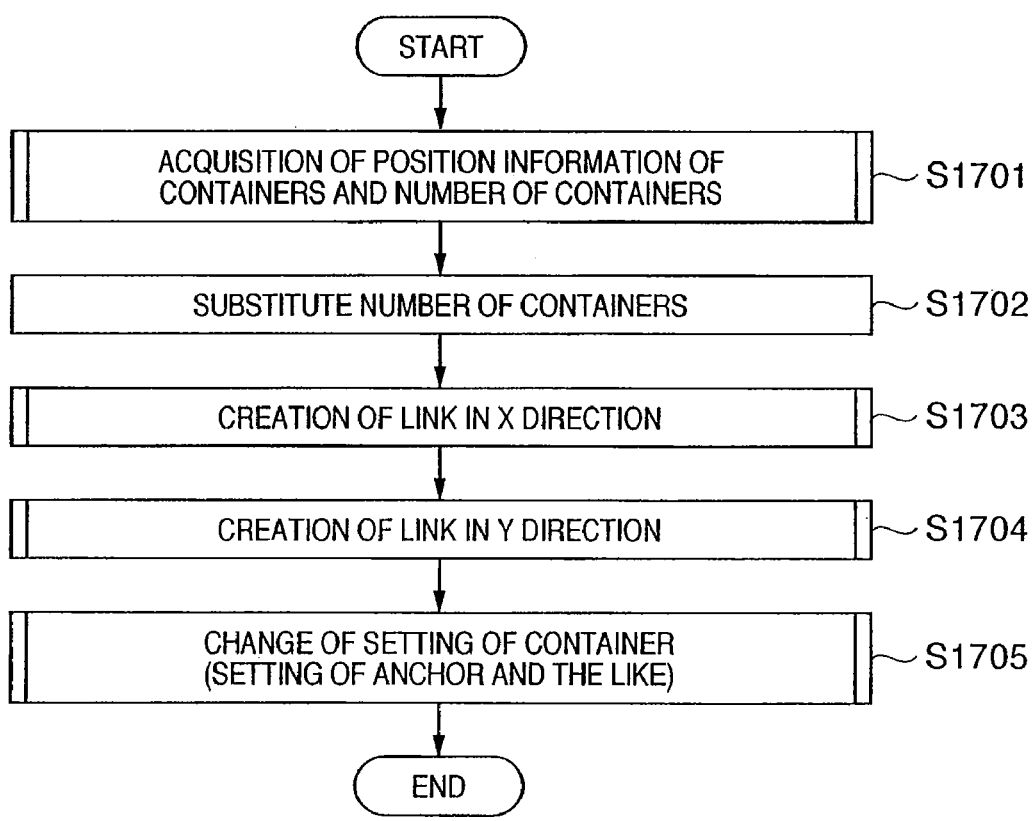
FIG. 17 is a flowchart for explaining the outline of the flow of batch link creation processing.

FIG. 17 is a flowchart for explaining the outline of the flow of batch link creation processing. The contents of processing will be described below by exemplifying selection of a plurality of containers by the rectangular region. However, the processing can be executed by the same method independently of whether all containers in the page are selected or a plurality of containers are selected individually by the mouse pointer.

In step S1701, the layout editing application 121 acquires the position information of the containers selected by the user, which are recognized in step S1602 in FIG. 16, and the number (ConNum) of containers. The layout editing application 121 stores the number of selected containers in the storage device 139 (140 or 141) or memory unit 136 (S1702). In a case where containers are laid out at positions adjacent in the X direction, the layout editing application 121 creates links in the X direction (S1703). In a case where containers are laid out at positions adjacent in the Y direction, the layout editing application 121 creates links in the Y direction (S1704). Finally, the layout editing application 121 automatically changes setting of containers (setting of anchors and the like) such that the created links do not violate the rules related to the layout of the containers (S1705).

The processing in the respective steps (S1701 to S1705) will be described below in detail with reference to the drawings from FIG. 18. The processing related to batch link creation can be executed on the basis of the layout editing application 121 under the whole control of the processor unit 135.

(Acquisition of Position Information of Container)

FIG. 18 is a flowchart for explaining the flow of processing for acquiring the position information of a container. First, the layout editing application 121 arbitrarily sets an order for the selected containers (S1801). In this processing, the order is set to acquire the position information of all containers. Next, the layout editing application 121 substitutes 1 into a variable i to initialize it (S1802). The variable i corresponds to the number set for each container. The containers are made to correspond to each other by the variable i. For the ith container, the processor unit 135 first acquires the X-direction position information of the selected container (S1803) and then the Y-direction position information (S1804). The processor unit 135 stores the acquired information in the storage device 139 (140 or 141) or memory unit 136 (S1805). The layout editing application 121 increments the variable i by one. The X-direction position information of the next container is acquired (S1803), and then, the Y-direction position information is acquired (S1804). The data is stored (S1805). The above-described processing is repeated until data acquisition and storage are ended for all the selected containers. In a case where the processing is ended for all the selected containers (YES in step S1807), the processing is ended.

(Link Creation)

Figure 19A:
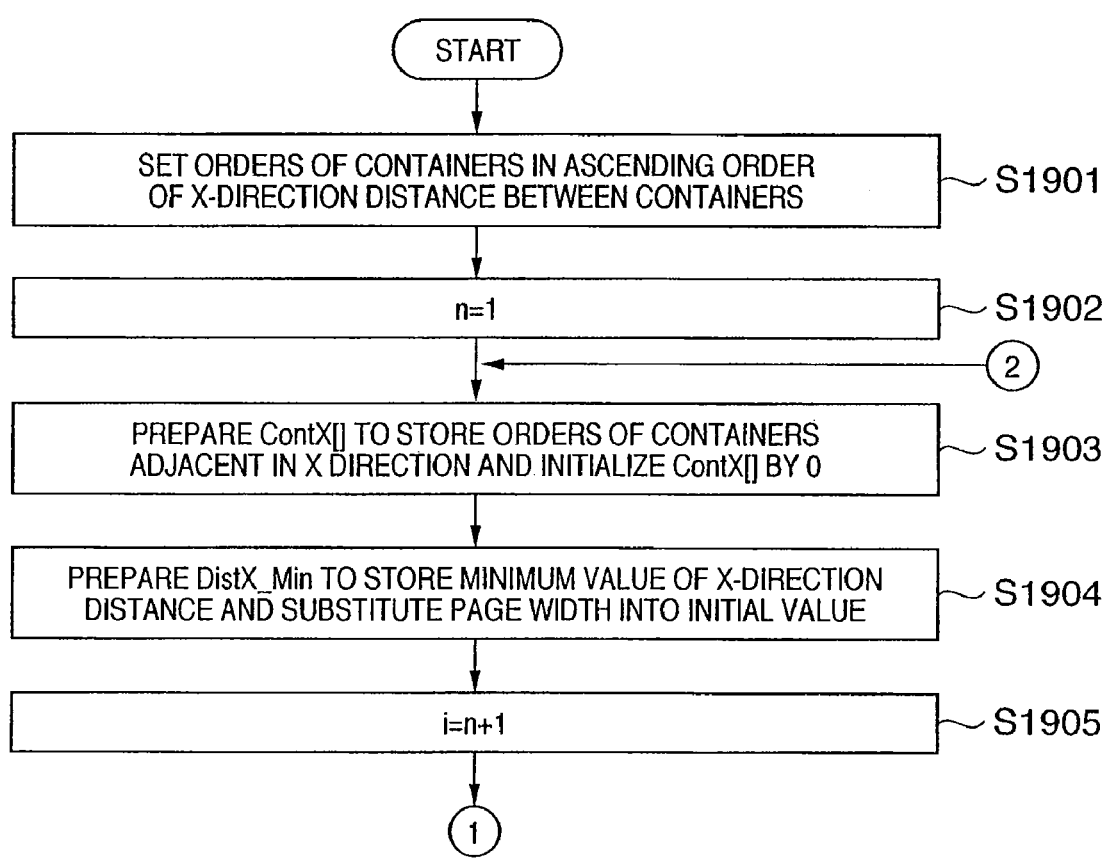
FIG. 19A is a flowchart for explaining the flow of processing for creating a link in the X direction.
Figure 19B:
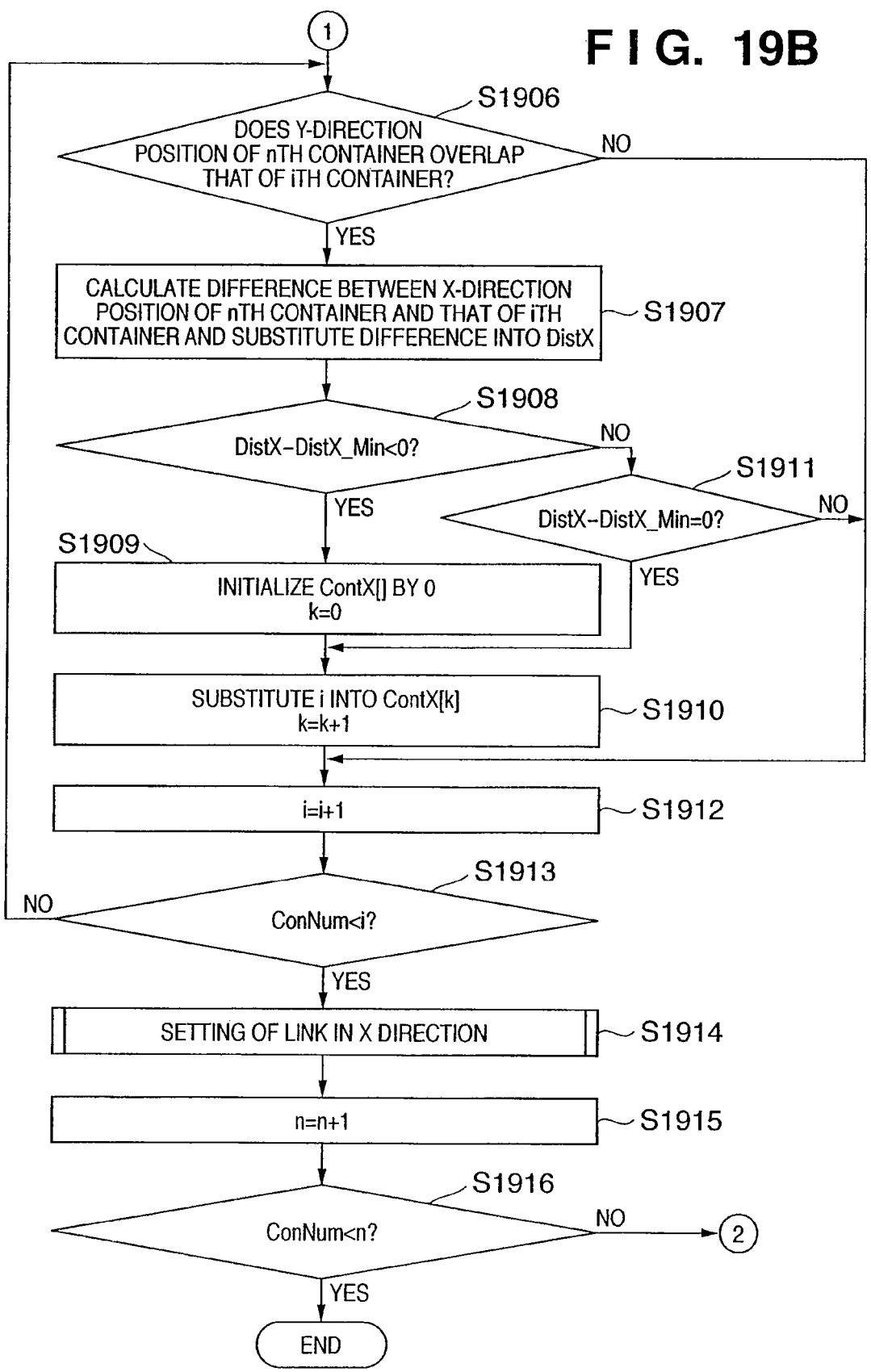
FIG. 19B is a flowchart for explaining the flow of processing for creating a link in the X direction.

FIGS. 19A and 19B are flowcharts for explaining the flow of processing for creating a link in the X direction. In link creation, adjacent containers are extracted, and a link is set between them. Adjacent containers means containers having a minimum distance therebetween. If a plurality of containers having minimum distances are detected, a plurality of links are set.

First, in step S1901, the layout editing application 121 sets a container as a reference of link setting (container 2104 in this case). The relative positional relationship between containers is obtained by using the X-coordinate of the left side of the container 2104 as reference. Container numbers to be used for link creation are set in ascending order of distance in the X direction. In this order setting, as indicated by 2160 in FIG. 21A, the X-coordinate of the left side of the container 2104 is set as a reference. Order (2) is set for a container 2105 whose X-direction distance is smaller (X1>X2). Order (3) is set a container 2106 having the second smallest X-direction distance. In a similar manner, orders are set for all selected containers in accordance with the X-direction distance. If a plurality of containers are laid out at the same X-direction position, the relationship between the Y-direction distances is obtained. A smaller number is set for a container having a smaller Y-direction distance. Reference numeral 2150 in FIG. 21A denotes a state in which order setting for link setting is ended. In this embodiment, the order is set from a container having its left side at the upper left corner. However, the present invention is not limited to this. The order may be set from, e.g., upper right or lower right corner.

The processing advances to step S1902. The layout editing application 121 substitutes 1 into a variable n. In step S1903, the layout editing application 121 prepares ContX[ ] to store the number (the order set in step S1901) of a container adjacent in the X direction and initializes the value by 0.

In step S1904, the layout editing application 121 prepares DistX_Min to store the minimum value of the X-direction distance and substitutes the page width into the initial value (S1904).

In step S1905, the layout editing application 121 substitutes n+1 into the variable i to check the adjacent container. In step S1901, the order is set in ascending order of X-direction distance. For this reason, the adjacent container for which a link needs to be set has a number larger than the self container (container 2104 in FIG. 21A). Hence, the processing in step S1905 is done to control the variable to execute check from the (n+1)th container.

The processing advances to step S1906 in the flowchart in FIG. 19B to check whether the Y-direction position of the nth container and that of the ith container overlap. In batch link setting of this embodiment, links are created assuming that containers are present in the same direction, i.e., in the horizontal or vertical direction. For a link in the X direction, check in step S1906 is executed to determine whether containers are laid out in the horizontal direction. For example, in 2160 in FIG. 21A, the Y-direction distance between the containers 2104 and 2105 is Y1. The Y-direction distance between the containers 2104 and 2106 is Y2.

If it is determined in step S1906 that the Y-direction positions overlap (YES in step S1906), the processing advances to step S1907. The layout editing application 121 calculates the difference between the X-direction position of the nth container and that of the ith container and substitutes the result into DistX.

The processing advances to step S1908. The layout editing application 121 compares DistX calculated in the preceding step with Dist_Min in which the minimum distance is stored. If DistX is smaller than the minimum value (Dist_Min) (YES in step S1908), the processing advances to step S1909. The layout editing application 121 initializes ContX[ ] by 0 and substitutes 0 into a variable k.

The number of the container having the minimum distance is substituted into ContX[k] (S1910).

If DistX is not smaller than the minimum value in step S1908 (NO in step S1908), the processing advances to step S1911. The layout editing application 121 further performs comparison and determines whether DistX coincides with DistX_Min (Sl911). If the values coincide (YES in step S1911), the container number is substituted into ContX[k], and the variable k is incremented by one.

After the processing in step S1910 is done, or in a case where it is determined in step S1911 that DistX is larger than the minimum value or it is determined in step S1906 that the ith container does not overlap in the Y direction, the layout editing application 121 increments the variable i to check the next container (S1912).

In step S1913, the layout editing application 121 determines whether check is done for all selected containers. If NO in step S1913, the flow returns to step S1906 to repeat the processing. If YES in step S1913, processing for setting a link between the detected adjacent containers is executed (S1914). This processing will be described later.

In a case where the link setting processing is ended, the variable n is incremented (S1915). It is determined whether the processing described above is done for all selected containers. If an unprocessed container remains, the flow returns to step S1903 to repeat the processing (S1916). If all containers are processed, the processing is ended.

Figure 20:
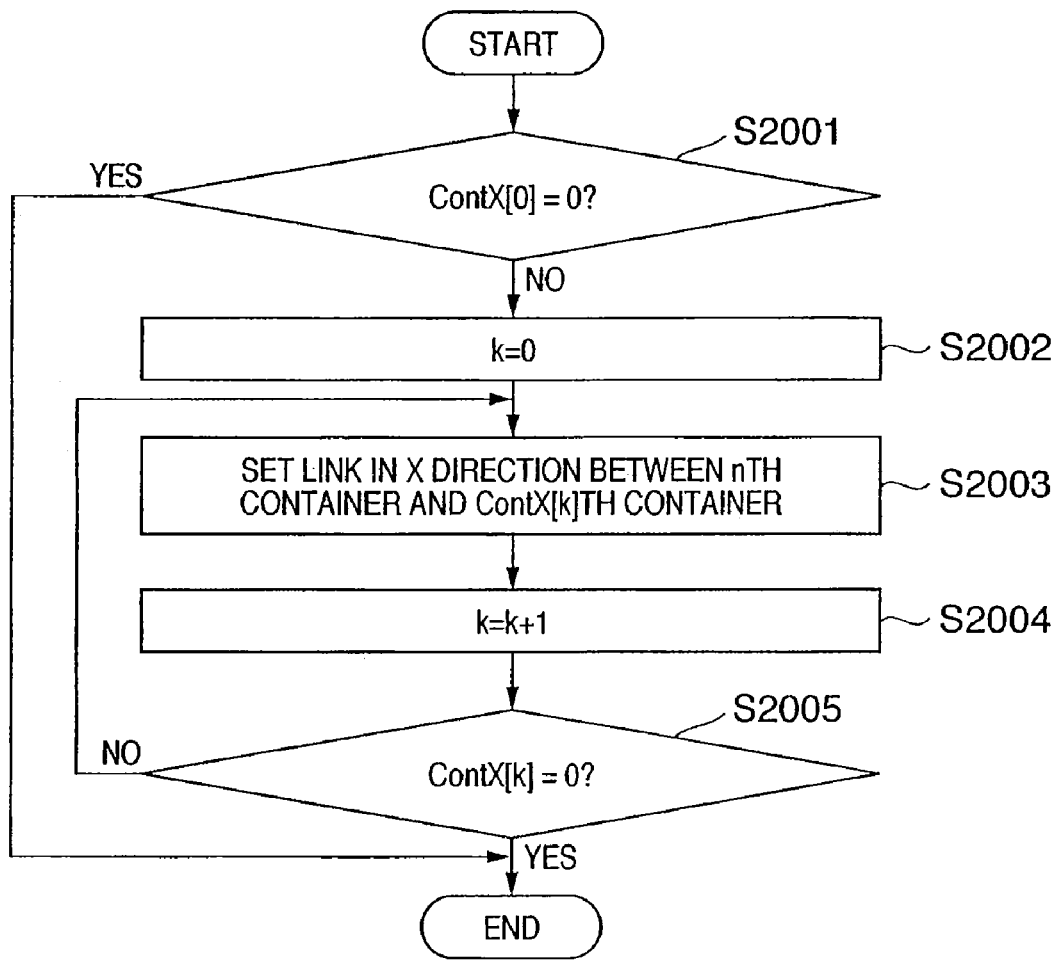
FIG. 20 is a flowchart for explaining the flow of link setting processing in step S1914 in FIG. 19B.

FIG. 20 is a flowchart for explaining the flow of link setting processing in step S1914 in FIG. 19B. In step S2001, it is determined whether ContX[0] is 0. If ContX[0] is 0 (YES in step S2001), it indicates that no adjacent container is detected. Hence, the processing is ended without link setting processing.

If ContX[0] is not 0 (NO in step S2001), 0 is substituted into the variable k (S2002). A link in the X direction is set between the nth container and the ContX[k]th container. In a case where the link is set, the variable k is incremented (S2004), and ContX[k] is checked (S2005). Link setting is executed for all stored containers until ContX[k] becomes 0. In a case where ContX[k] is 0, the link setting processing is ended.

Figure 21A:
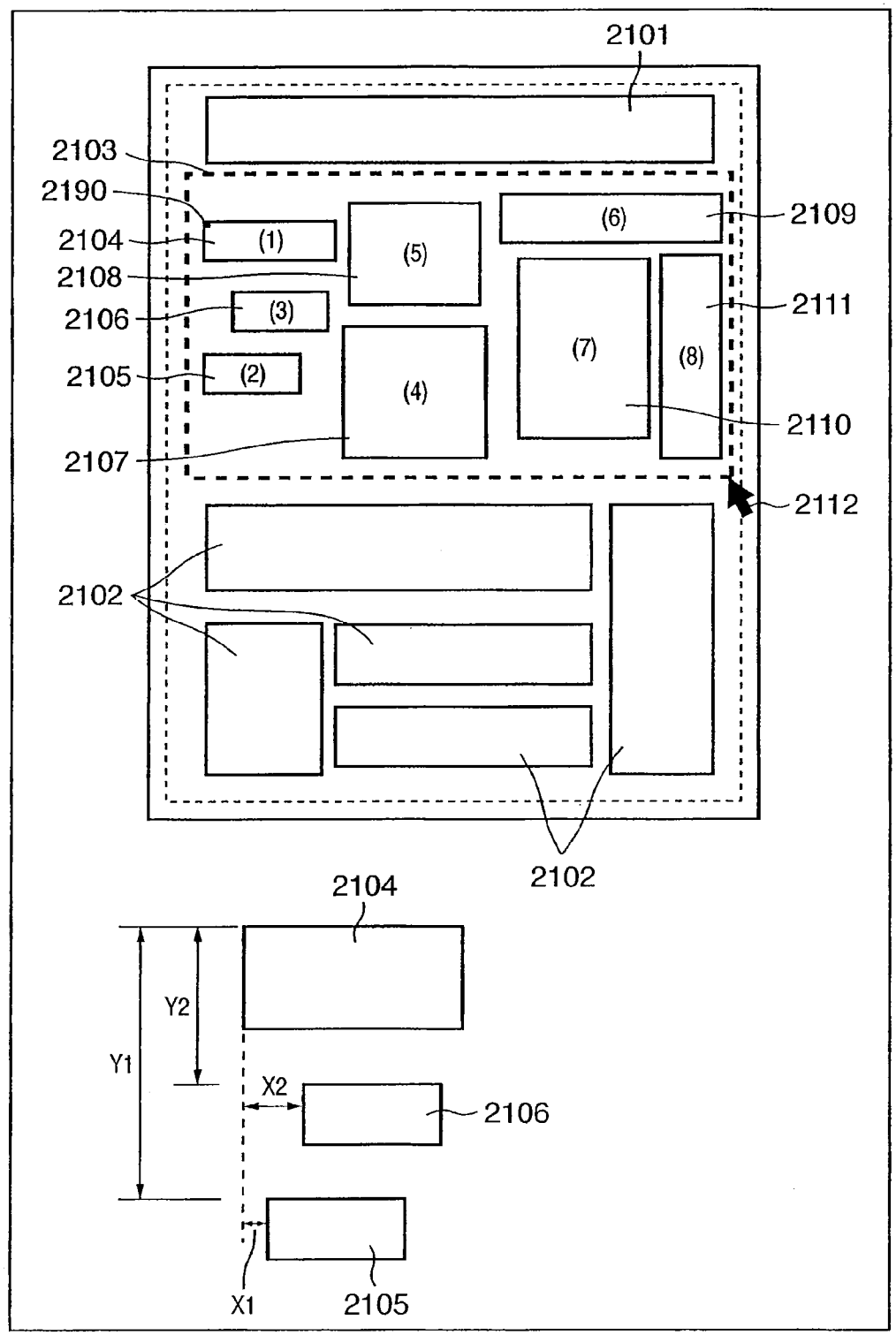
FIG. 21A is a view for explaining link setting in the X direction.
Figure 21B:
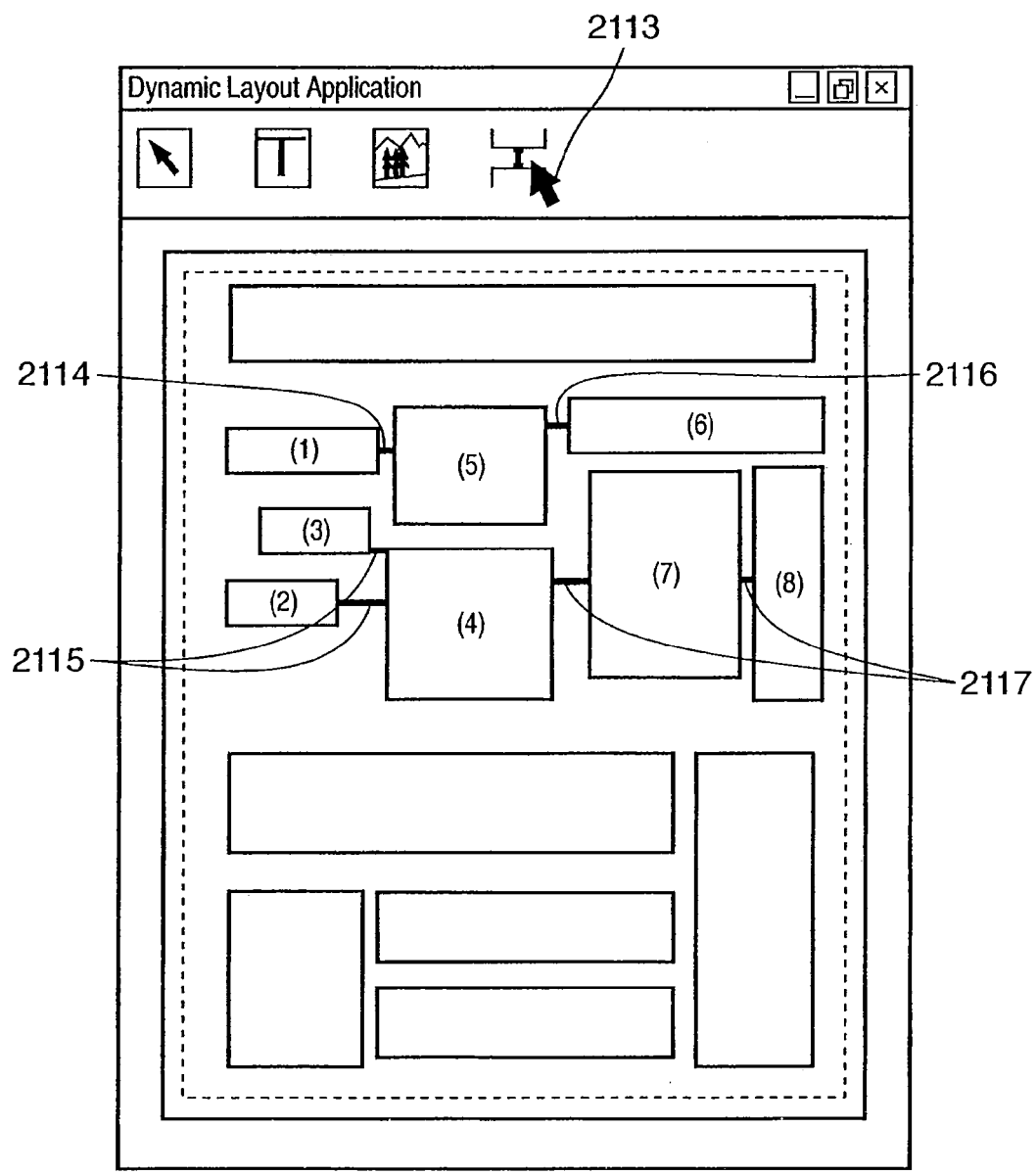
FIG. 21B is a view for explaining link setting in the X direction.

FIGS. 21A and 21B are views for explaining link setting in the X direction. Referring to FIG. 21A, reference numerals 2101 and 2102 denote unselected containers; 2103, a rectangular region to designate a plurality of containers; 2104 to 2111, containers selected for batch link processing; and 2112, a mouse pointer. Numbers in the containers indicate the orders given to the containers in step S1901 in FIG. 19A. The numbers are set in ascending order of X-direction position. The numbers are set in the order of containers 2104, 2105, 2106, 2107, 2108, 2109, 2110, and 2111. In a case where a link setting tool button 2113 is clicked on, links are set. Referring to FIG. 21B, reference numerals 2114 to 2117 denote links set in the X direction. The links are set between containers having minimum distances in the X direction.

Figure 68:
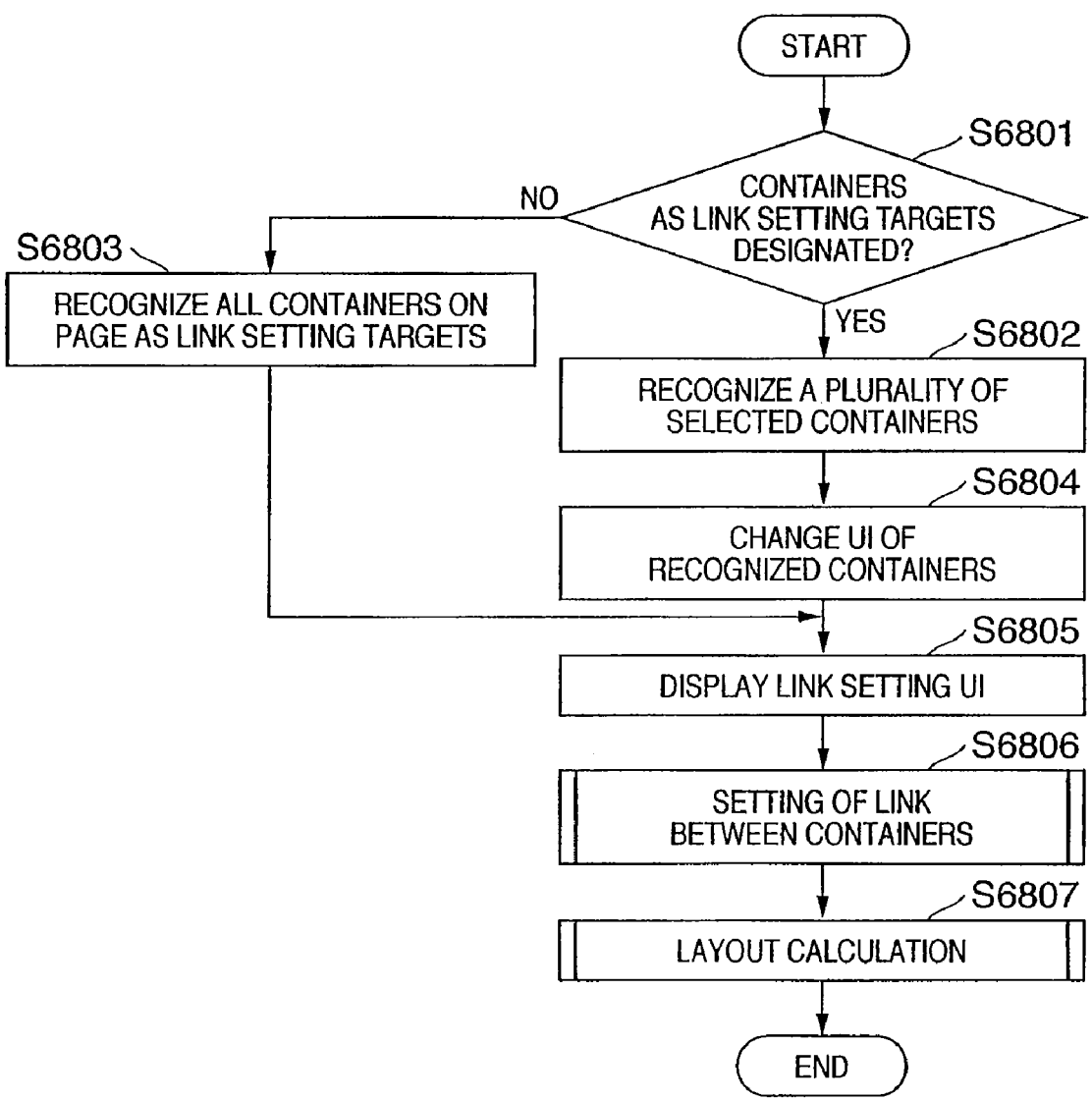
FIG. 68 is a flowchart for explaining the flow of processing in a case where automatic link setting is executed even for containers which do not have the minimum distance.

In the flowcharts in FIGS. 21A and 21B, a link is set between containers having the minimum distance therebetween in the X direction. FIG. 68 shows the flow of processing for containers which do not have the minimum distance. The basic processing flow is almost the same as in FIG. 16, and only different points will be described.

Figure 69:
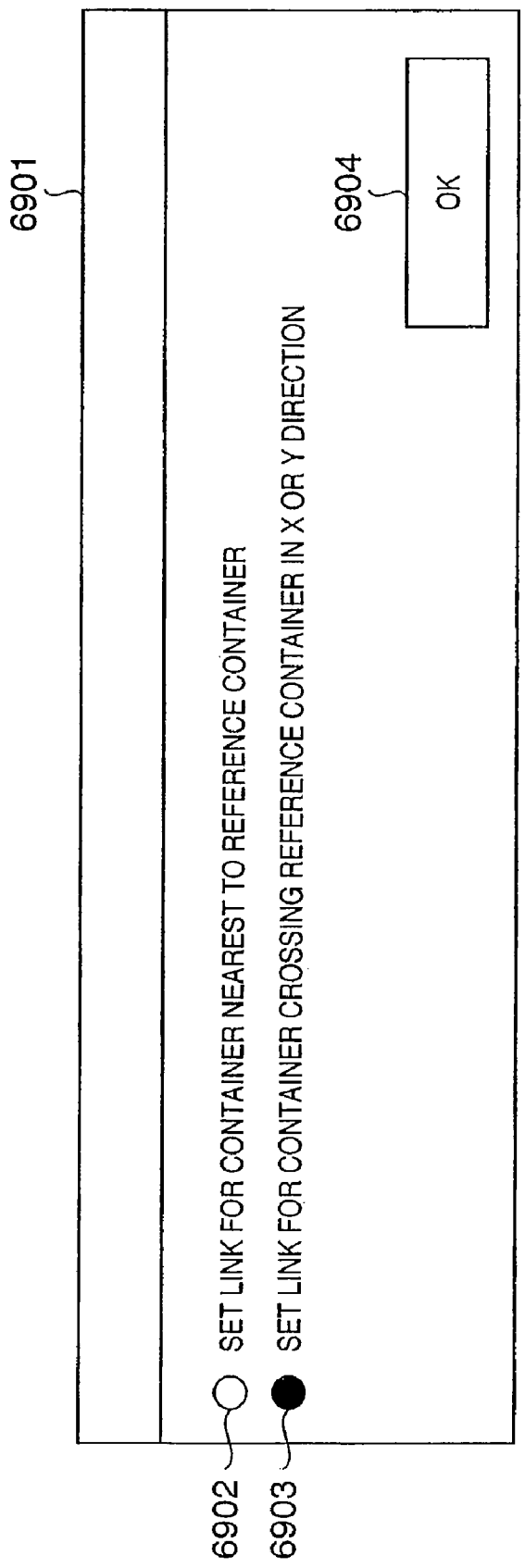
FIG. 69 is a view showing a UI to select the automatic link setting method.
Figure 72:
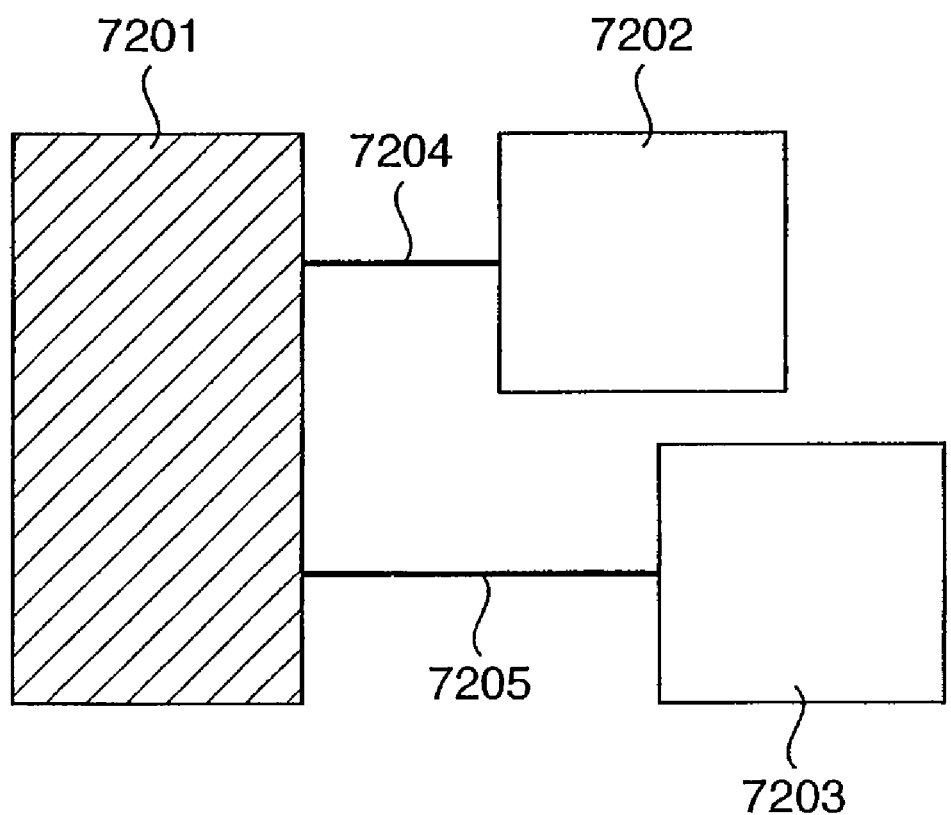
FIG. 72 is a view showing a detailed example in a case where the automatic link setting method for containers which do not have the minimum distance is selected.

Processing in steps S6801 to S6804 in FIG. 68 is the same as in FIG. 16, and a description thereof will be omitted. In a case where a specific instruction is input by, e.g., the mouse (for example, in a case where the right button of the mouse is clicked on), the layout editing application 121 displays a link setting UI shown in FIG. 69 on the display device 144 (S6805). FIG. 69 is a view showing a UI to select a link setting mode. As shown in FIG. 69, the first setting mode "set link for container nearest to reference container" and the second setting mode "set link for container crossing reference container in X or Y direction" are described in a link setting UI 6901. In a case where the layout editing application 121 recognizes that the user has selected one of the link setting methods, the flow advances to the next step. The mode "set link for container nearest to reference container" indicates the above-described link setting method. Processing in a case where the mode "set link for container crossing reference container in X or Y direction" is selected will be described. The mode "set link for container crossing reference container in X or Y direction" will be described in detail with reference to FIG. 72. In the above-described mode "set link for container nearest to reference container", containers 7201 to 7203 in FIG. 72 are link setting targets. In a case where a link is generated by setting the container 7201 as a reference, the container 7203 is not located at a point nearest to the container 7201. Hence, a link 7205 is not set. In a case where the mode "set link for container crossing reference container in X or Y direction" is selected, a link 7204 is set for the container 7202 which crosses the container 7201 in the Y direction, and the link 7205 is set for the container 7203.

Upon recognizing that the setting method is selected in the link setting UI shown in FIG. 69, and the "OK" button is clicked on, the layout editing application 121 sets links between the selected containers (S6806). Processing in steps S6806 to S6809 is also the same as that in steps S1605 and S1606 in FIG. 16, and a description thereof will be omitted.

Figure 70A:
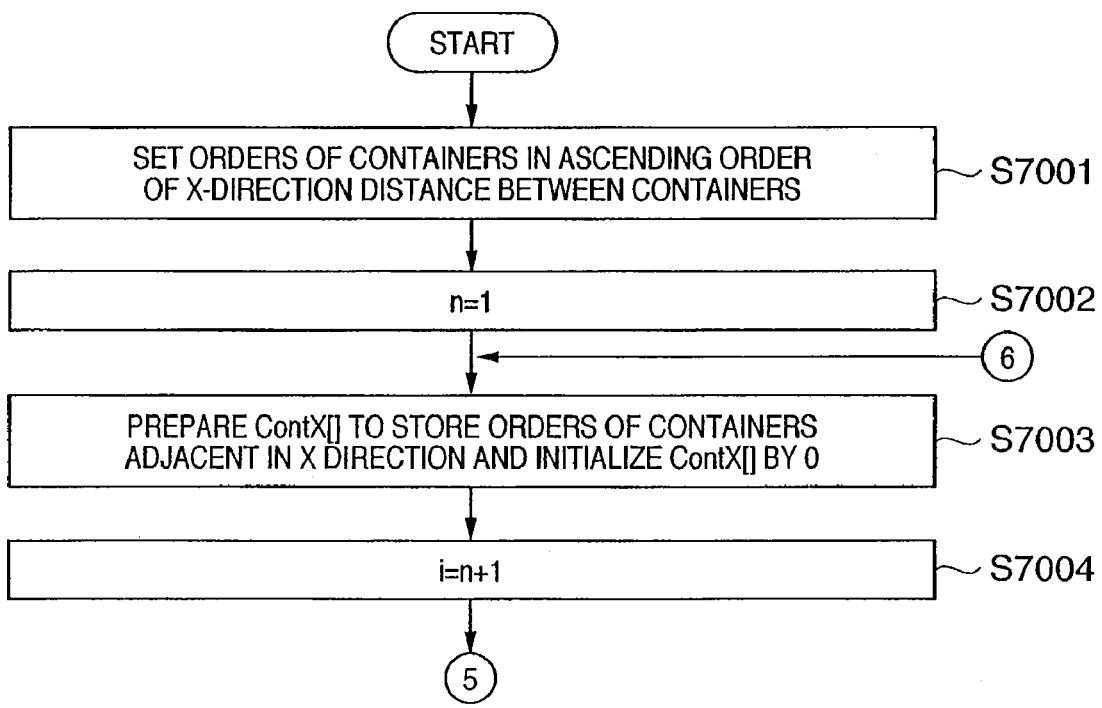
FIGS. 70A and 70B are flowcharts for explaining the flow of link creation processing in a case where the automatic link setting method for containers which do not have the minimum distance is selected.

Details of the processing of batch link creation and container position information acquisition are the same as in FIGS. 17 and 18 described above, and a description thereof will be omitted. The link creation flow in the mode "set link for container crossing reference container in X or Y direction" will be described next with reference to FIGS. 70A and 70B. Processing in steps S7001 to S7005 is the same as in steps S1901 to S1903 and steps S1905 and S1906, and a detailed description thereof will be omitted.

If it is determined in step S7005 that the Y-direction position of the ith container overlaps that of the nth container, the layout editing application determines whether another container is present between the nth container and the ith container (S7006). More specifically, the layout editing application 121 can determine it by referring to the position information of each container, which is stored in the storage device 139 or memory unit 136 by the processing shown in FIG. 18.

If it is determined in step S7006 that no container is present between the nth container and the ith container, the flow advances to step S7008 to associate the ith container with the nth container by using a link. If it is determined in step S7006 that another container is present between the containers, the layout editing application 121 determines whether a link can be set directly between the ith container and the nth container (S7007). More specifically, the layout editing application 121 can determine it by referring to the position information of each container, which is stored in the storage device 139 or memory unit 136 by the processing shown in FIG. 18. In a case where it is determined in step S7007 that a link can be set directly between the nth container and the ith container without intervening another container, the flow advances to step S7008. More specifically, referring to FIG. 71, it can be determined that the Y-direction position of the fifth container and that of the eighth container overlap. However, the seventh container is present between the fifth container and the eighth container. For this reason, only an indirect link can be set from the fifth container to the eighth container through the seventh container. In this case, no link is set from the fifth container to the eighth container. The Y-direction position of the fourth container and that of the eighth container overlap. The seventh container is present between them. However, the eighth container projects from the seventh container in the vertical direction. For this reason, a link can be set directly from the fourth container to the eighth container without intervening the seventh container therebetween. In this case, a link 7102 is generated.

Figure 70B:
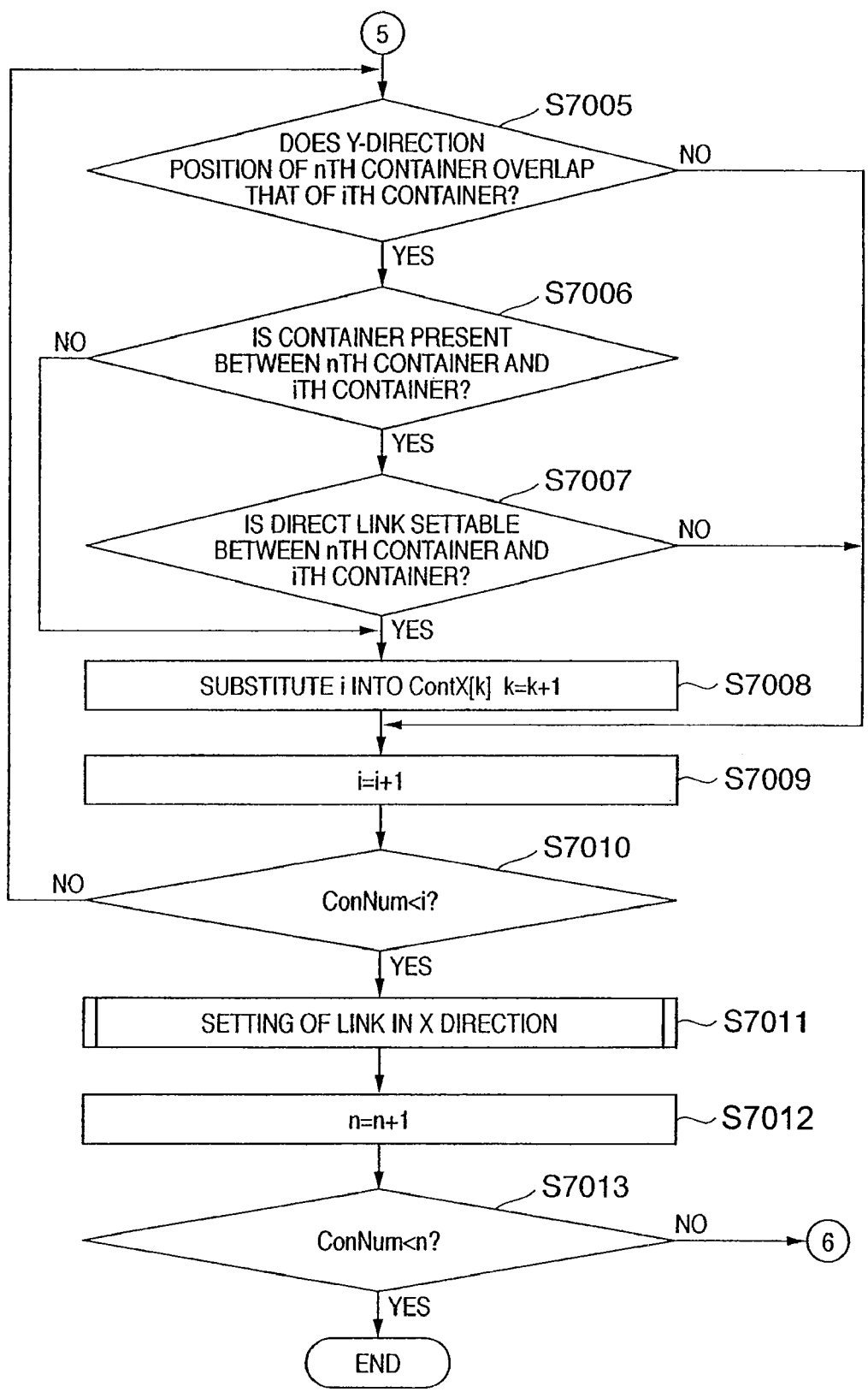

Processing in steps S7008 to S7013 is the same as in steps S1910 to S1913 in FIG. 19, and a detailed description thereof will be omitted. Processing in step S7011 in FIG. 70B is the same as that in FIG. 20 which explains step S1914 in FIG. 19B, and a detailed description thereof will be omitted.

Figure 71:
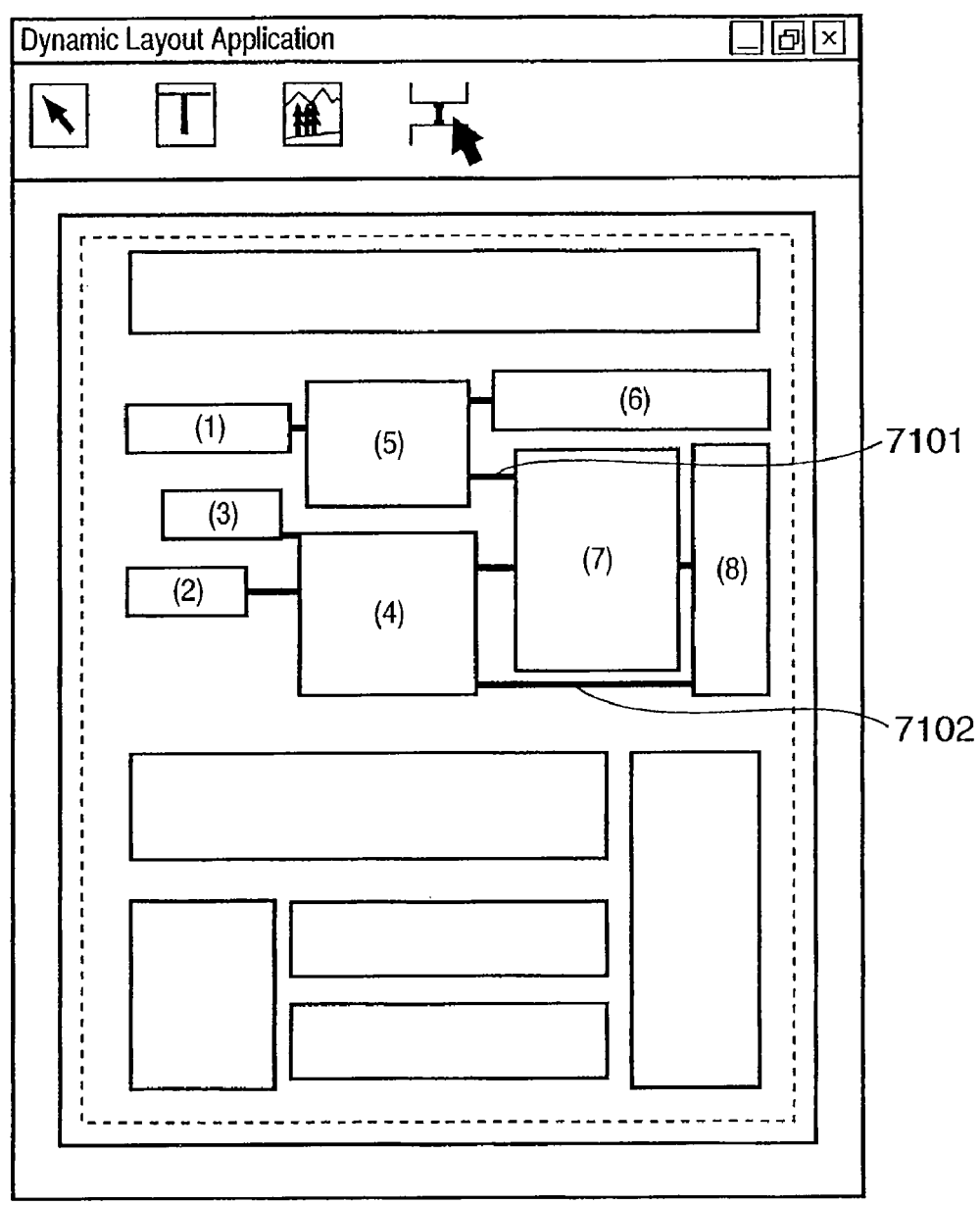
FIG. 71 is a view for explaining a case in which links are set in the X direction by the processing in FIGS. 70A and 70B.

FIG. 71 is a view for explaining link setting in the X direction. FIG. 71 is basically the same as FIG. 21B, and only different points will be described. Referring to FIG. 21B, a link 2116 is set for only the sixth container which is located at a position nearest to the fifth container in the X direction. Referring to FIG. 71, although the seventh container is not located at a position nearest to the fifth container in the X direction, a link 7101 is set between them. Since the mode "set link for container crossing reference container in X or Y direction" is selected in the link setting UI shown in FIG. 69, the link 7101 is set for the seventh container which crosses the reference container (fifth container) in the Y direction. Referring to FIG. 21B, since the eighth container is not located at a position nearest to the fourth container in the X direction, no link is set between them. However, the link 7102 is set in FIG. 71. The seventh container is present between the fourth container and the eighth container. However, the eighth container crosses the reference container (fourth container) in the Y direction. In addition, the eighth container projects from the seventh container in the Y direction. For this reason, a link can be set directly from the fourth container to the eighth container. Hence, the link 7102 is set.

Figure 22A:
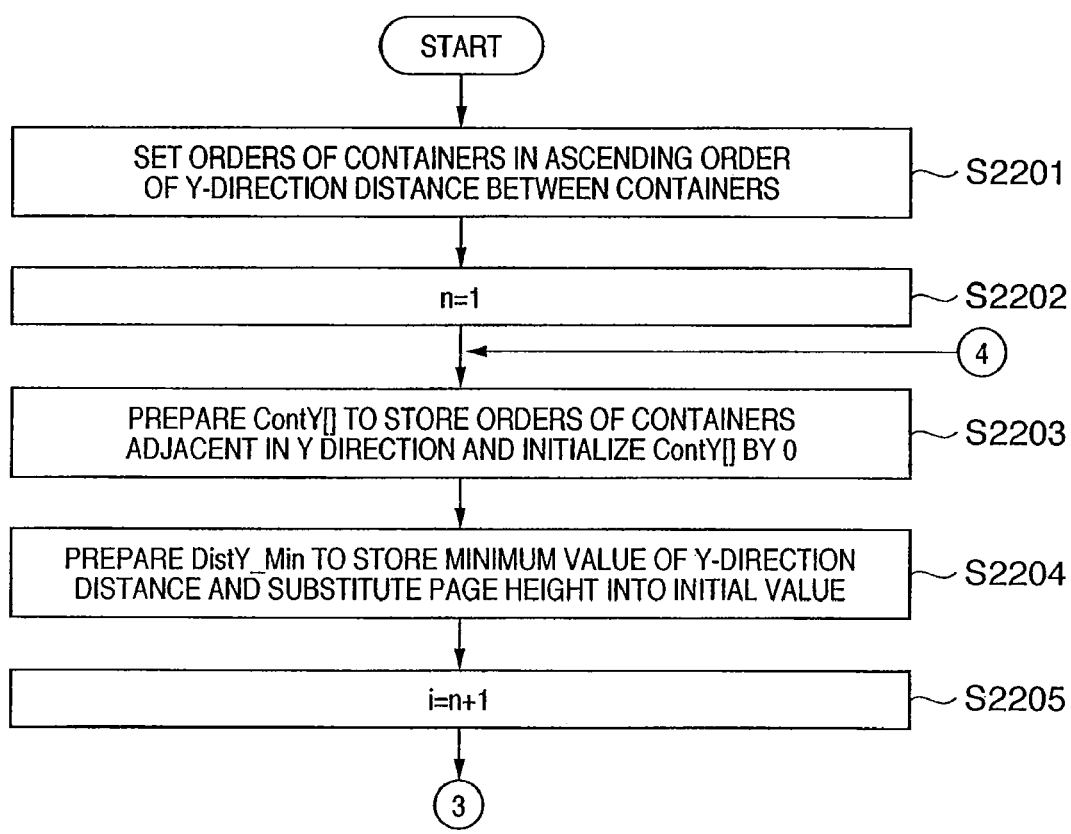
FIG. 22A is a flowchart for explaining the flow of processing for creating a link in the Y direction.
Figure 22B:
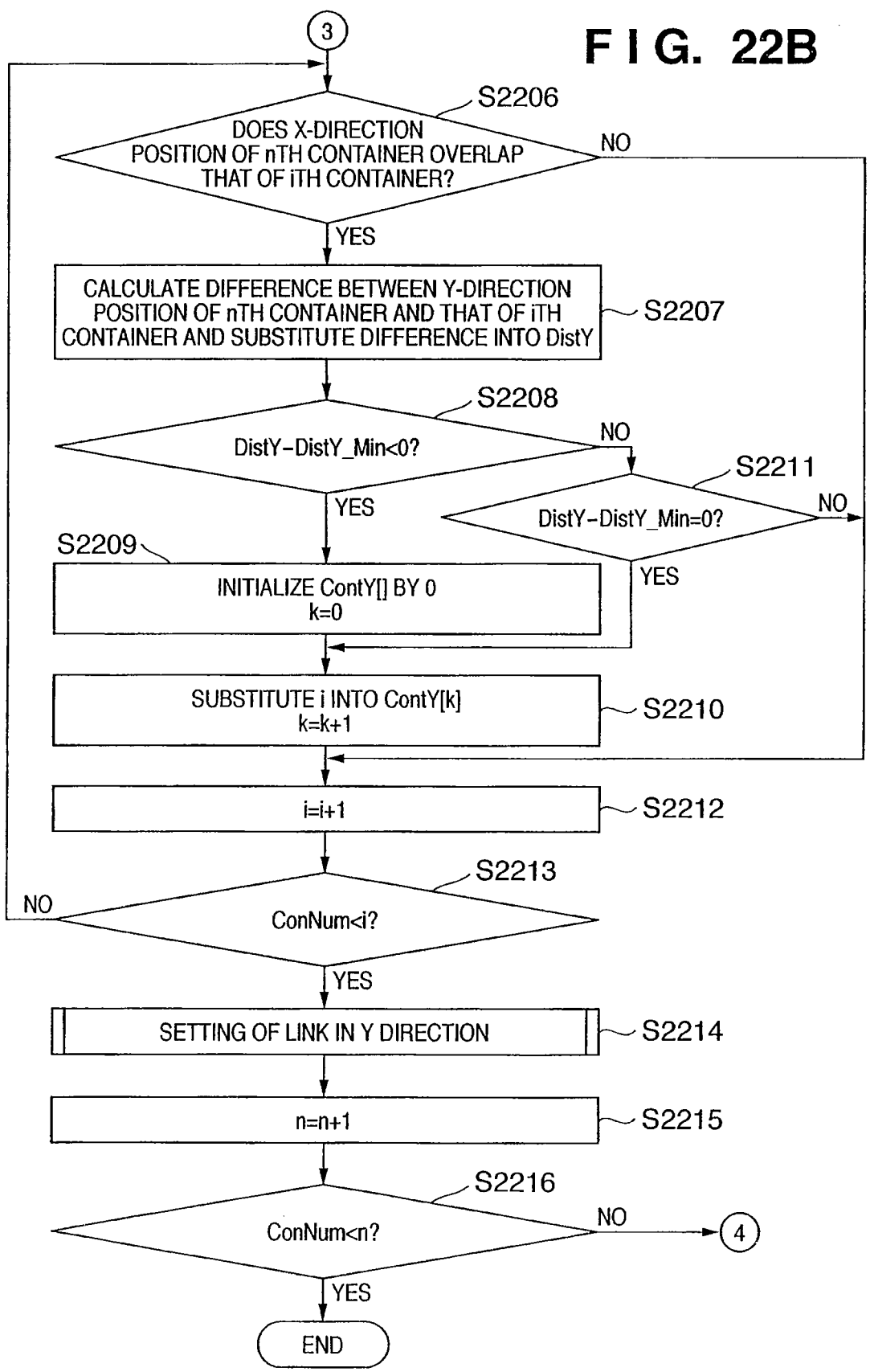
FIG. 22B is a flowchart for explaining the flow of processing for creating a link in the Y direction.

FIGS. 22A and 22B show the flow of link creation in the Y direction. The processing in each step is almost the same as that of the processing in the X direction (FIGS. 19A and 19B) except the direction.

First, the layout editing application 121 sets orders for the containers to create links in the Y direction in ascending order of position in the Y direction (S2201). If containers are located at the same Y-direction position, a smaller number is set for a container having a smaller X-direction distance. Next, 1 is substituted into the variable n (S2202). The layout editing application 121 prepares ContY[ ] to store the number (the order set in step S2201) of a container adjacent in the Y direction and initializes the value by 0 (S2203). The layout editing application 121 also prepares DistY_Min to store the minimum value of the Y-direction distance and substitutes the page width into the initial value (S2204). Next, n+1 is substituted into the variable i to check the adjacent container (S2205).

The processing advances to step S2206 in FIG. 22B. The layout editing application 121 checks whether the X-direction position of the nth container and that of the ith container overlap (S2206). If it is determined in step S2206 that the X-direction positions overlap (YES in step S2206), the layout editing application 121 calculates the difference between the Y-direction position of the nth container and that of the ith container and substitutes the result into DistY (S2207).

The layout editing application 121 compares DistY calculated in the preceding step with Dist_Min in which the minimum distance is stored (S2208). If DistY is smaller than the minimum value, the processing advances to step S2209. The layout editing application 121 initializes ContY[ ] by 0 and substitutes 0 into the variable k. The number of the container having the minimum distance is substituted into ContY[k] (S2210).

If DistY is not smaller than the minimum value in step S2208 (NO in step S2208), the processing advances to step S2211. The layout editing application 121 further performs comparison and determines whether DistY coincides with DistY_Min (S2211). If the values coincide (YES in step S2211), the layout editing application 121 substitutes the container number into ContY[k] and increments the variable k by one (S2210).

After the processing in step S2210 is done, or in a case where it is determined in step S2211 that DistY is larger than the minimum value or it is determined in step S2206 that the ith container does not overlap in the X direction, the layout editing application 121 increments the variable i to check the next container (S2212). In step S2213, the layout editing application 121 determines whether check is done for all selected containers. If NO in step S2213, the flow returns to step S2206 to repeat the processing. If YES in step S2213, the layout editing application 121 executes processing for setting a link between the detected adjacent containers (S2214). This processing will be described later.

In a case where the link setting processing in the Y direction is ended, the variable n is incremented in step S2215. It is determined whether the processing described above is done for all selected containers. If an unprocessed container remains, the flow returns to step S2203 to repeat the processing (S2216). If all containers are processed, the whole processing is ended.

Figure 23:
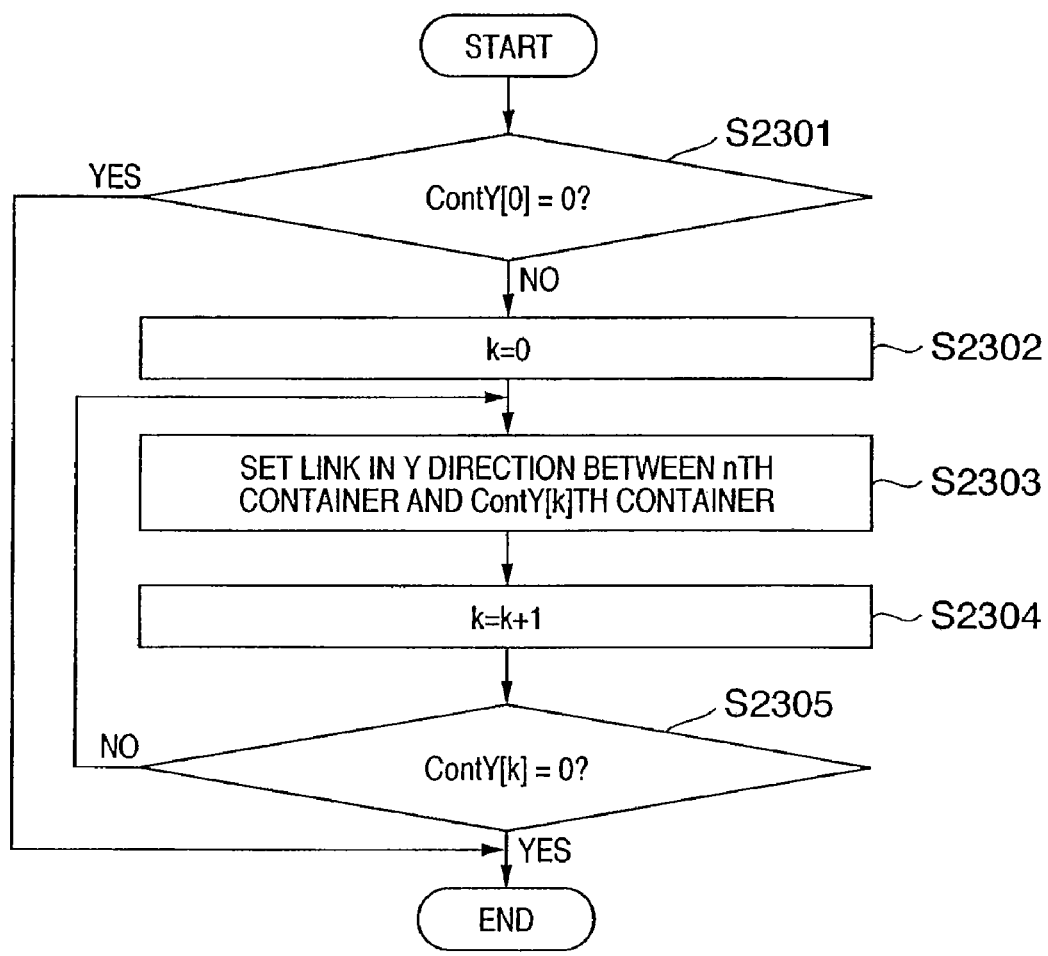
FIG. 23 is a flowchart for explaining the flow of link setting processing in step S2214 in FIG. 22B.

FIG. 23 is a flowchart for explaining the flow of processing for setting links in the Y direction in step S2214 in FIG. 22B. In step S2301, the layout editing application 121 determines whether ContY[0] is 0. If ContY[0] is 0 (YES in step S2301), it indicates that no adjacent container is detected. Hence, the processing is ended without link setting processing. If ContY[0] is not 0 (NO in step S2301), the layout editing application 121 substitutes 0 into the variable k (S2302). A link in the Y direction is set between the nth container and the ContY[k]th container. In a case where the link is set, the layout editing application 121 increments the variable k (S2304), checks ContY[k], and sets links for all stored containers until ContY[k] becomes 0 (S2303). In a case where ContY[k] is 0 (YES in step S2305), the link setting processing is ended.

Figure 24A:
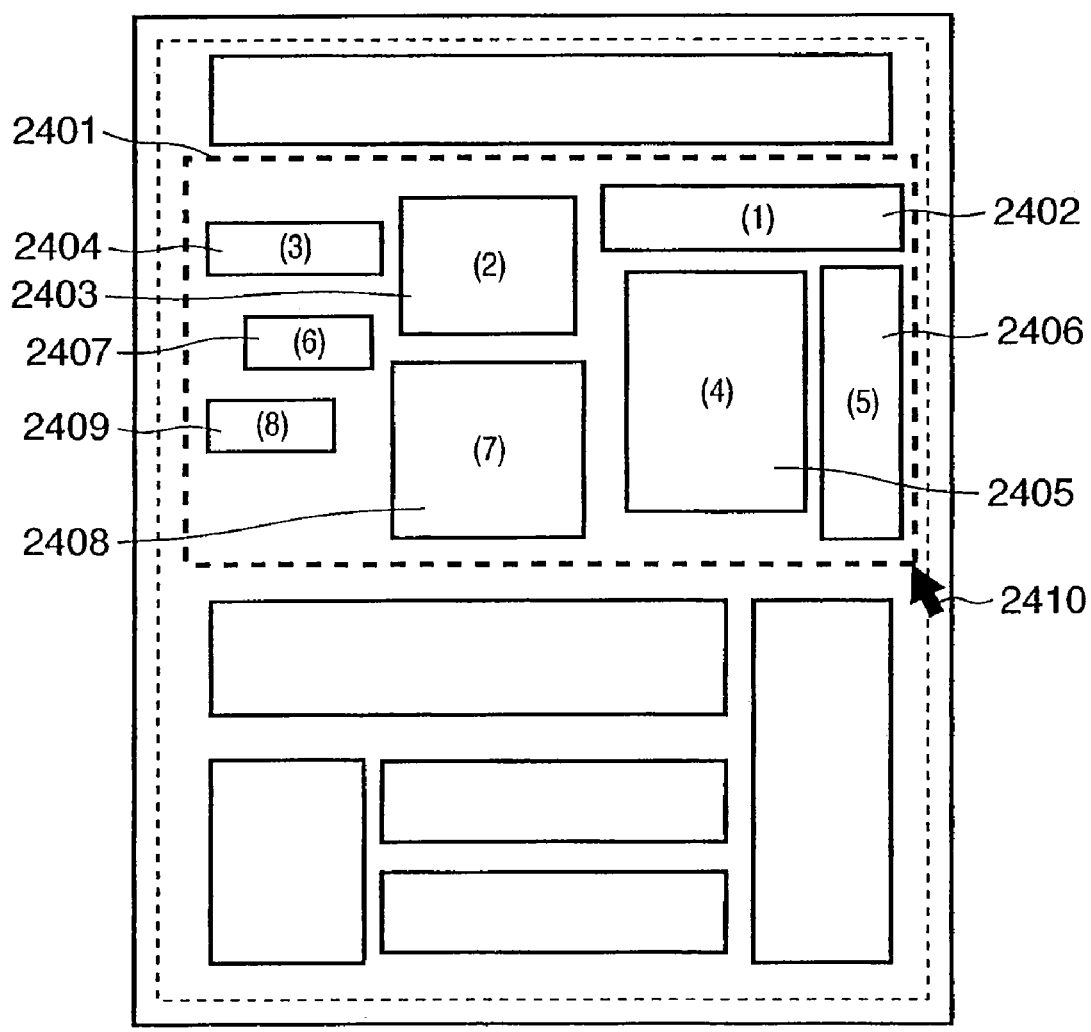
FIG. 24A is a view showing an example of a UI window which indicates a link creation state.
Figure 24B:
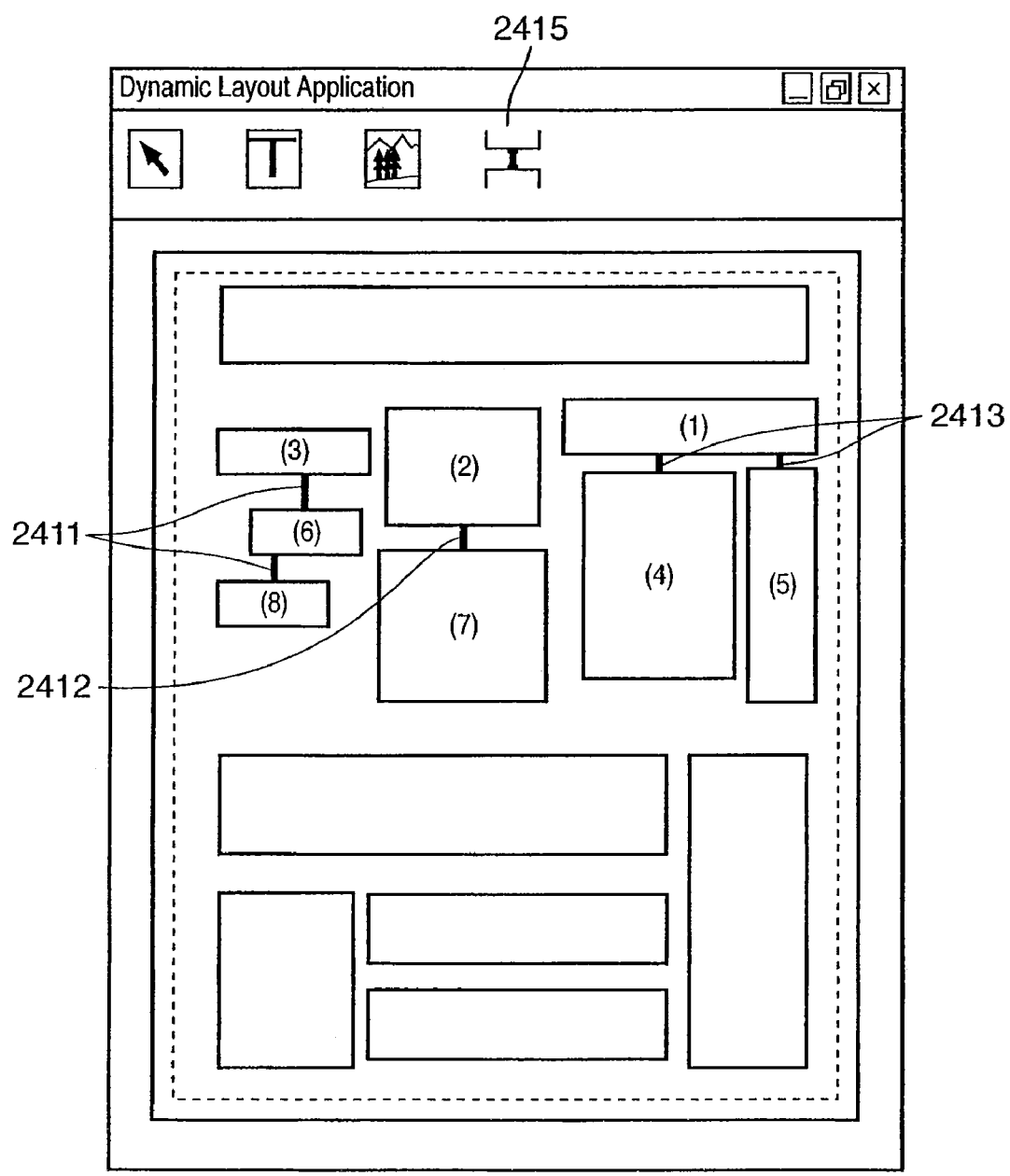
FIG. 24B is a view showing an example of a UI window which indicates a link creation state.

FIGS. 24A and 24B are views showing examples of a UI window which indicates a link creation state. Referring to FIG. 24A, reference numeral 2401 denotes a rectangular region to designate selection of a plurality of containers; 2402 to 2409, selected containers; and 2410, a mouse pointer. Numbers in the containers indicate the orders given to the containers in step S2201 in FIG. 22A. In a case where viewed from the container (1), the numbers of the remaining containers ((2) to (8)) are set in ascending order of Y-direction distance. The numbers are set in the order of containers 2402, 2403, 2404, 2405, 2406, 2507, 2408, and 2409. In a case where a link setting tool button 2415 shown in FIG. 24B is clicked on, links are set. Reference numerals 2411 to 2113 denote created links in the Y direction. The links are set between containers having minimum distances in the Y direction. Two links 2413 are set from the container (1) to the containers (4) and (5). This is because two containers separated in the Y direction by a minimum distance are present. Even in a case where links are to be set in the Y direction at once, links can also be set between containers having distances other than the minimum distance by selection in the link setting UI shown in FIG. 69, as in the above-described batch link setting in the X direction.

(Priority Order Setting for Calculation of Container)

In batch link setting for containers, the priority direction to designate the container calculation order can be set. This processing will be described with reference to FIGS. 51, 52, and 53. FIG. 52 is a view showing links created by batch link setting and their containers. Reference numeral 5301 on the left and right sides denotes a page width; 5302, containers for which links are set at once; and 5303, links. One of the X direction and Y direction is designated, and priority orders are set for the containers in the designated direction. Designation of the direction is done in a dialogue shown in FIG. 53 by the user. Display of a dialogue box 5304 is controlled by the user interface module 103. Reference numeral 5305 denotes a radio button to designate the direction; 5306, a button to cancel setting; and 5307, an OK button. In a case where the direction is designated, and the OK button is clicked on, the priority orders are automatically set.

Figure 51:
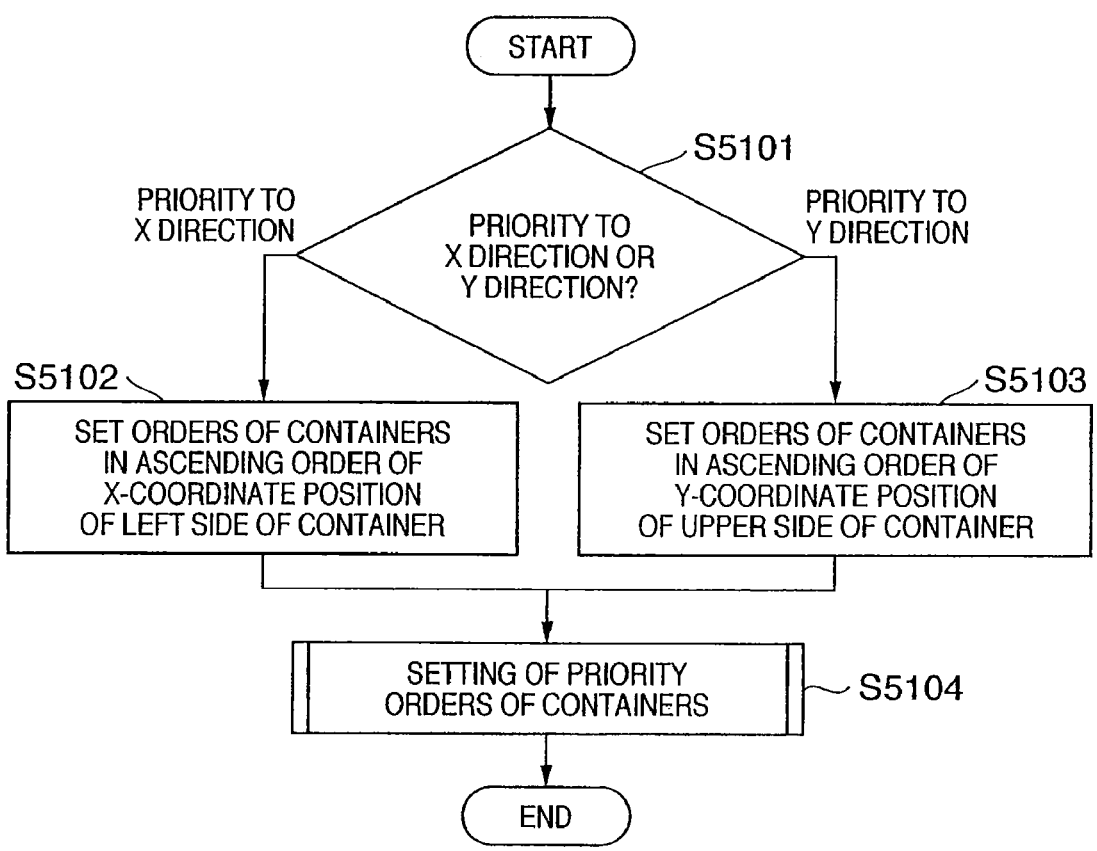
FIG. 51 is a flowchart for explaining the flow of priority order setting.
Figure 53:
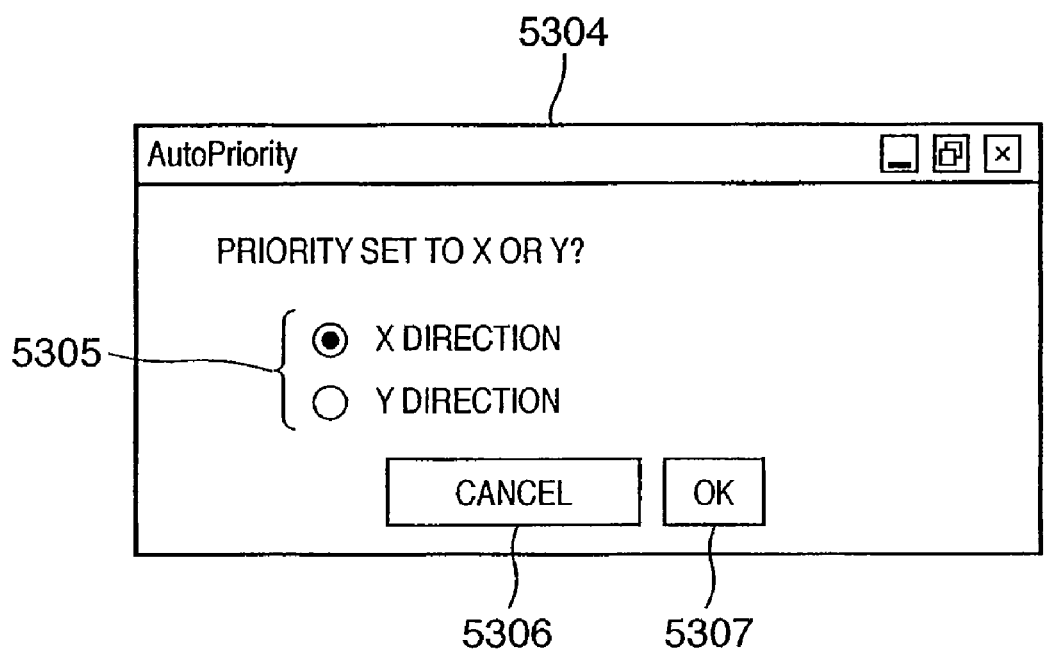
FIG. 53 is a view showing a display example of an automatic priority order setting dialogue box.

FIG. 51 is a flowchart for explaining the flow of priority order setting. In step S5101, the priority direction designated in the above-described dialogue shown in FIG. 53 is determined. In a case where the X direction is designated, the layout editing application 121 sets the orders of the containers in ascending order of X-coordinate position of the left side of the container (S5102). If a plurality of containers are laid out at the same X-coordinate, the layout editing application 121 sets orders in ascending order of Y-coordinate position of the upper side of the container.

In a case where the Y direction is designated as the priority direction, the layout editing application 121 sets the orders of the containers in ascending order of Y-coordinate of the upper side of the container (S5103). If a plurality of containers are laid out at the same Y-coordinate, the layout editing application 121 sets orders in ascending order of X-coordinate of the upper side of the container. In a case where order setting is ended, priority orders are set in accordance with the order (S5104). By designating the priority direction, the priority order of calculation of containers can be set.

Figure 54A:
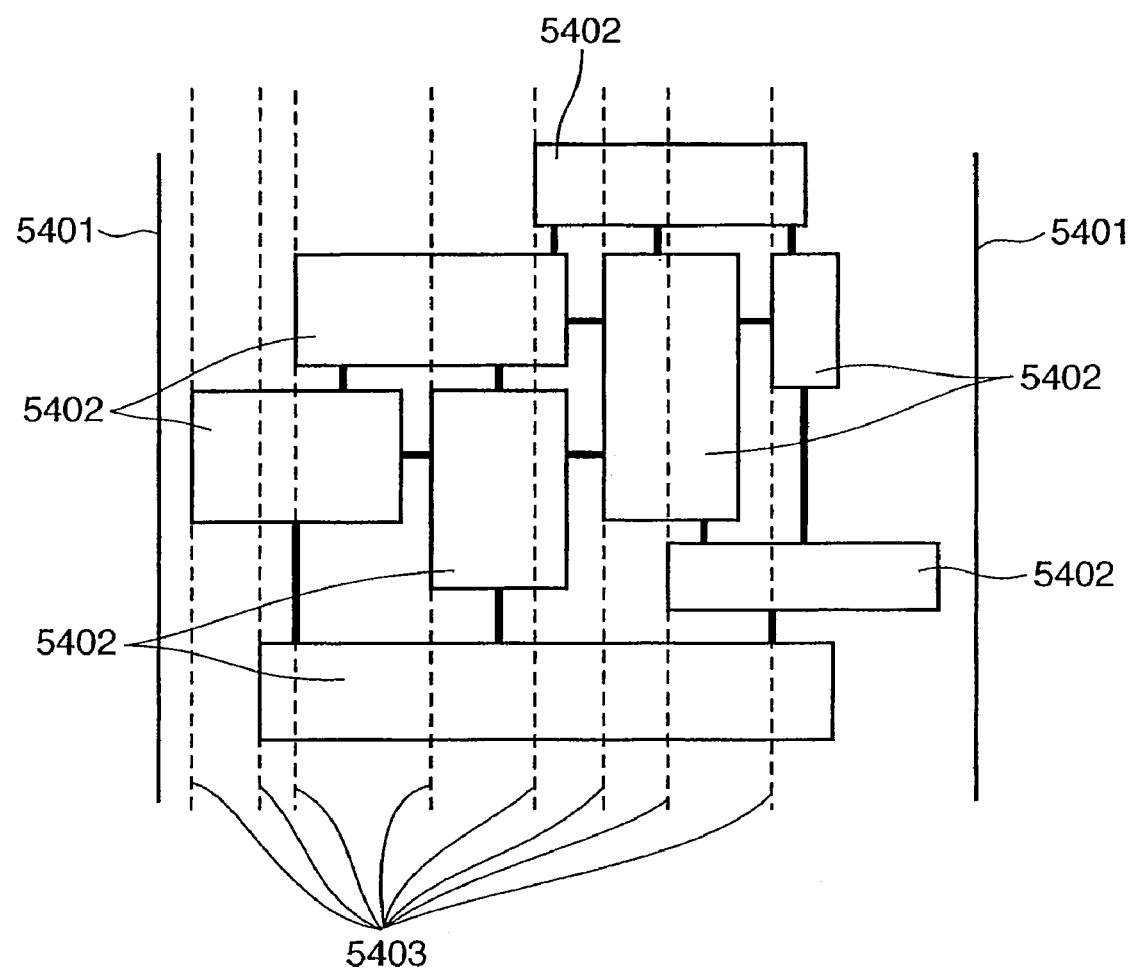
FIG. 54A is a view showing containers and links before priority orders are set by giving priority to the X direction.

FIGS. 54A and 54B are views showing examples of processing for setting priority orders of containers by giving priority to the X direction. FIG. 54A shows containers and links before priority orders are set. Reference numeral 5401 on the left and right sides denotes a page width; 5402, containers; and 5403, X-coordinates of the left sides of all containers. The priority orders of containers are set in ascending order of X-coordinate (from the left side of the page). FIG. 54B shows the containers and links after priority orders are set. Numbers in the containers indicate the priority orders. Since the priority orders are set in ascending order of X-coordinate, the priority orders are set in the order of containers 5404, 5405, 5406, 5407, 5408, 5409, 5410, and 5411.

Figure 55B:
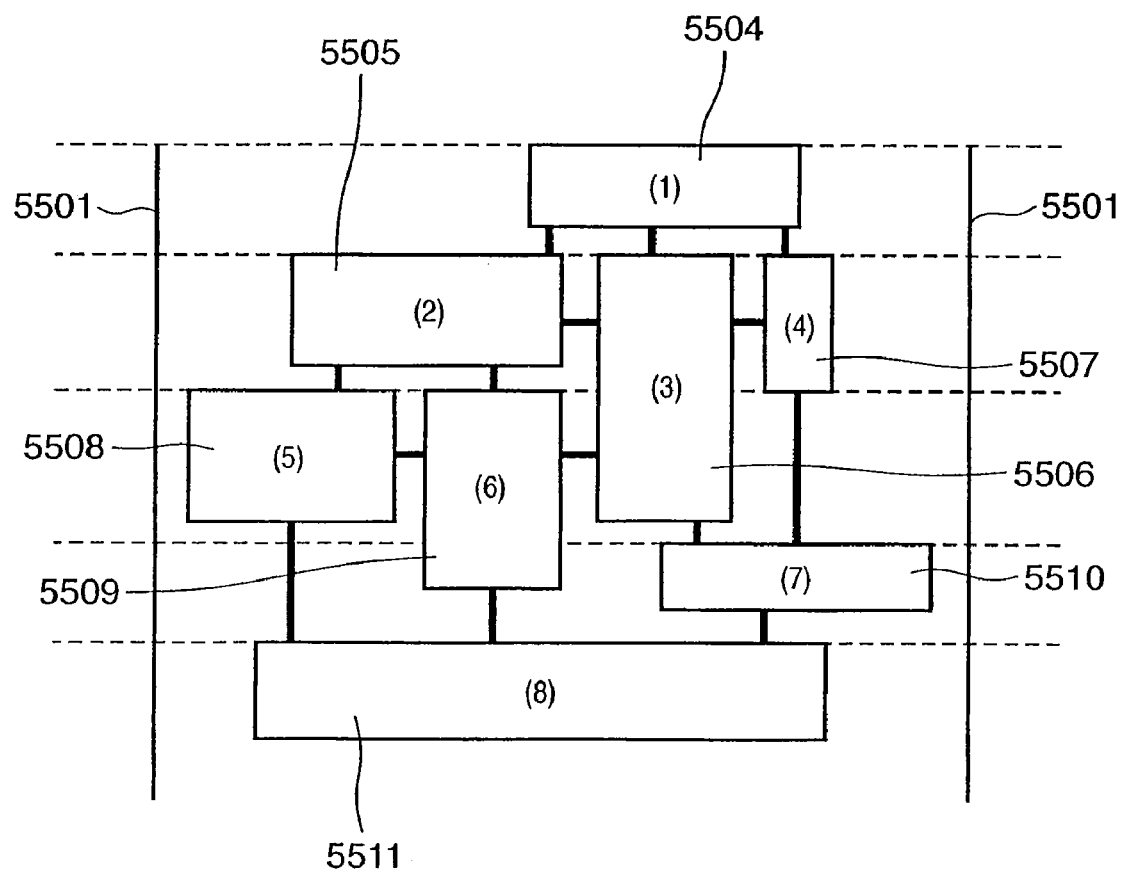
FIG. 55B is a view showing containers and links after priority orders are set by giving priority to the Y direction.

FIGS. 55A and 55B are views showing examples of processing for setting priority orders of containers by giving priority to the Y direction. FIG. 55A shows containers and links before priority orders are set. Reference numeral 5501 on the left and right sides denotes a page width; 5502, containers; and 5503, Y-coordinates of the upper sides of all containers. The priority orders of containers are set in ascending order of Y-coordinate (from the upper side of the page). FIG. 55B shows the containers and links after priority orders are set. Numbers in the containers indicate the priority orders. Since the priority orders are set in ascending order of Y-coordinate, the priority orders are set in the order of containers 5504, 5505, 5506, 5507, 5508, 5509, 5510, and 5511.

(Correction of Link Setting)

For the batch-set links between the containers, the user can designate correction through an instruction input means such as the keyboard 132 or mouse 133. In this case, the attribute (flexible or fixed) of a designated link can be changed, or link setting can be canceled. The change or setting cancel can be executed under the control of the user interface module 103 and processor unit 135. In a case where containers are individually designated, links can individually be set. Hence, the user can set a new additional link in addition to the batch-set links.

(Automatic Change of Setting of Container (Lock of Outermost Side on Page))

Processing for changing anchor setting of a container, which correspond to step S1705 in FIG. 17, will be described. In this processing, in a case where a side of a container with a link created is located at the same position as that of the outermost side of a container laid out in the page, the position of the side is automatically locked (fixed). In a case where a lateral side and a vertical side of a single container are locked, an anchor is set automatically at the corner formed by these sides.

Figure 25:
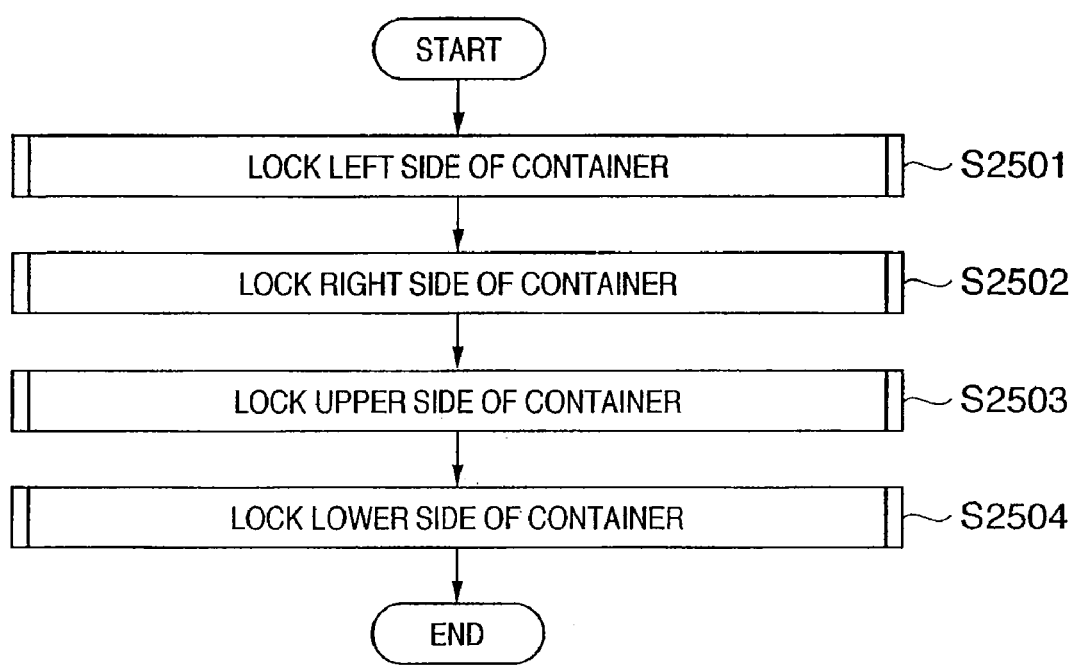
FIG. 25 is a flowchart for explaining the overall processing flow of anchor setting.

FIG. 25 is a flowchart for explaining the overall processing flow of anchor setting. In step S2501, the left side of a container is locked. In step S2502, the right side of the container is locked. In addition, the upper and lower sides of the container are locked in steps S2503 and S2504. The flow of processing for locking each side will be described in detail with reference to the flowcharts in FIGS. 26, 28, 30, and 32.

(Lock of Left Side)

Figure 26:
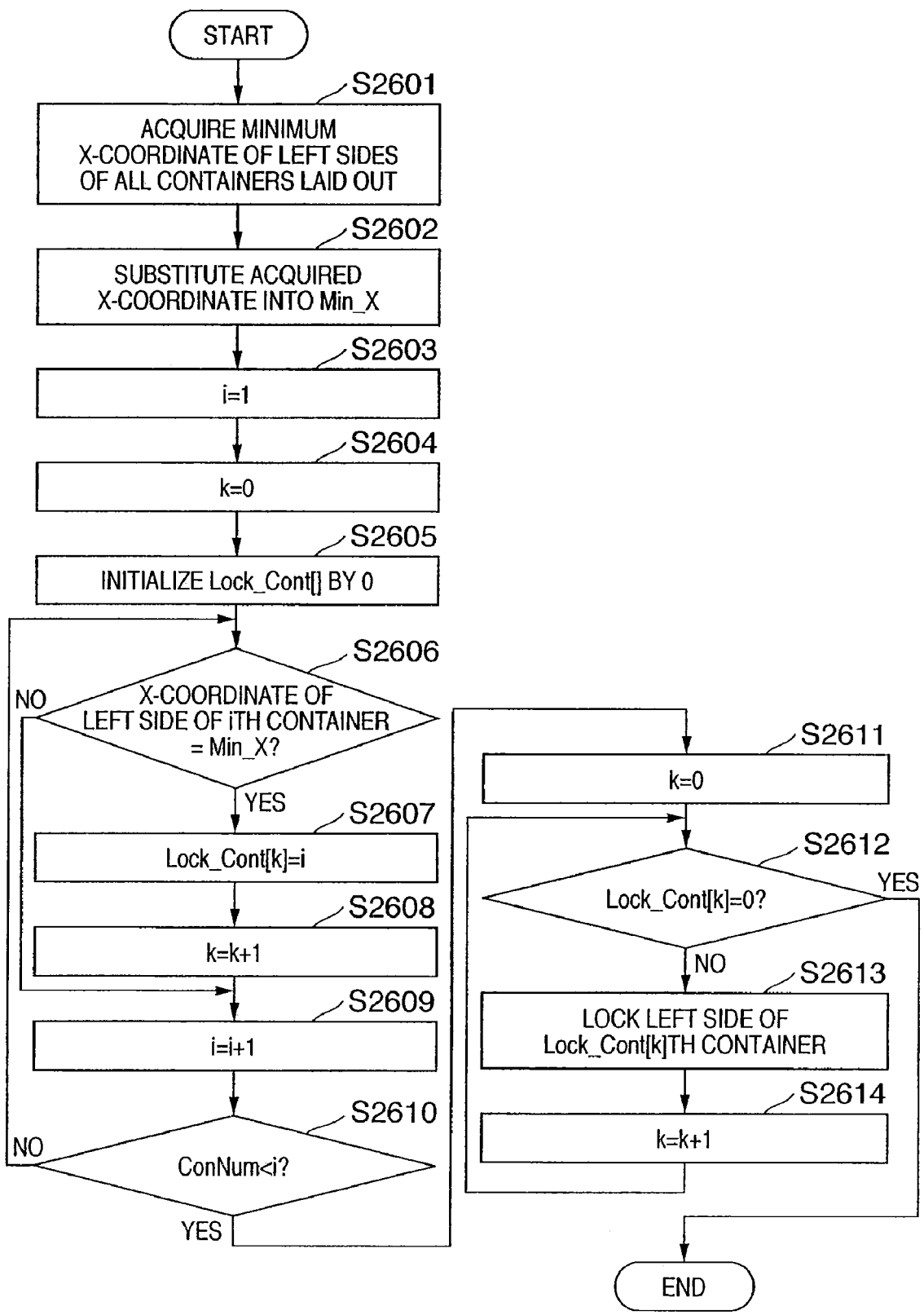
FIG. 26 is a flowchart for explaining details of the flow of processing for locking the left side in step S2501 in FIG. 25.

FIG. 26 is a flowchart for explaining details of the flow of processing for locking the left side of a container in step S2501 in FIG. 25. First, in step S2601, the layout editing application 121 acquires the minimum X-coordinate of the left sides of all containers laid out. The acquired minimum X-coordinate is substituted into Min_X (S2602). In step S2603, 1 is substituted into the variable i. In step S2604, 0 is substituted into the variable k.

The layout editing application 121 prepares Lock_Cont[ ] and initializes it by 0 (S2605). The variable i indicates a container number. The variable k indicates the subscript of Lock_Cont[ ]. Lock_Cont[ ] is an array to store the number of a container as a lock target.

In step S2606, the layout editing application 121 checks whether the X-coordinate of the left side of the ith container equals Min_X. If YES in step S2606, the processing advances to step S2607 to substitute the variable i into Lock_Cont[k]. The variables k and i are incremented (S2608 and S2609).

If the values do not equal in step S2606 (NO in step S2606), the variable i is incremented without substituting it into Lock_Cont (S2609). It is confirmed whether the processing is ended for all containers (S2610). If NO in step S2610, the flow returns to step S2606 to repeat the processing. If YES in step S2610, the processing advances to step S2611 to substitute 0 into the variable k. The processing advances the step S2612 to check the value Lock_Cont[k]. If the value is 0, the processing is ended without setting lock. If the value is not 0, the left side of the Lock_Cont[k]th container is locked (S2613). The variable k is incremented (S2614). The processing in steps S2613 and S2614 is repeated until the value Lock_Cont[k] becomes 0. With this processing, of the sides of containers with links set, the side located at the leftmost position in the page is locked. If a plurality of sides are detected, all the plurality of detected sides are locked.

FIG. 27 is a view showing the locked state of the left sides of containers. Reference numeral 2701 denotes a rectangle to designate selection of a plurality of containers; 2702, 2703, and 2704, links; 2705, locked sides; and 2706, a minimum X-coordinate. As shown in FIG. 27, in a case where the processing in FIG. 26 is executed, the left side of each container at the minimum X-coordinate is locked.

Figure 28:
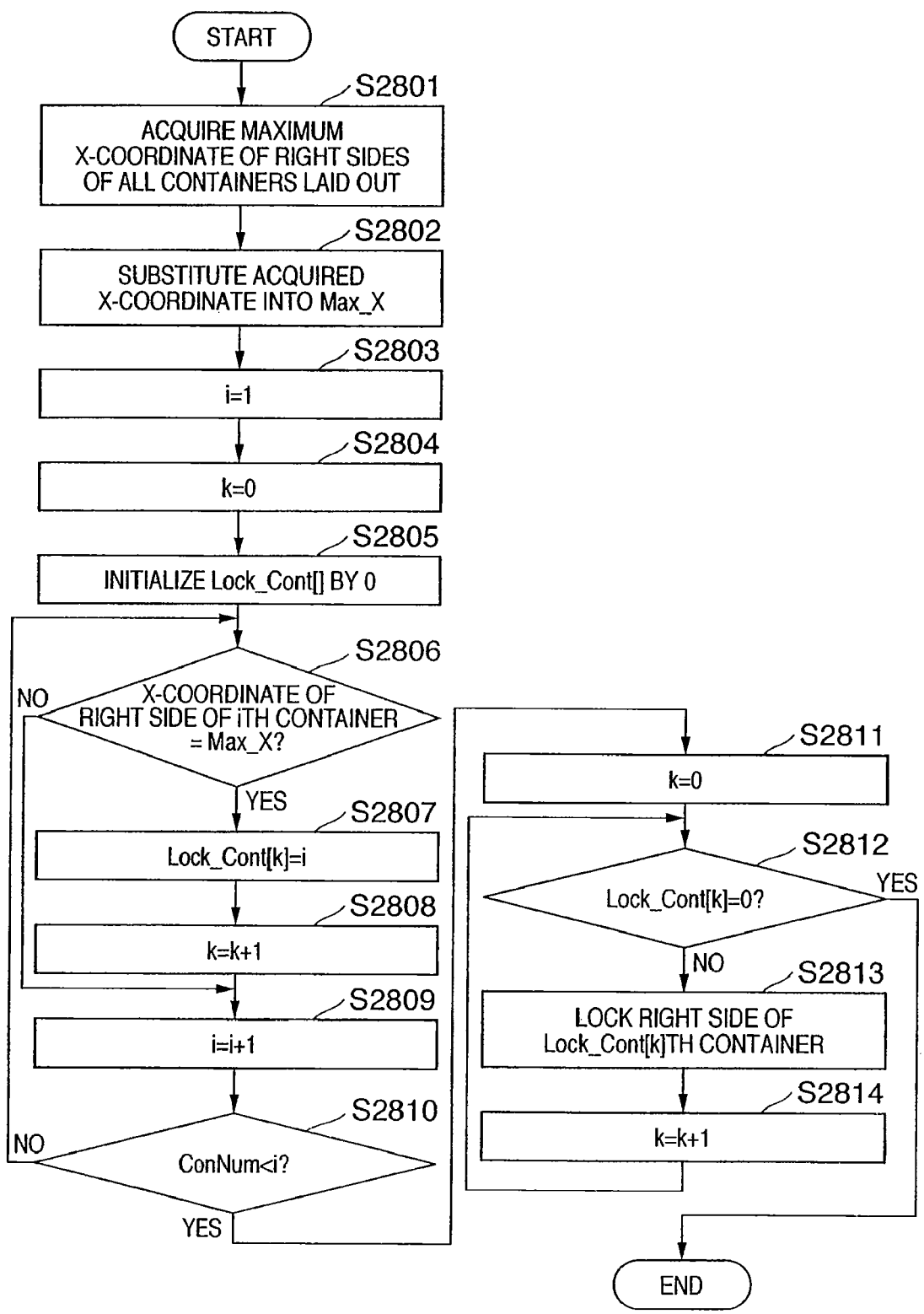
FIG. 28 is a flowchart for explaining details of the flow of processing for locking the right side in step S2502 in FIG. 25.

FIG. 28 is a flowchart for explaining details of the flow of processing for locking the right side in step S2502 in FIG. 25. First, in step S2801, the layout editing application 121 acquires the maximum X-coordinate of the right sides of all containers laid out. In step S2802, the acquired maximum X-coordinate is substituted into Max_X. In step S2803, 1 is substituted into the variable i. In step S2804, 0 is substituted into the variable k. In step S2805, Lock_Cont[ ] is prepared and initialized by 0. The variable i indicates a container number. The variable k indicates the subscript of Lock_Cont[ ]. Lock_Cont[ ] is an array to store the number of a container as a lock target.

In step S2806, the layout editing application 121 checks whether the X-coordinate of the right side of the ith container equals Max_X. If the values equal (YES in step S2806), the processing advances to step S2807 to substitute the variable i into Lock_Cont[k]. The variables k and i are incremented (S2808 and S2809). If the values do not equal in step S2806 (NO in step S2806), the processing advances the step S2809 to increment the variable i without substituting it into Lock_ Cont.

It is confirmed whether the processing is ended for all containers (S2810). If the processing is not ended (NO in step S2810), the flow returns to step S2806 to repeat the processing. If the processing is ended (YES in step S2810), the processing advances to step S2811 to substitute 0 into the variable k.

The processing advances the step S2812. The layout editing application 121 checks the value Lock_Cont[k]. If the value is 0, the processing is ended without setting lock. If the value is not 0 (NO in step S2812), the processing advances the step S2813 to lock the right side of the Lock_Cont[k]th container.

In step S2814, the variable k is incremented. The processing in steps S2813 and S2814 is repeated until the value Lock_Cont[k] becomes 0. With this processing, of the sides of containers with links set, the side located at the rightmost position in the page is locked. If a plurality of sides are detected, all the plurality of detected sides are locked.

Figure 29:
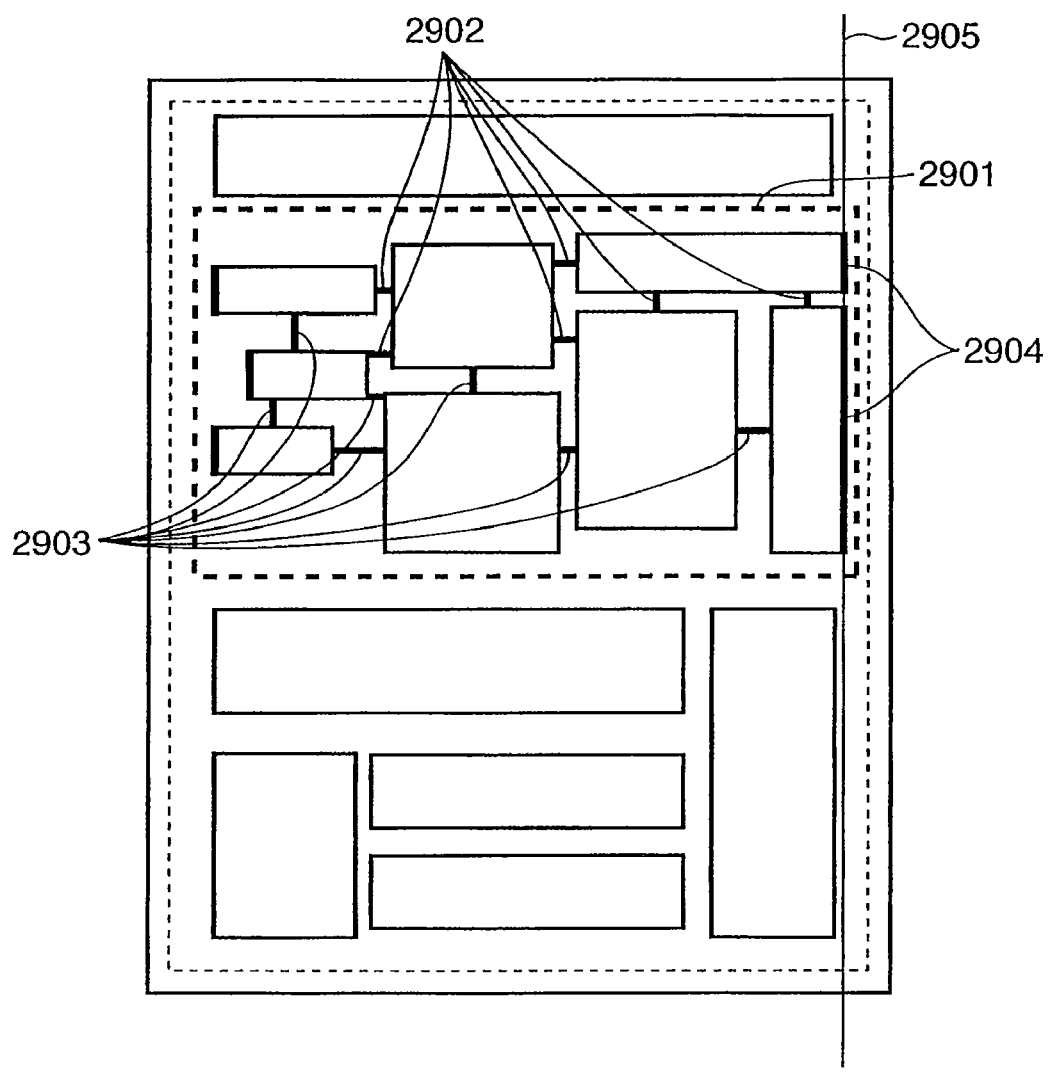
FIG. 29 is a view showing the locked state of right sides of containers.

FIG. 29 is a view showing the locked state of the right sides of containers. Referring to FIG. 29, reference numeral 2901 denotes a rectangle to designate selection of a plurality of containers; 2902 and 2903, links; 2904, locked sides; and 2905, a maximum X-coordinate. As shown in FIG. 29, in a case where the processing in FIG. 28 is executed, the right side of each container at the maximum X-coordinate is locked.

(Lock of Upper Side)

Figure 30:
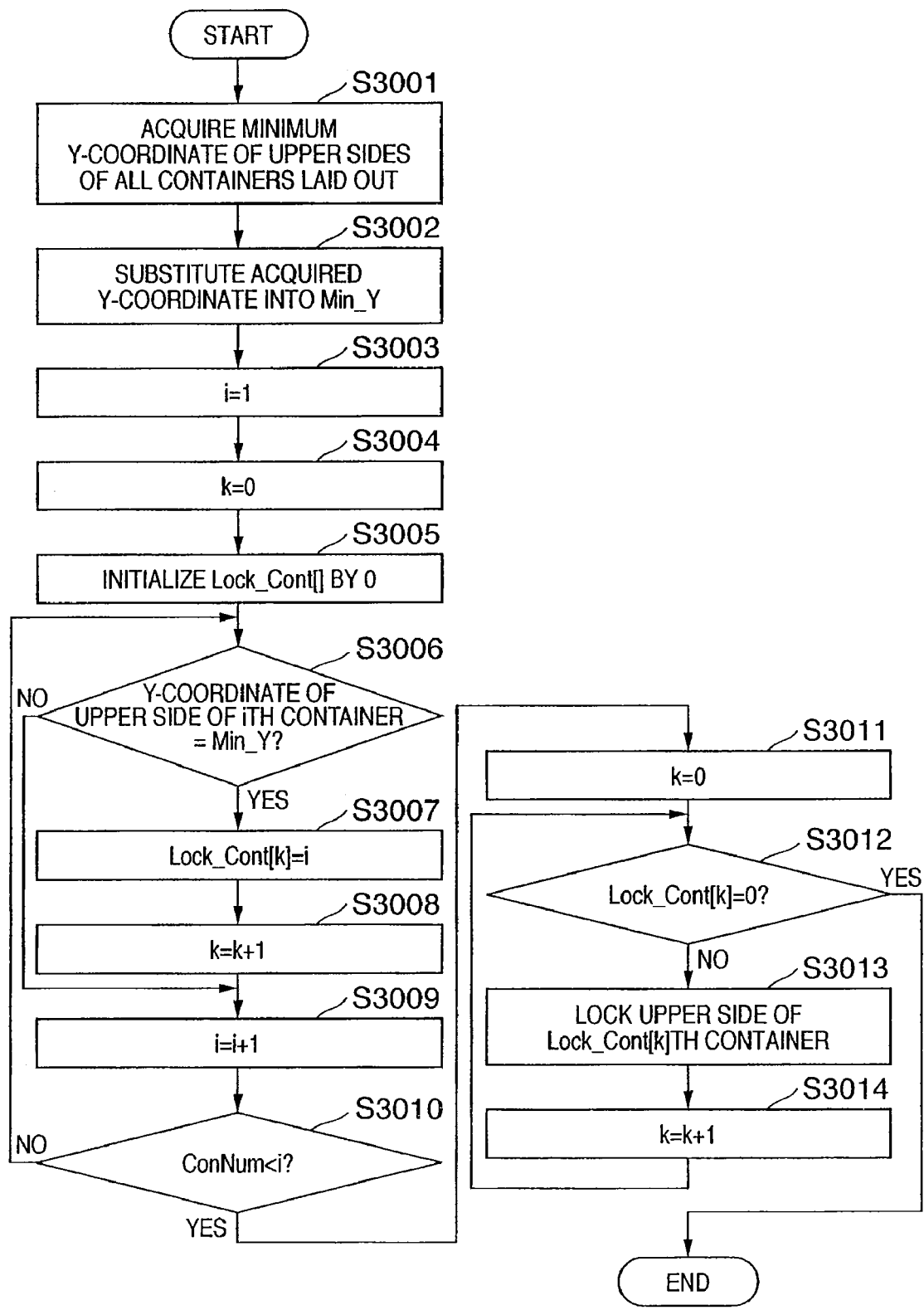
FIG. 30 is a flowchart for explaining details of the flow of processing for locking the upper side in step S2503 in FIG. 25.

FIG. 30 is a flowchart for explaining details of the flow of processing for locking the upper side in step S2503 in FIG. 25. First, in step S3001, the layout editing application 121 acquires the minimum Y-coordinate of the upper sides of all containers laid out. In step S3002, the acquired minimum Y-coordinate is substituted into Min_Y. In step S3003, 1 is substituted into the variable i. In step S3004, 0 is substituted into the variable k. In step S3005, the layout editing application 121 prepares Lock_Cont[ ] and initializes it by 0. The variable i indicates a container number. The variable k indicates the subscript of Lock_Cont[ ]. Lock_Cont[ ] is an array to store the number of a container as a lock target.

The processing advances the step S3006, the layout editing application 121 checks whether the Y-coordinate of the upper side of the ith container equals Min_Y. If the values equal (YES in step S3006), the processing advances to step S3007 to substitute the variable i into Lock_Cont[k]. The variables k and i are incremented (S3008 and S3009).

If the values do not equal in step S3006 (NO in step S3006), the layout editing application 121 increments the variable i without substituting it into Lock_Cont (S3009). The processing advances the step S3010 to confirm whether the processing is ended for all containers. If the processing is not ended (NO in step S3010), the flow returns to step S3006 to repeat the processing. If the processing is ended (YES in step S3010), the processing advances to step S3011 to substitute 0 into the variable k. The processing advances the step S3012. The layout editing application 121 checks the value Lock_ Cont[k]. If the value is 0 (YES in step S3012), the processing is ended without setting lock. If the value is not 0 (NO in step S3012), the processing advances the step S3013 to lock the upper side of the Lock_Cont[k]th container. The processing advances the step S3014 to increment the variable k (S3014). The processing in steps S3013 and S3014 is repeated until the value Lock_Cont[k] becomes 0. With this processing, of the sides of containers with links set, the side located at the uppermost position in the page is locked. If a plurality of sides are detected, all the plurality of detected sides are locked.

FIG. 31 is a view showing the locked state of the upper sides of containers. Referring to FIG. 31, reference numeral 3101 denotes a rectangle to designate selection of a plurality of containers; 3102 and 3103, links; and 3104, a minimum Y-coordinate. As shown in FIG. 31, in a case where the processing in FIG. 30 is executed, the upper side of each container at the minimum Y-coordinate is locked.

Figure 32:
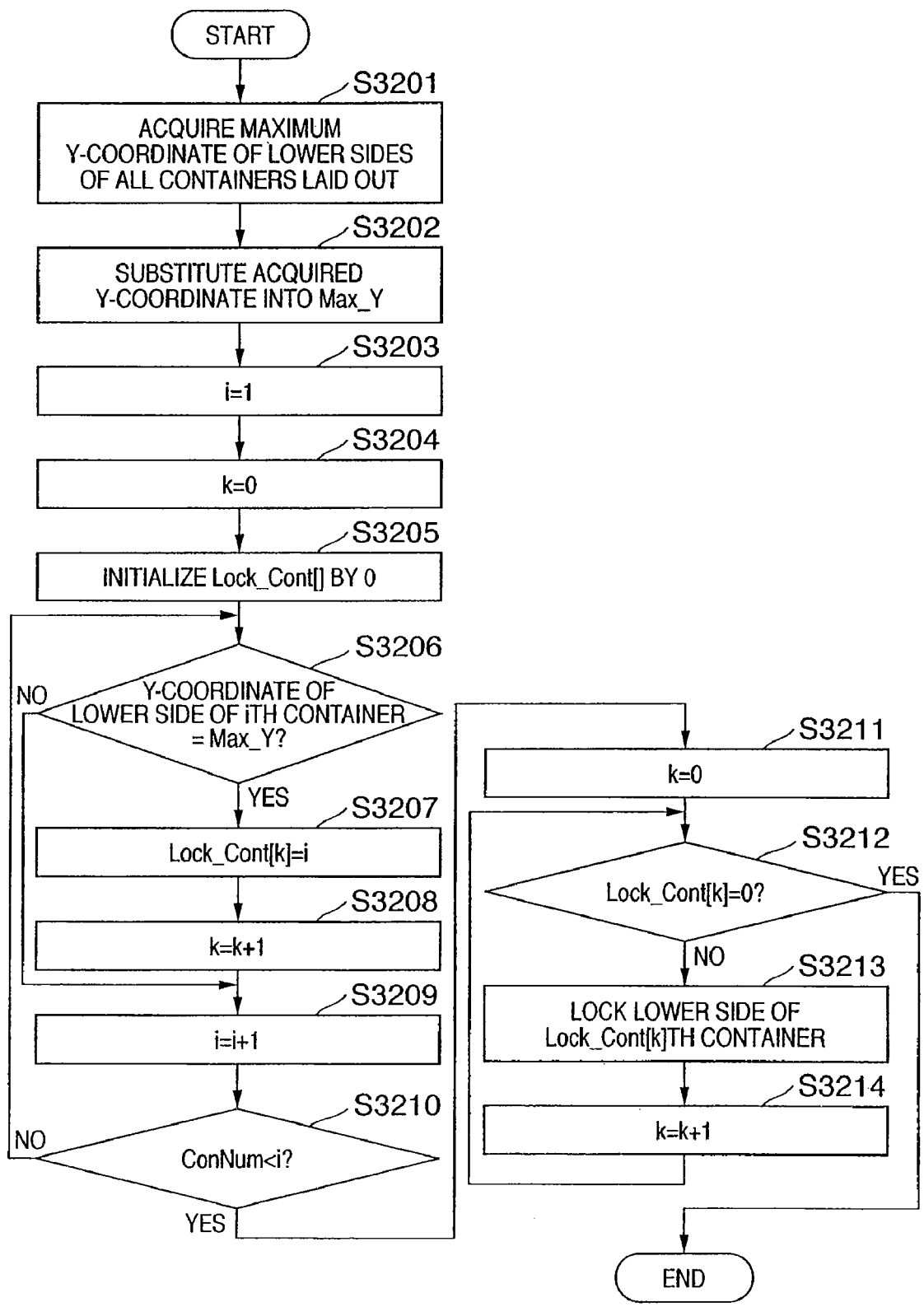
FIG. 32 is a flowchart for explaining details of the flow of processing for locking the lower side in step S2504 in FIG. 25.

FIG. 32 is a flowchart for explaining details of the flow of processing for locking the lower side in step S2504 in FIG. 25. First, in step S3201, the layout editing application 121 acquires the maximum Y-coordinate of the lower sides of all containers laid out. In step S3202, the acquired maximum Y-coordinate is substituted into Max_Y. In step S3203, 1 is substituted into the variable i. In step S3204, 0 is substituted into the variable k. In step S3205, Lock_Cont[ ] is prepared and initialized by 0. The variable i indicates a container number. The variable k indicates the subscript of Lock_Cont[ ]. Lock_Cont[ ] is an array to store the number of a container as a lock target.

The processing advances the step S3206. The layout editing application 121 checks whether the Y-coordinate of the lower side of the ith container equals Max_Y. If the values equal, the processing advances to step S3207 to substitute the variable i into Lock_Cont[k]. In step S3208, the variables k and i are incremented (S3208 and S3209).

If the values do not equal in step S3206 (NO in step S3206), the variable i is incremented without substituting it into Lock_Cont (S3209). It is confirmed whether the processing is ended for all containers (S3210). If the processing is not ended (NO in step S3210), the flow returns to step S3206 to repeat the processing. If the processing is ended (YES in step S3210), the processing advances to step S3211 to substitute 0 into the variable k. The processing advances the step S3212. The layout editing application 121 checks the value Lock_ Cont[k]. If the value is 0, the processing is ended without setting lock. If the value is not 0 (NO in step S3212), the lower side of the Lock_Cont[k]th container is locked (S3213). The processing advances the step S3214 to increment the variable k. The processing in steps S3213 and S3214 is repeated until the value Lock_Cont[k] becomes 0. With this processing, of the sides of containers with links set, the side located at the lowermost position in the page is locked. If a plurality of sides are detected, all the plurality of detected sides are locked.

Figure 33:
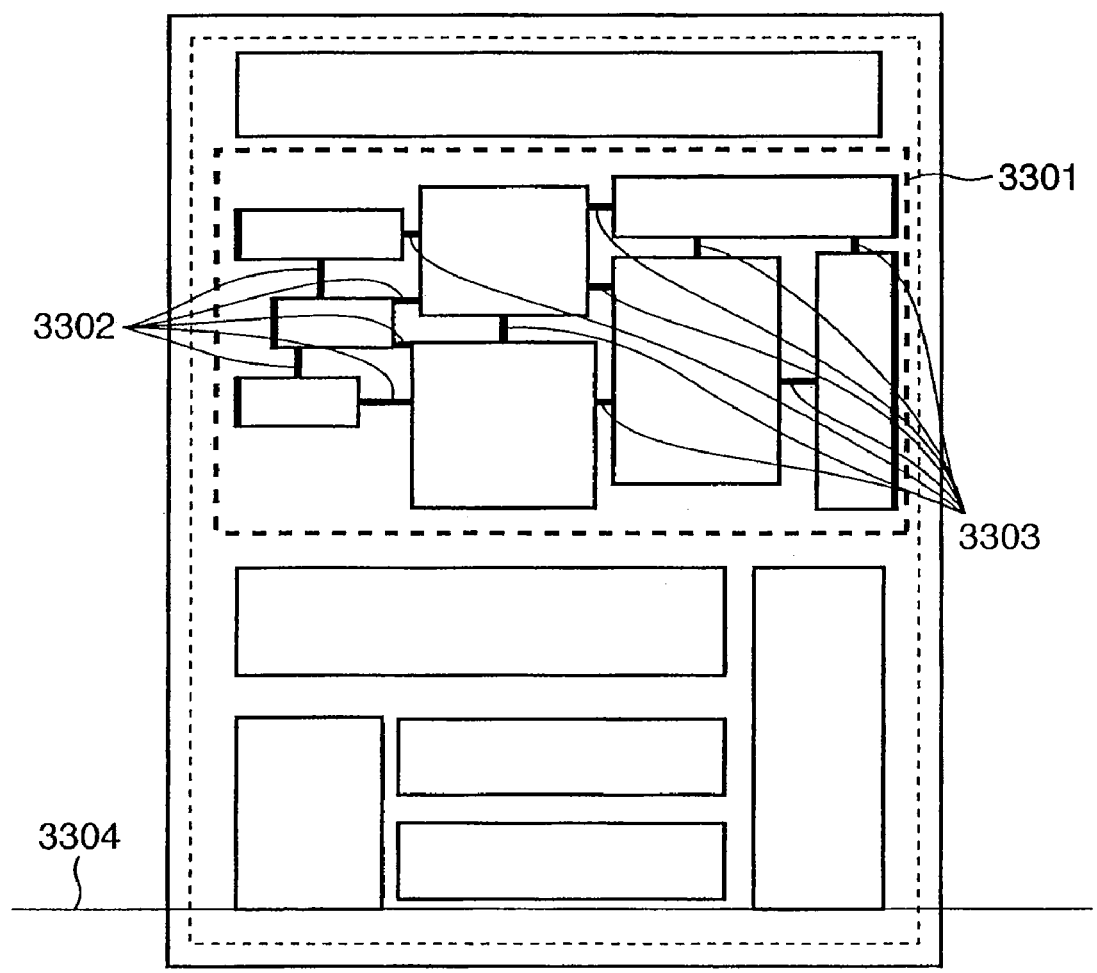
FIG. 33 is a view showing the locked state of the lower sides of containers.

FIG. 33 is a view showing the locked state of the lower sides of containers. Referring to FIG. 33, reference numeral 3301 denotes a rectangle to designate selection of a plurality of containers; 3302 and 3303, links; and 3304, a maximum Y-coordinate. As shown in FIG. 33, in a case where the processing in FIG. 32 is executed, the lower side of each container at the maximum Y-coordinate is locked.

Figure 34:
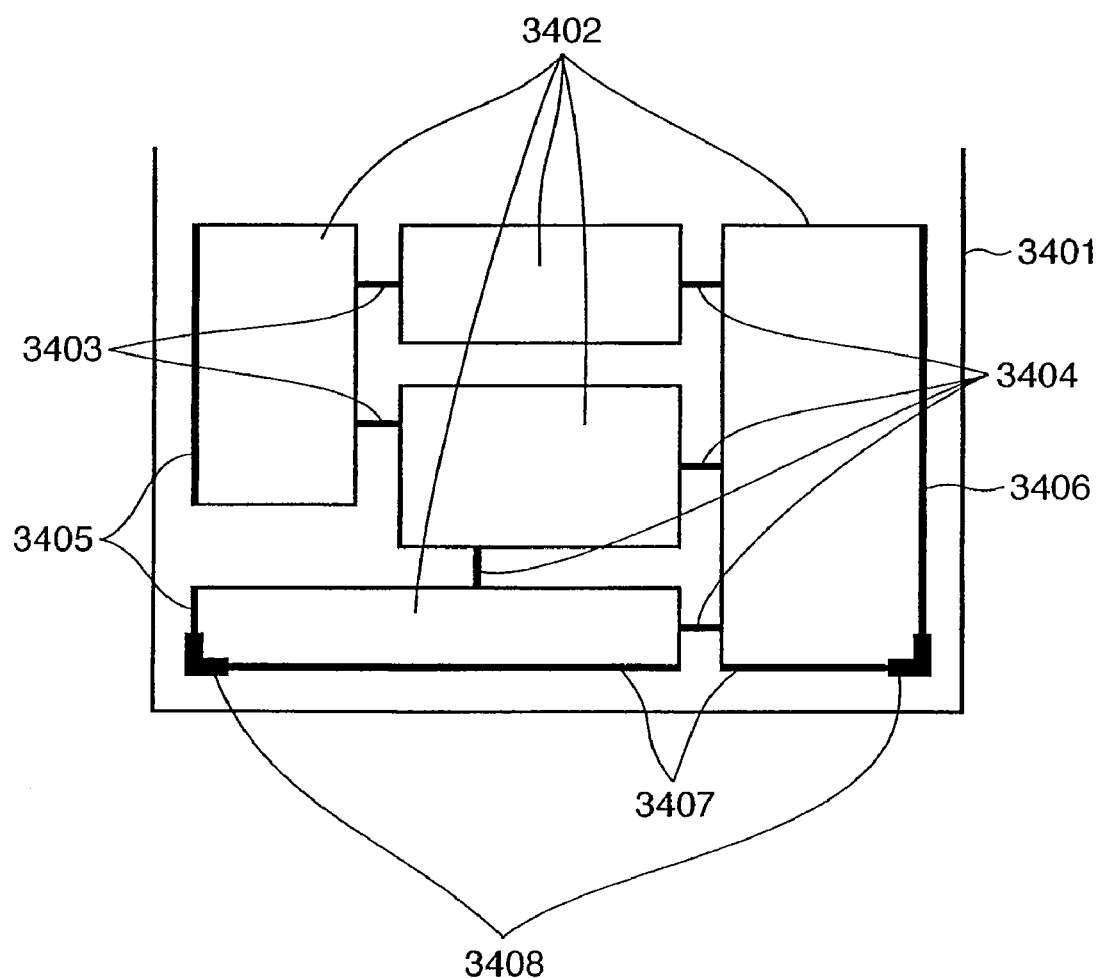
FIG. 34 is a view showing an anchor set state.

FIG. 34 is a view showing an anchor set state. Reference numeral 3401 denotes a page edge; 3402, containers; 3403 and 3404, links; and 3405, 3406, and 3407, locked sides. The sides 3407 located at the outermost position in the page are locked by the above-described processing. In a case where the vertical and lateral sides of a single container are locked, and the corner of the container is fixed, an anchor 3408 is set automatically.

(Setting of Flexible Link)

Figure 35:
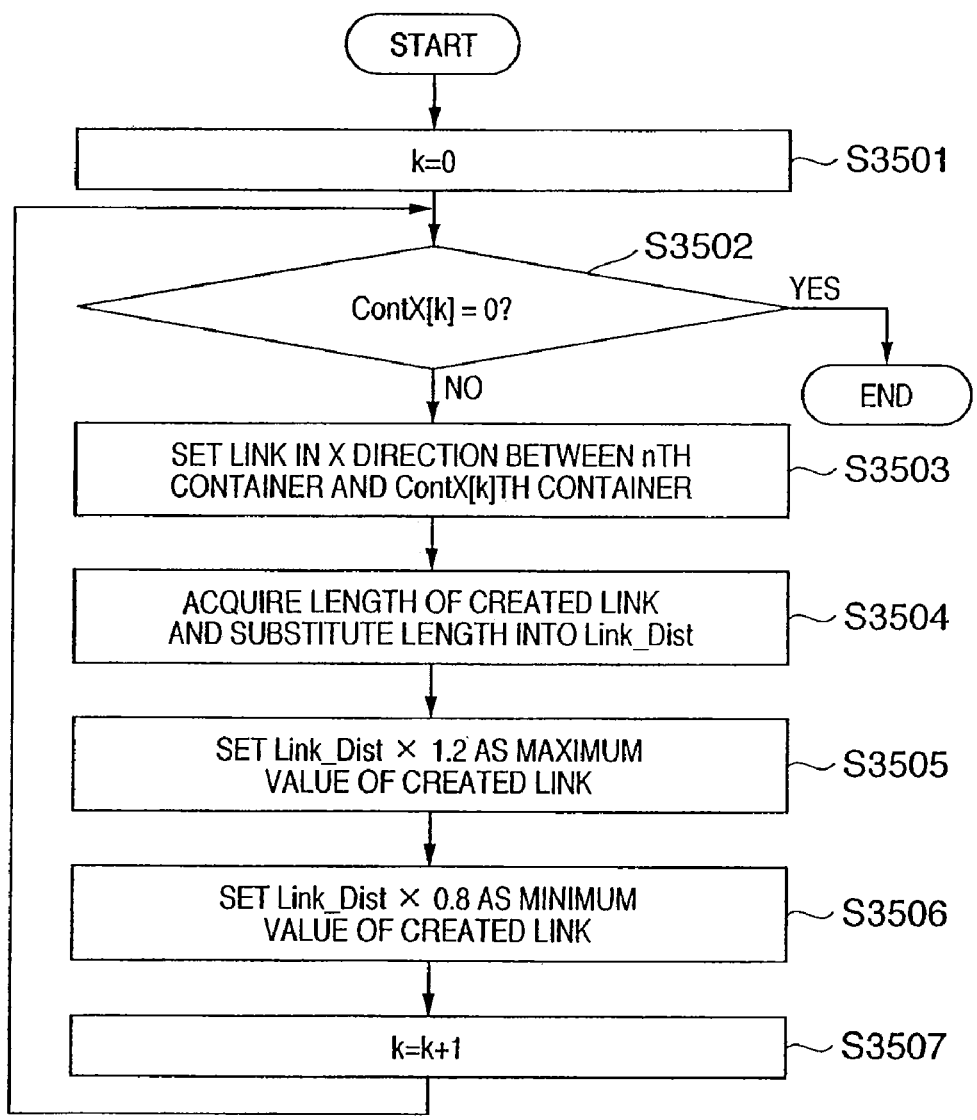
FIG. 35 is a flowchart for explaining the flow of processing for setting a flexible link having maximum and minimum values.

FIGS. 35 and 36 are flowcharts for explaining the flow of processing for setting a flexible link having maximum and minimum values instead of creating a link having a fixed length in the above-described batch link creation processing. The operation of selecting containers for which links are to be set is the same as the above-described contents, and a description thereof will be omitted. Processing of setting the maximum and minimum values of a flexible link is implemented by changing the flows shown in FIGS. 20 and 23. Only changed points will be described here.

FIG. 35 is a flowchart for explaining the flow of processing for setting a link having a flexible length in the flowchart of X-direction link creation shown in FIG. 20. In step S3501, the layout editing application 121 substitutes 0 into the variable k. In step S3502, the value ContX[k] is checked. If the value is 0 (YES in step S3502), the link creation processing is ended. If the value is not 0 (NO in step S3502), the processing advances the step S3503 to set an X-direction link between the nth container and the ContX[k]th container. In step S3504, the length of the created link is substituted into Link_Dist. In step S3505, Link_Dist is multiplied by a coefficient of 1.2, and the resultant value is set as the maximum value of the created link. In addition, Link_Dist is multiplied by a coefficient of 0.8, and the resultant value is set as the minimum value of the created link (S3506). In step S3507, the variable k is incremented. If containers for which a link is to be set remain, the processing in steps S3503 to S3506 is repeated.

FIG. 36 is a flowchart for explaining the flow of processing for setting a link having a flexible length in the flowchart of Y-direction link creation shown in FIG. 23. In step S3601, 1 is substituted into the variable k. In step S3602, the value ContY[k] is checked. If the value is 0, the link creation processing is ended. If the value is not 0 (NO in step S3602), the processing advances the step S3603 to set a Y-direction link between the nth container and the ContY[k]th container. In step S3604, the length of the created link is substituted into Link_Dist. In step S3605, Link_Dist is multiplied by a coefficient of 1.2, and the resultant value is set as the maximum value of the created link. In addition, Link_Dist is multiplied by a coefficient of 0.8, and the resultant value is set as the minimum value of the created link (S3606). In step S3607, the variable k is incremented. If containers for which a link is to be set remain, the processing in steps S3603 to S3606 is repeated.

With the above-described processing in FIGS. 35 and 36, a value 120% of the length of the created link can be set as the maximum value, and a value 80% of the length can be set as the minimum value. However, the maximum and minimum values of the link length are not limited to the above-described coefficients and can arbitrarily be designated by the user through, e.g., the UI window shown in FIG. 48.

(Automatic Change of Setting of Container (Lock of Side within Range Designated by User))

Processing for locking a side within a range input by the user will be described next as processing for automatically changing setting of a container.

Figure 37:
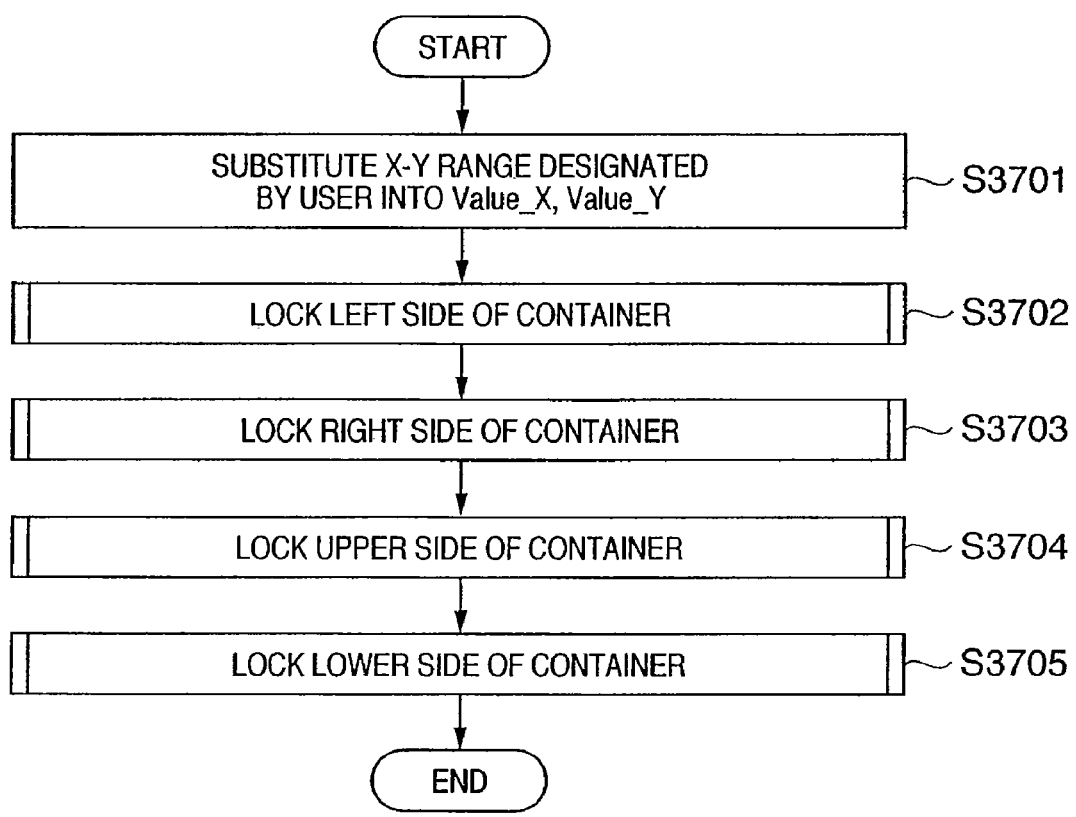
FIG. 37 is a flowchart for explaining the overall flow of processing for locking a side within a range designated by the user.

FIG. 37 is a flowchart for explaining the overall flow of this lock processing. In step S3701, the layout editing application 121 substitutes an X-Y range designated by user's input of the pointing device (132 or 133) into a variable "Value_X, Value_Y" which is held as designated range information. This range is a value to determine, as a lock target, a point inside the coordinates of the outermost side in the page. The sides of containers are locked by processing in steps S3702 to S3705. Lock of each side will be described below in detail.

(Lock of Left Side)

Figure 38:
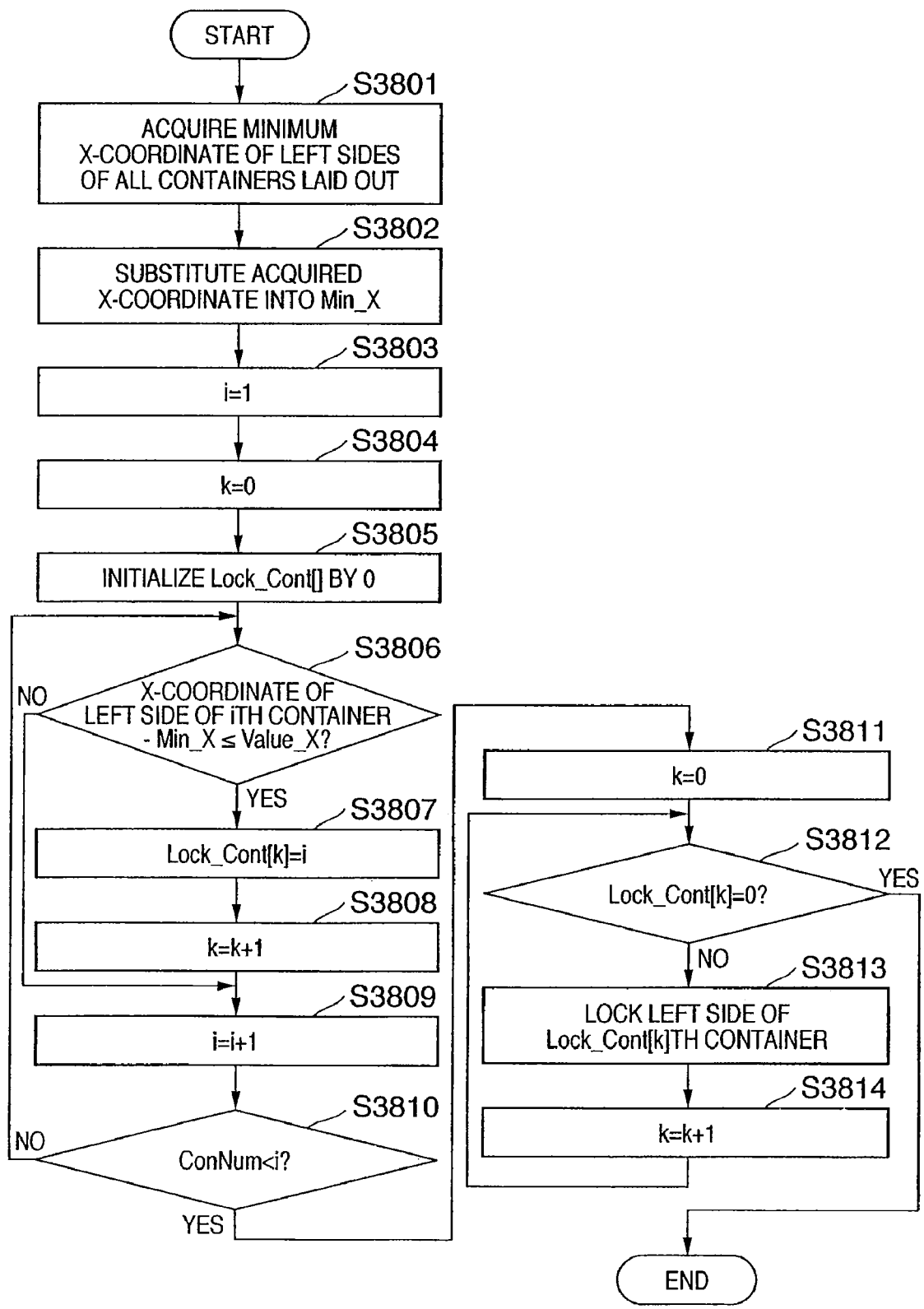
FIG. 38 is a flowchart for explaining details of the flow of processing for locking the left side of the container in step S3702 in FIG. 37.

FIG. 38 is a flowchart for explaining details of the flow of processing for locking the left side of a container in step S3702 in FIG. 37. First, in step S3801, the layout editing application 121 acquires the minimum X-coordinate of the left sides of all containers laid out. The acquired minimum X-coordinate is substituted into Min_X (S3802). In step S3803, 1 is substituted into the variable i. In step S3804, 0 is substituted into the variable k.

The layout editing application 121 prepares Lock_Cont[ ] and initializes it by 0 (S3805). The variable i indicates a container number. The variable k indicates the subscript of Lock_Cont[ ]. Lock_Cont[ ] is an array to store the number of a container as a lock target.

In step S3806, the layout editing application 121 subtracts Min_X from the X-coordinate of the left side of the ith container and checks whether the difference is equal to or smaller than Value_X as the X-coordinate of the designated range information. If the difference is equal to or smaller than Value_X (YES in step S3806), the ith container is present within the range designated as the lock target. Hence, the variable i is substituted into Lock_Cont[k] (S3807). The variables k and i are incremented (S3808 and S3809).

If the difference is not equal to or smaller than Value_X (NO in step S3806), the variable i is incremented without substituting it into Lock_Cont (S3809). It is confirmed whether the processing is ended for all containers (S3810). If the processing is not ended (NO in step S3810), the flow returns to step S3806 to repeat the processing. If the processing is ended (YES in step S3810), the processing advances to step S3811 to substitute 0 into the variable k. The processing advances the step S3812 to check the value Lock_Cont[k]. If the value is 0, the processing is ended without setting lock. If the value is not 0 (NO in step S3812), the processing advances the step S3813 to lock the left side of the Lock_Cont[k]th container. The processing advances the step S3814 to increment the variable k. The processing in steps S3813 and S3814 is repeated until the value Lock_Cont[k] becomes 0. With this processing, of the sides of containers with links set, all the left sides of containers which are present within the range designated by the user from the leftmost position in the page are locked.

Figure 39:
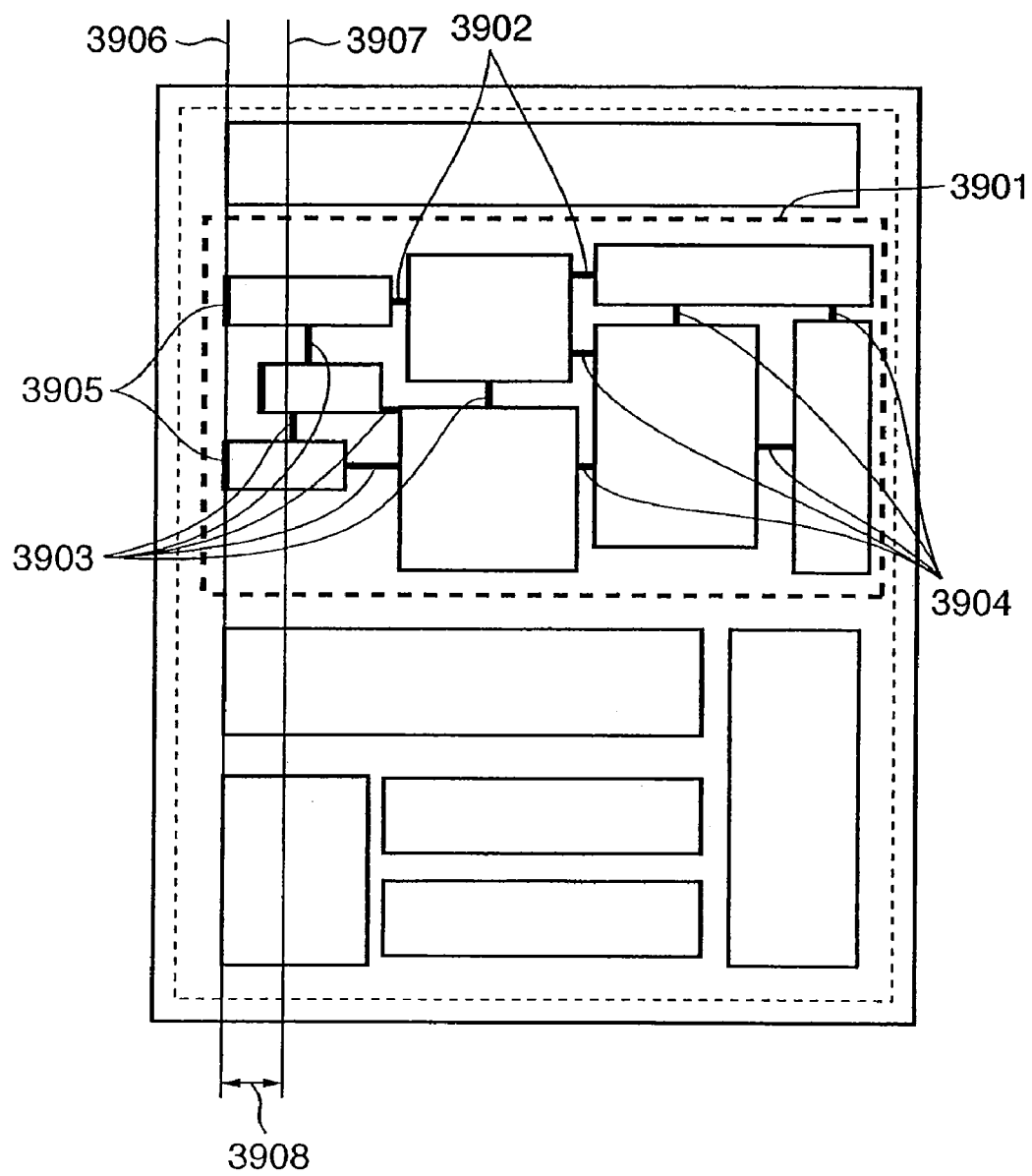
FIG. 39 is a view showing the locked state of the left sides of containers.

FIG. 39 is a view showing the locked state of the left sides of containers. Reference numeral 3901 denotes a rectangle to designate selection of a plurality of containers; 3902, 3903, and 3904, links; 3905, locked sides of containers; 3906, a minimum X-coordinate; 3907, a border of the range designated as the lock target; and 3908, Value_X. As shown in FIG. 39, in a case where the processing in FIG. 38 is executed, the left side of a container within the range designated by Value_X 3908 from the minimum X-coordinate 3906 is locked (3905). If the condition applies to a plurality of sides, all the plurality of sides are locked.

(Lock of Right Side)

Figure 40:
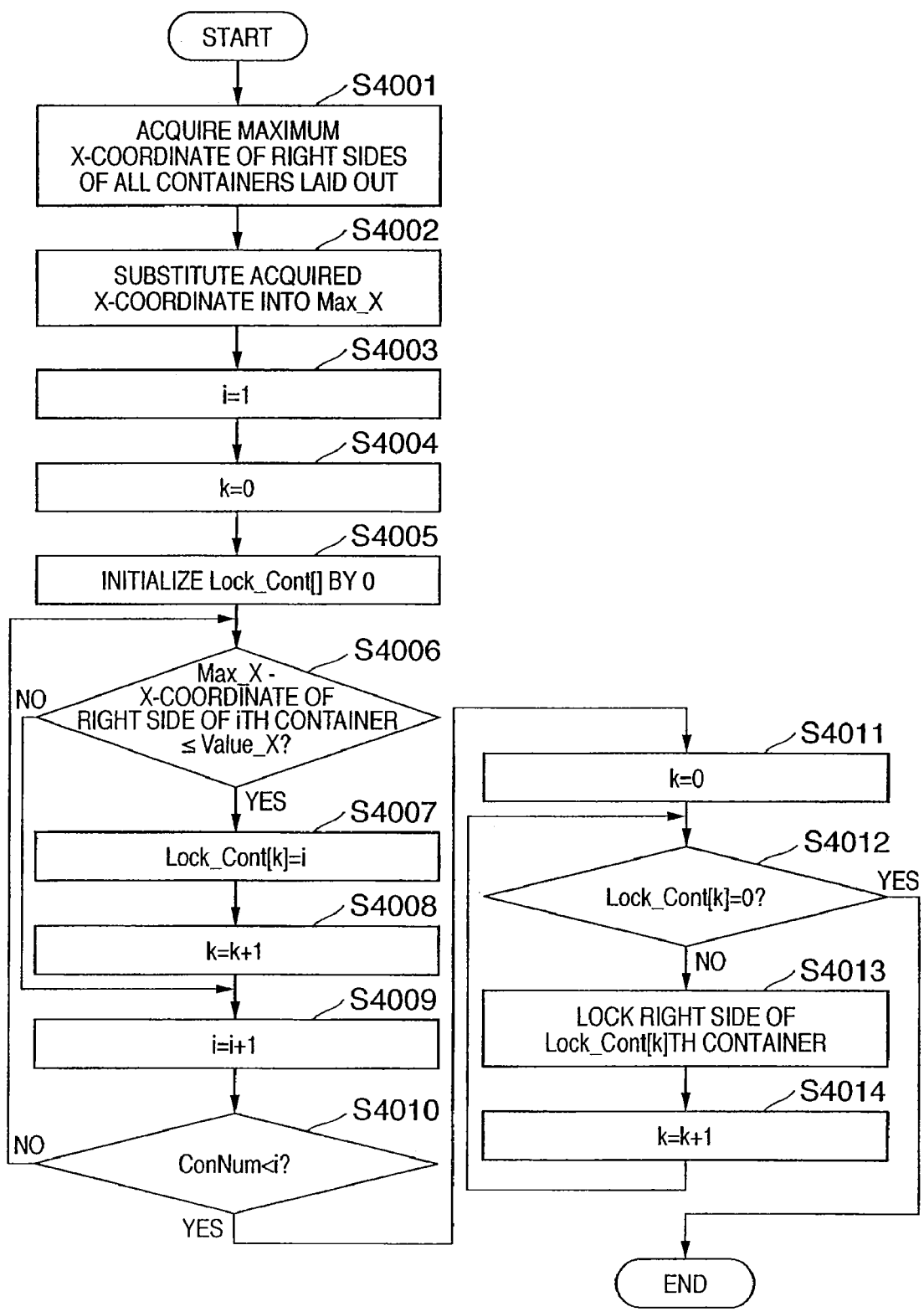
FIG. 40 is a flowchart for explaining details of the flow of processing for locking the right side of the container in step S3703 in FIG. 37.

FIG. 40 is a flowchart for explaining details of the flow of processing for locking the right side of a container in step S3703 in FIG. 37. First, in step S4001, the layout editing application 121 acquires the maximum X-coordinate of the right sides of all containers laid out. The acquired maximum X-coordinate is substituted into Max_X (S4002). In step S4003, 1 is substituted into the variable i. In step S4004, 0 is substituted into the variable k.

Lock_Cont[ ] is prepared and initialized by 0 (S4005). The variable i indicates a container number. The variable k indicates the subscript of Lock_Cont[ ]. Lock_Cont[ ] is an array to store the number of a container as a lock target. In step S4006, the X-coordinate of the right side of the ith container is subtracted from Max_X. It is checked whether the difference is equal to or smaller than Value_X as the X-coordinate of the designated range information. If the difference is equal to or smaller than Value_X (YES in step S4006), the ith container is present within the range designated as the lock target. Hence, the variable i is substituted into Lock_Cont[k] (S4007). The variables k and i are incremented (S4008 and S4009).

If the difference is not equal to or smaller than Value_X (NO in step S4006), the variable i is incremented without substituting it into Lock_Cont (S4009). It is confirmed whether the processing is ended for all containers (S4010). If the processing is not ended (NO in step S4010), the flow returns to step S4006 to repeat the processing. If the processing is ended (YES in step S4010), the processing advances to step S4011 to substitute 0 into the variable k. The processing advances the step S4012 to check the value Lock_Cont[k]. If the value is 0, the processing is ended without setting lock. If the value is not 0 (NO in step S4012), the processing advances the step S4013 to lock the right side of the Lock_Cont[k]th container. The processing advances the step S4014 to increment the variable k. The processing in steps S4013 and S4014 is repeated until the value Lock_Cont[k] becomes 0. With this processing, of the sides of containers with links set, all the right sides of containers which are present within the range designated by the user from the rightmost position in the page are locked.

Figure 41:
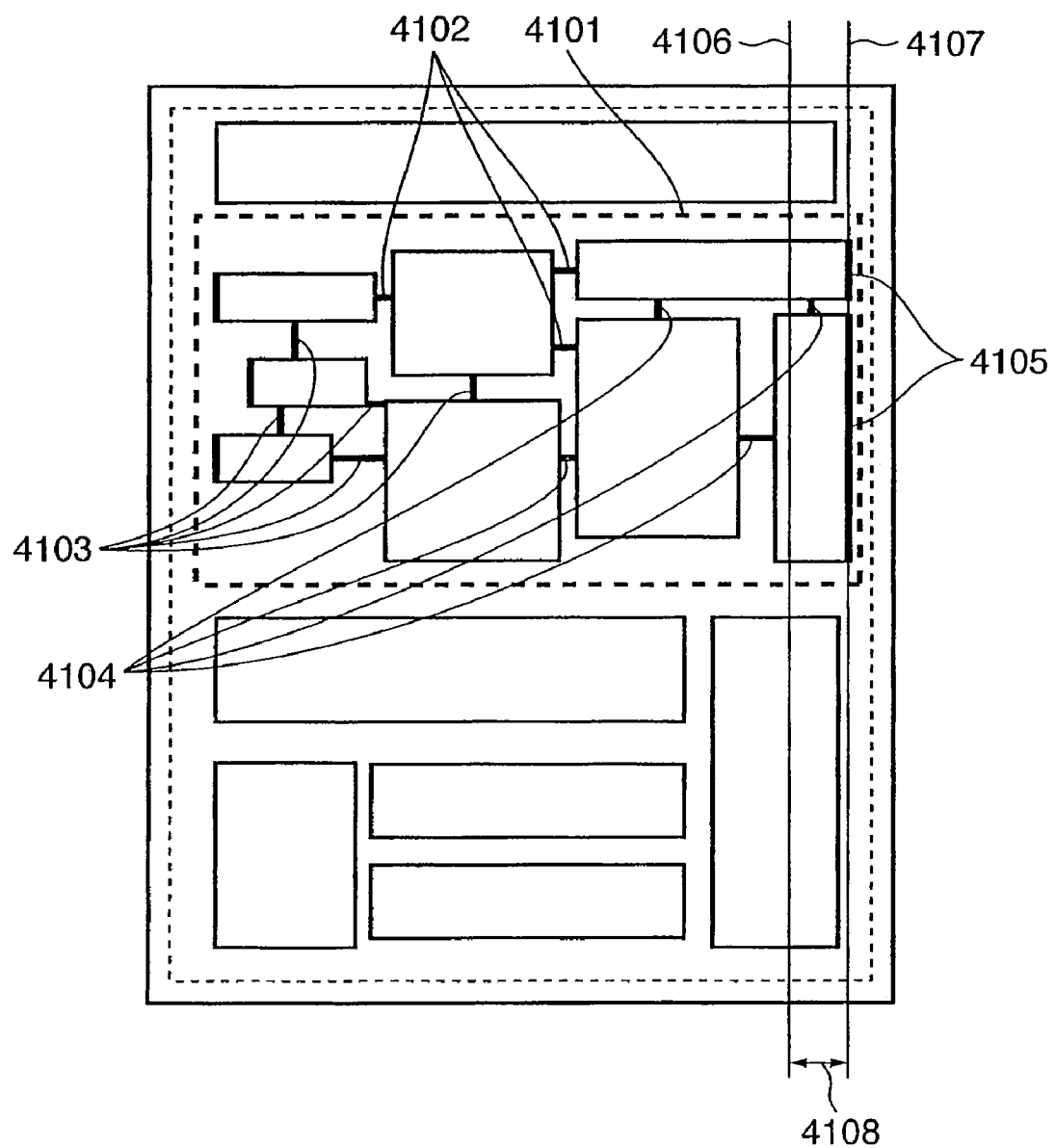
FIG. 41 is a view showing the locked state of the right sides of containers.

FIG. 41 is a view showing the locked state of the right sides of containers. Reference numeral 4101 denotes a rectangle to designate selection of a plurality of containers; 4102, 4103, and 4104, links; 4105, locked sides of containers; 4107, a maximum X-coordinate; 4106, a border of the range designated as the lock target; and 4108, Value_X. As shown in FIG. 41, in a case where the processing in FIG. 40 is executed, the right side of a container within the range designated by Value_X 4108 from the maximum X-coordinate is locked (4105). If the condition applies to a plurality of sides, all the plurality of sides are locked.

(Lock of Upper Side)

Figure 42:
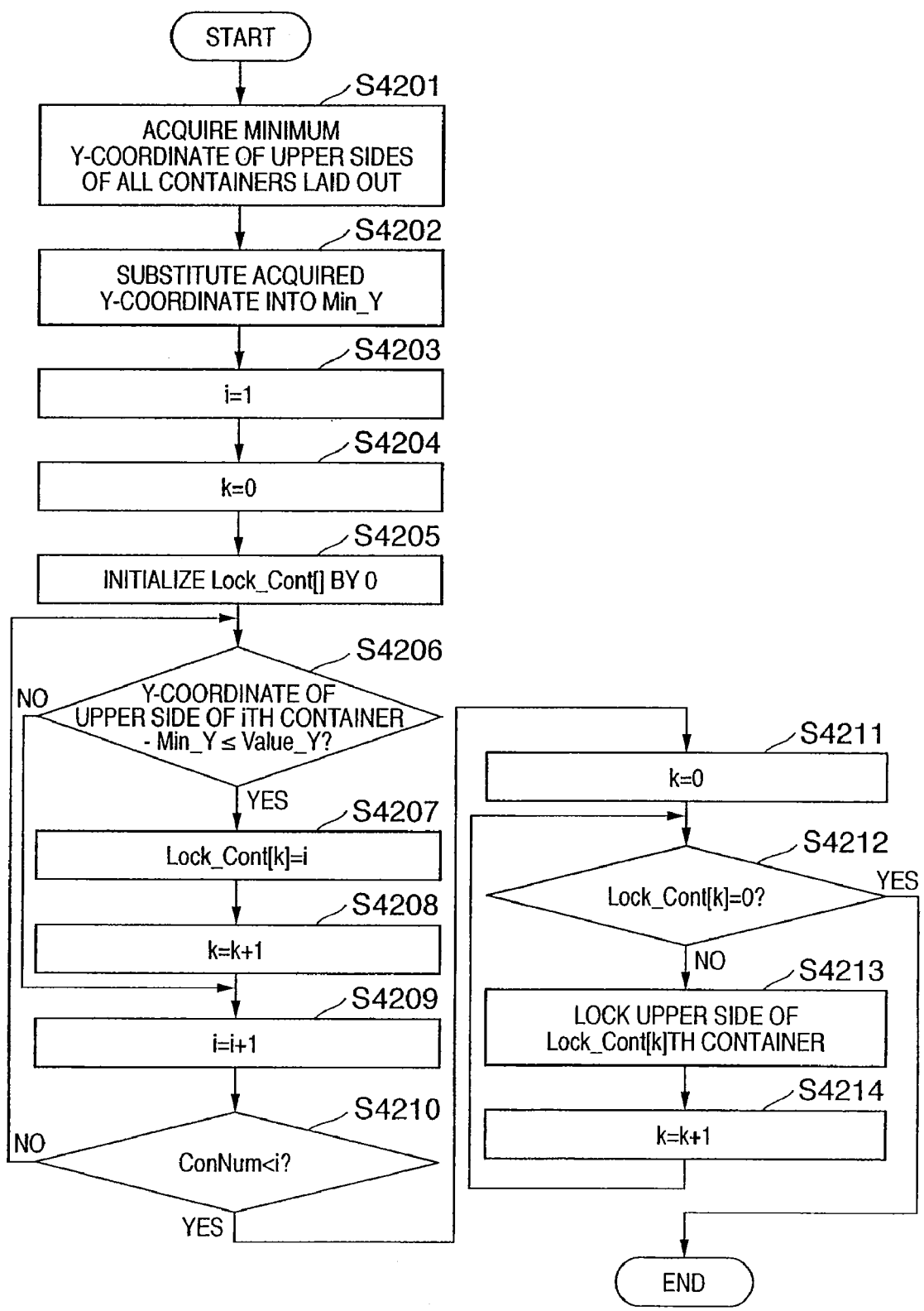
FIG. 42 is a flowchart for explaining details of the flow of processing for locking the upper side of the container in step S3704 in FIG. 37.

FIG. 42 is a flowchart for explaining details of the flow of processing for locking the upper side of a container in step S3704 in FIG. 37. First, in step S4201, the minimum Y-coordinate of the upper sides of all containers laid out is acquired. The acquired minimum Y-coordinate is substituted into Min_Y (S4202). In step S4203, 1 is substituted into the variable i. In step S4204, 0 is substituted into the variable k.

Lock_Cont[ ] is prepared and initialized by 0 (S4205). The variable i indicates a container number. The variable k indicates the subscript of Lock_Cont[ ]. Lock_Cont[ ] is an array to store the number of a container as a lock target. In step S4206, Min_Y is subtracted from the Y-coordinate of the upper side of the ith container. It is checked whether the difference is equal to or smaller than Value_Y. If the difference is equal to or smaller than Value_Y (YES in step S4206), the ith container is present within the range designated as the lock target. Hence, the variable i is substituted into Lock_Cont[k] (S4207). The variables k and i are incremented (S4208 and S4209).

If the difference is not equal to or smaller than Value_Y (NO in step S4206), the variable i is incremented without substituting it into Lock_Cont (S4209). It is confirmed whether the processing is ended for all containers (S4210). If the processing is not ended (NO in step S4210), the flow returns to step S4206 to repeat the processing. If the processing is ended (YES in step S4210), the processing advances to step S4211 to substitute 0 into the variable k. The processing advances the step S4212 to check the value Lock_Cont[k]. If the value is 0, the processing is ended without setting lock. If the value is not 0 (NO in step S4212), the processing advances the step S4213 to lock the upper side of the Lock_Cont[k]th container. The processing advances the step S4214 to increment the variable k. The processing in steps S4213 and S4214 is repeated until the value Lock_Cont[k] becomes 0. With this processing, of the sides of containers with links set, all the upper sides of containers which are present within the range designated by the user from the uppermost position in the page are locked.

Figure 43:
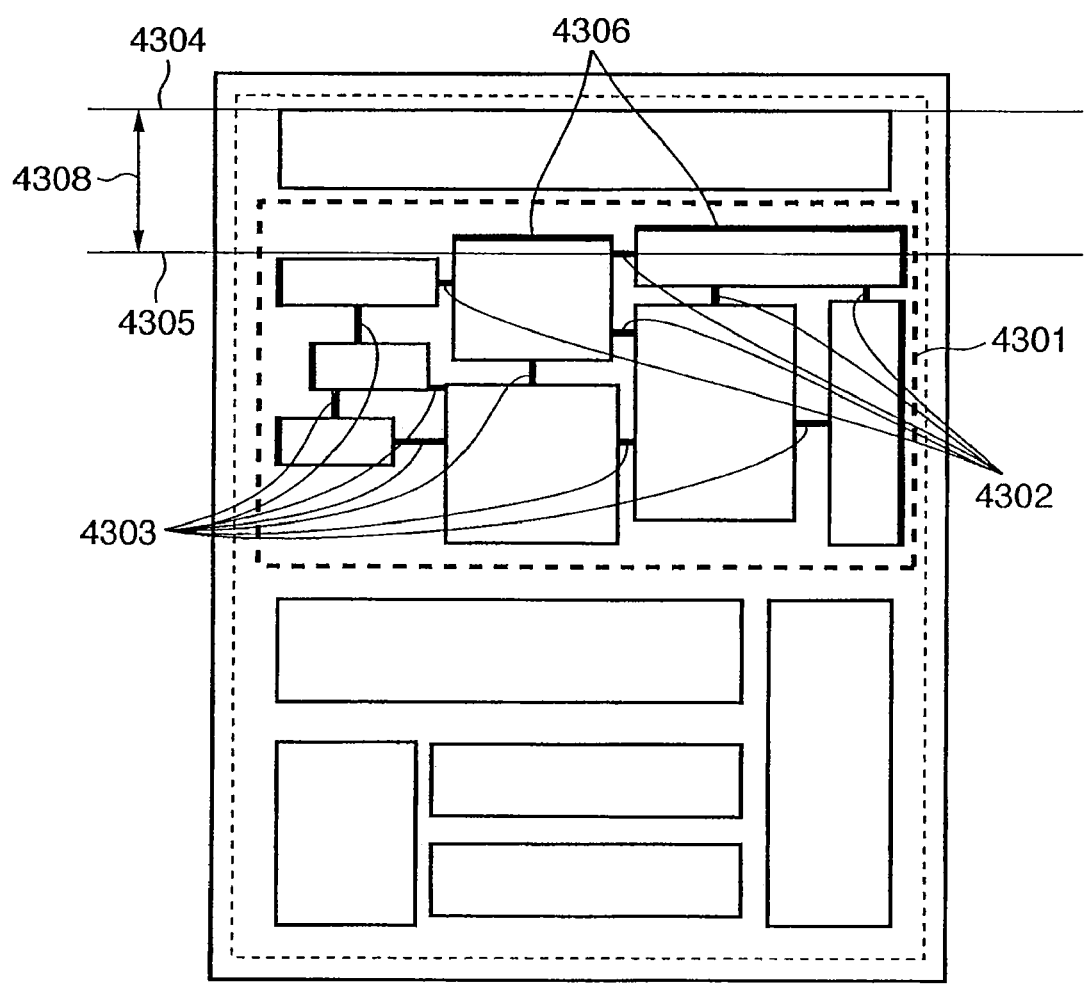
FIG. 43 is a view showing the locked state of the upper sides of containers.

FIG. 43 is a view showing the locked state of the upper sides of containers. Reference numeral 4301 denotes a rectangle to designate selection of a plurality of containers; 4302 and 4303, links; 4304, a minimum Y-coordinate; 4305, a border of the range designated as the lock target; and 4308, Value_Y. As shown in FIG. 43, in a case where the processing in FIG. 42 is executed, the upper side of a container within the range designated by Value_Y 4308 from the minimum Y-coordinate is locked (4306). If the condition applies to a plurality of sides, all the plurality of sides are locked.

(Lock of Lower Side)

Figure 44:
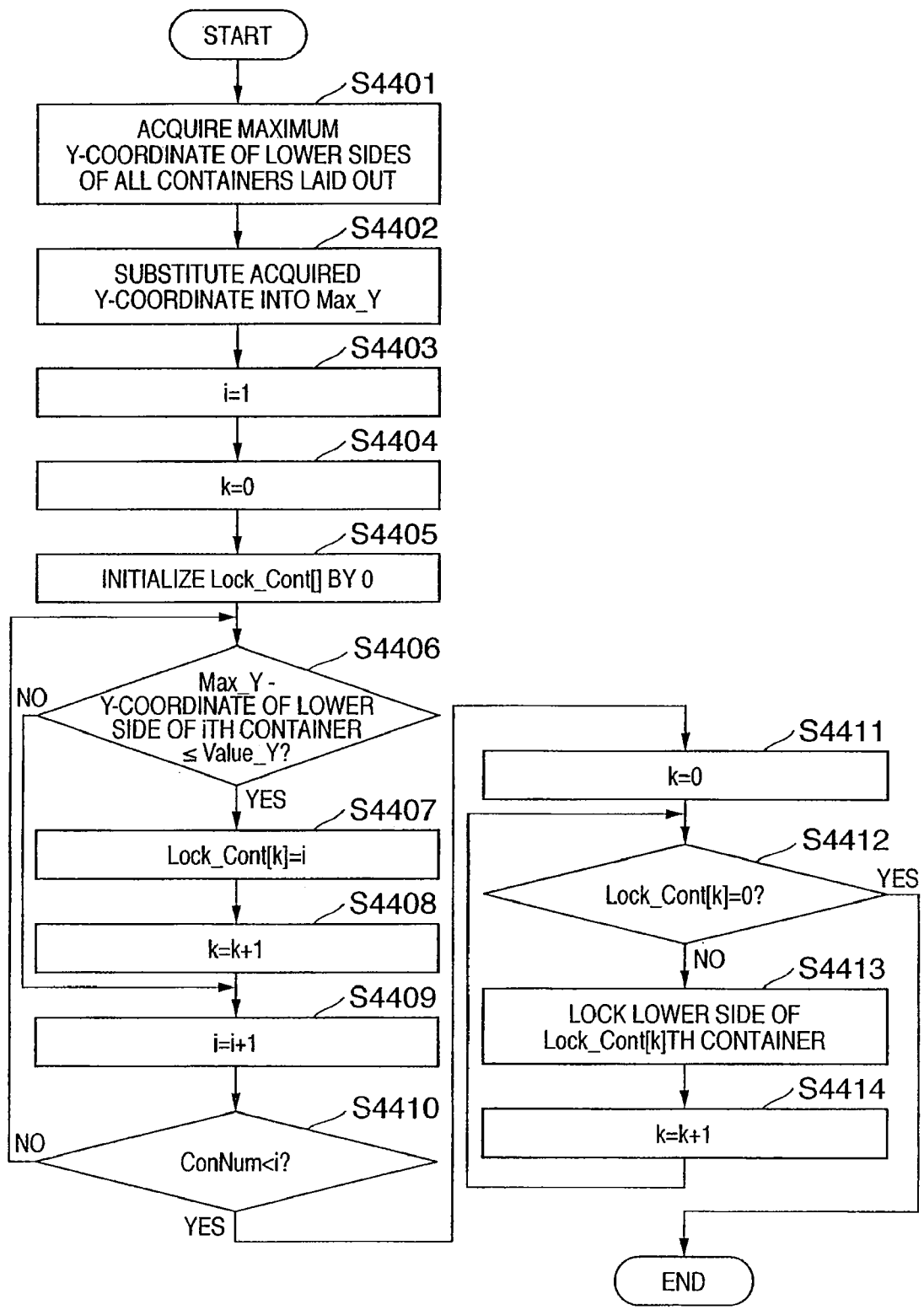
FIG. 44 is a flowchart for explaining details of the flow of processing for locking the lower side of the container in step S3705 in FIG. 37.

FIG. 44 is a flowchart for explaining details of the flow of processing for locking the lower side of a container in step S3705 in FIG. 37. First, in step S4401, the maximum Y-coordinate of the lower sides of all containers laid out is acquired. The acquired maximum Y-coordinate is substituted into Max_Y (S4402). In step S4403, 1 is substituted into the variable i. In step S4404, 0 is substituted into the variable k.

Lock_Cont[ ] is prepared and initialized by 0 (S4405). The variable i indicates a container number. The variable k indicates the subscript of Lock_Cont[ ]. Lock_Cont[ ] is an array to store the number of a container as a lock target. In step S4406, the Y-coordinate of the lower side of the ith container is subtracted from Max_Y. It is checked whether the difference is equal to or smaller than Value_Y. If the difference is equal to or smaller than Value_Y (YES in step S4406), the ith container is present within the range designated as the lock target. Hence, the variable i is substituted into Lock_Cont[k] (S4407). The variables k and i are incremented (S4408 and S4409).

If the difference is not equal to or smaller than Value_Y (NO in step S4406), the variable i is incremented without substituting it into Lock_Cont (S4409). It is confirmed whether the processing is ended for all containers (S4410). If the processing is not ended (NO in step S4410), the flow returns to step S4406 to repeat the processing. If the processing is ended (YES in step S4410), the processing advances to step S4411 to substitute 0 into the variable k. The processing advances the step S4412 to check the value Lock_Cont[k]. If the value is 0, the processing is ended without setting lock. If the value is not 0 (NO in step S4412), the processing advances the step S4413 to lock the lower side of the Lock_Cont[k]th container. The processing advances the step S4414 to increment the variable k. The processing in steps S4413 and S4414 is repeated until the value Lock_Cont[k] becomes 0. With this processing, of the sides of containers with links set, all the lower sides of containers which are present within the range designated by the user from the lowermost position in the page are locked. If the condition applies to a plurality of sides, all the plurality of sides are locked.

Figure 45:
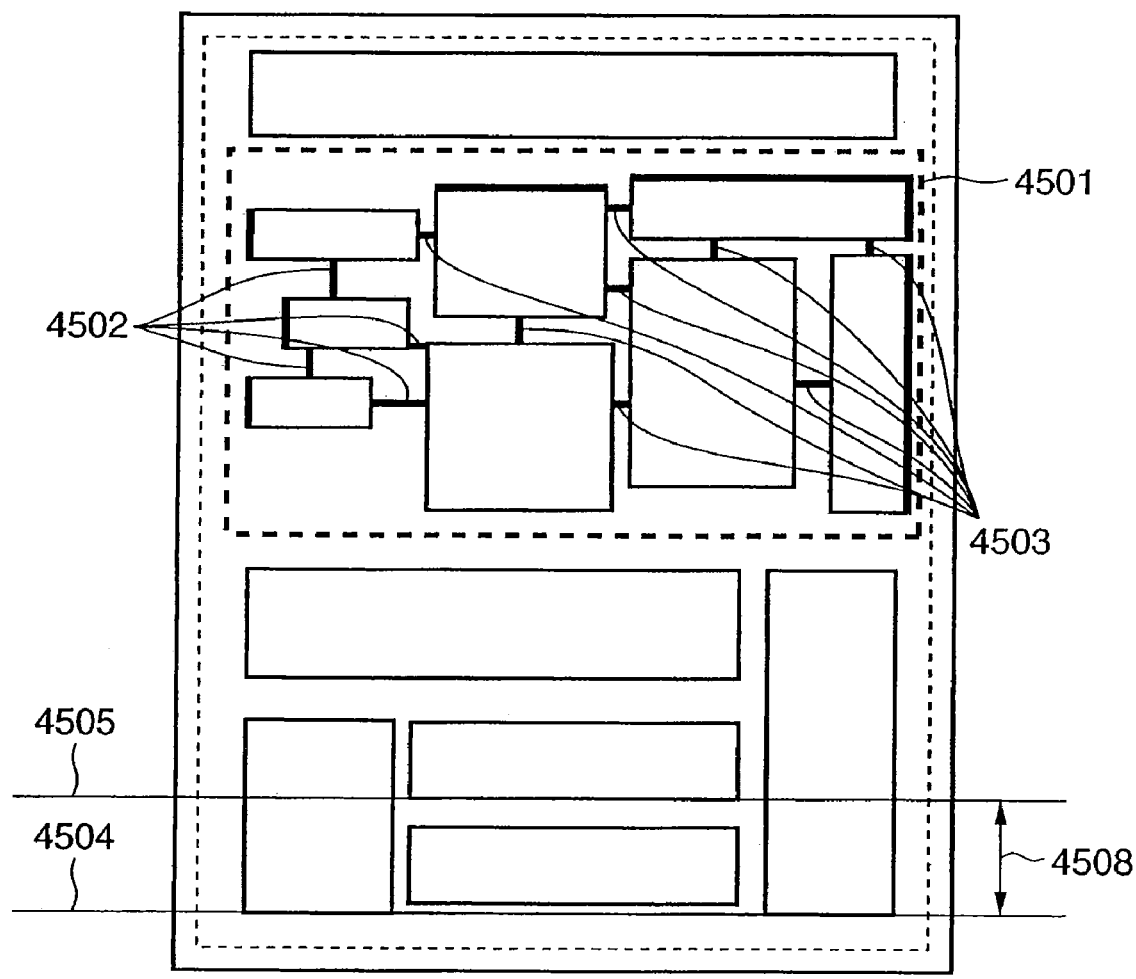
FIG. 45 is a view showing the locked state of the lower sides of containers.

FIG. 45 is a view showing the locked state of, the lower sides of containers. Reference numeral 4501 denotes a rectangle to designate selection of a plurality of containers; 4502 and 4503, links; 4504, a maximum Y-coordinate; 4505, a border of the range designated as the lock target; and 4508, Value_Y. As shown in FIG. 45, in a case where the processing in FIG. 44 is executed, the lower side of a container within the range designated by Value_Y from the maximum Y-coordinate is locked. In this example, since no containers as lock targets are present within the selected range, no lower sides are locked.

As described above, according to this embodiment, links can be set at once between a plurality of containers by one operation. Hence, an efficient operation can be implemented.

Other Embodiment

The object of the present invention can also be achieved by supplying a storage medium which stores software program codes for implementing the functions of the above-described embodiments to a system or apparatus and causing the computer (or a CPU or MPU) of the system or apparatus to read out and execute the program codes stored in the storage medium.

In this case, the program codes read out from the storage medium implement the functions of the above-described embodiments by themselves, and the storage medium which stores the program codes constitutes the present invention.

As the storage medium for supplying the program codes, for example, a flexible disk, hard disk, optical disk, magnetooptical disk, CD-ROM, CD-R, magnetic tape, nonvolatile memory card, ROM, or the like can be used.

The functions of the above-described embodiments are implemented not only in a case where the readout program codes are executed by the computer but also in a case where the operating system (OS) running on the computer performs part or all of actual processing on the basis of the instructions of the program codes.

The functions of the above-described embodiments are also implemented in a case where the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-024589 filed on Jan. 30, 2004 and No. 2004-371886 filed on Dec. 22, 2004, which are hereby incorporated by reference herein.

What is claimed is:
1. A layout control method which performs layout processing based on a template on which a plurality of partial regions are laid out and data which is assigned to the plurality of partial regions, comprising:

an instruction step of instructing, on a computer, setting of a link indicating a distance between two partial regions;
a first designation step of designating, on the computer, as a type of the link to be set to connect the two partial regions, a flexible type for a link whose length indicates that the distance between the two partial regions is changed;
a display step of displaying, on the computer, a link setting user interface for selecting a link setting mode, the link setting user interface comprising two mode options, the two mode options being (i) a first mode to connect the link to a plurality of partial regions laid out in a vertical direction, a horizontal direction, or in both horizontal and vertical directions, to a reference partial region selected from the plurality of partial regions, and (ii) a second mode to connect the link to a partial region laid out at a nearest position to the reference partial region;
wherein, when the first mode is selected by the link setting user interface:
providing, on the computer, a link creation direction user interface for choosing one of three setting direction modes, the modes including a setting direction mode in the horizontal direction, a setting direction mode in the vertical direction, and a setting direction mode in both the horizontal and vertical directions;
specifying, on the computer, (i) at least two partial regions laid out in the vertical direction to the reference partial region, (ii) at least two partial regions laid out in the horizontal direction to the reference partial region, or (iii) at least two partial regions laid out in both the vertical and horizontal directions to the reference partial region;
deciding, based on the selection from the link creation direction user interface the (i) the plurality of partial regions laid out in the vertical direction to the reference partial region, as object partial regions, (ii) the plurality of partial regions laid out in the horizontal direction to the reference partial region, as object partial regions, or (iii) the plurality of partial regions laid out in both the vertical and horizontal directions to the reference partial region, as object partial regions;
setting, on the computer, a link of the flexible type designated in the first designation step between the reference partial region and each of the object partial regions, a size of the reference partial region being different from a size of each of the object partial regions; and
providing a layout control step for controlling, on the computer, the layout processing between the reference partial region and each of the object partial regions to be laid out on the page, the layout control step changing the size of the reference partial region and each size of the object partial regions connected to the reference partial region by the link set in the setting step so that the amount of change of the reference partial region and the amount of change of each of the object partial regions, which are generated based on the data to be assigned to the reference partial region and each of the object partial regions, are equal, and
wherein, when the second mode is selected by the link setting user interface:
deciding, on the computer, an object partial region laid out at a nearest position to the reference partial region;
setting, on the computer, a link of the flexible type designated in the first designation step between the reference partial region and the object partial region, a size of the reference partial region being different from a size of the object partial region; and providing a layout control step for controlling, on the computer, the layout processing between the reference partial region and the object partial region to be laid out on the page, the layout control step changing the size of the reference partial region and the size of the object partial region connected to the reference partial region by the link set in the setting step so that the amount of change of the reference partial region and the amount of change of the object partial region, which are generated based on the data to be assigned to the reference partial region and the object partial region, are equal.

2. The method according to claim 1, wherein in the layout control step, a length of the link is flexibly controlled (i) in accordance with a change of size of each of the object partial regions when the first mode is selected by the link setting user interface, and (ii) in accordance with a change of size of the object partial region when the second mode is selected by the link setting user interface.

3. The method according to claim 1, wherein in the layout control step, when the first mode is selected by the link setting user interface, it is determined whether each layout position of the object partial regions, after change of the size, is located at a position on the page where the layout has a constraint, and if each layout position of the object partial regions is located at the position with the constraint, each size of the object partial regions is set again without causing violation of the constraint, and when the second mode is selected by the link setting user interface, it is determined whether a layout position of the object partial region, after change of the size, is located at a position on the page where the layout has a constraint and if the layout position of the object partial region is located at the position with the constraint, the size of the object partial region is set again without causing violation of the constraint.

4. The method according to claim 3, wherein in the layout control step, when the first mode is selected by the link setting user interface, a side included in each of the object partial regions, whose size is set again, is fixed to inhibit movement of the side, and when the second mode is selected by the link setting user interface, a side included in the object partial region, whose size is set again, is fixed to inhibit movement of the side.

5. A layout control apparatus which performs layout processing based on a template on which a plurality of partial regions are laid out and data which is assigned to the plurality of partial regions, the apparatus comprising:

a processor and a memory;

instruction means for instructing setting of a link indicating a distance between two partial regions;

first designation means for designating, as a type of the link to be set to connect the two partial regions, a flexible type for a link whose length indicates that the distance between the two partial regions is changed;

display means for displaying a link setting user interface for selecting a link setting mode, the link setting user interface comprising two mode options, the two mode options being (i) a first mode to connect the link for a plurality of partial regions laid out in a vertical direction, a horizontal direction, or in both horizontal and vertical directions, to a reference partial region selected from the plurality of partial regions, and (ii) a second mode to connect the link to a partial region laid out at a nearest position to the reference partial region, wherein the display means further displays, when the first mode is selected by the link setting user interface, a link creation user interface for choosing one of three setting direction modes, the modes including a setting direction mode in the horizontal direction, a setting direction mode in the vertical direction, and a setting direction mode in both the horizontal and vertical directions;

specifying means for specifying, when the first mode is selected by the link setting user interface, (i) at least two partial regions laid out in the vertical direction to the reference partial region, (ii) at least two partial regions laid out in the horizontal direction to the reference partial region, or (iii) at least two partial regions laid out in both the vertical and horizontal directions to the reference partial region;

deciding means for deciding:
(a) when the first mode is selected by the link setting user interface,(i) the plurality of partial regions laid out in the vertical direction to the reference partial region, as object partial regions, (ii) the plurality of partial regions laid out in the horizontal direction to the reference partial region, as object partial regions, or (iii) the plurality of partial regions laid out in both the vertical and horizontal directions to the reference partial region, as object partial regions, and
(b) when the second mode is selected by the link setting user interface, a partial region laid out at a nearest position to the reference partial region as an object partial region;

setting means for setting:
(a) when the first mode is selected by the link setting user interface, a link of the flexible type designated by the designation means between the reference partial region and each of the object partial regions, a size of the reference partial region being different from a size of each of the object partial regions, and
(b) when the second mode is selected by the link setting user interface, a link of the flexible type designated by the designation means between the reference partial region and the object partial region, a size of the reference partial region being different from a size of the object partial region; and layout control means for controlling the layout processing between the reference partial region and each of the object partial regions, or between the reference partial region and the object partial region, to be laid out on a page, wherein the layout control means changes:
(a) when the first mode is selected by the user interface, the size of the reference partial region and each size of the object partial regions connected to the reference partial region by the link set by the setting means so that the amount of change of the reference partial region and the amount of change of each of the object partial regions, which are generated based on the data to be assigned to the reference partial region each of the object partial regions, are equal, and
(b) when the second mode is selected by the link setting user interface, the size of the reference partial region and the size of the object partial region connected to the reference partial region by the link set by the setting means so that the amount of change of the reference partial region and the amount of change of the object partial region, which are generated based on the data to be assigned to the reference partial region and the object partial region, are equal.

6. The apparatus according to claim 5, wherein the layout control means flexibly controls (i) a length of the link in accordance with a change of a size of each of the partial regions when the first mode is selected by the link setting user interface, and (ii) a length of the link in accordance with a change of size of the object partial region when the second mode is selected by the link setting user interface.

7. The apparatus according to claim 5,
wherein the layout control means determines, when the first mode is selected by the link setting user interface, whether each layout position of the object partial regions, after change of the size, is located at a position on the page where the layout has a constraint, and if each layout position of the object partial regions is located at the position with the constraint, sets each size of the object partial regions again without causing violation of the constraint, and
wherein the layout control means determines, when the second mode is selected by the link setting user interface, whether a layout position of the object partial region, after change of size, is located at a position on the page where the layout has a constraint and if the layout position of the object partial region is located at the position with the constraint, the size of the object partial region is set again without causing violation of the constraint.

8. The apparatus according to claim 7,
wherein the layout control means, when the first mode is selected by the link setting user interface, fixes a side included in each of the object partial regions, whose size is set again, to inhibit movement of the side, and
wherein the layout control means, when the second mode is selected by the link setting user interface, fixes side included in the object partial region, whose size is set again, to inhibit movement of the side.

9. A computer-readable storage medium storing a layout control program which causes a computer to execute layout processing based on a template on which a plurality of partial regions are laid out and data which is assigned to the plurality of partial regions comprising:
an instruction module which instructs setting of a link indicating a distance between two partial regions;
a designation module which, as a type of the link to be set to connect the two partial regions, designates a flexible type for a link whose length indicates that the distance between the two partial regions is changed;
a link setting user interface module provides a link setting user interface for selecting one of two mode options, the two mode options being (i) a first mode to connect the link for a plurality of partial regions laid out in a vertical direction, in a horizontal direction, or in both horizontal and vertical directions, to a reference partial region selected from the plurality of partial regions, and (ii) a second mode to connect the link for a partial region laid out at a nearest position to the reference partial region;
a link creation user module which, when the first mode is selected by the link setting user interface, provides a link creation user module for choosing one of three setting direction modes, the three setting direction modes including a setting direction mode in the horizontal direction, a setting direction mode in the vertical direction, and a setting direction mode in both the horizontal and vertical directions;
a specifying module which specifies, when the first mode is selected by the link setting user interface, (i) at least two partial regions laid out in vertical direction to the reference partial region, (ii) at least two partial regions laid out in the horizontal direction to the reference partial region, or (iii) at least two partial regions laid out in both the vertical and horizontal directions to the reference partial region;
first deciding module which decides
(a) when the first mode is selected by the link setting user interface, (i) the plurality of partial regions laid out in the vertical direction to the reference partial region, as object partial regions, (ii) the plurality of partial regions laid out in the horizontal direction to the reference partial region, as object partial regions, or (iii) the plurality of partial regions laid out in both the vertical and horizontal directions to the reference partial region, as object partial regions; and
(b) when the second mode is selected by the link setting user interface, a partial region laid out at a nearest position to the reference partial region as an object partial region;
a setting module which sets:
(a) when the first mode is selected by the link setting user interface, a link of the flexible type designated by the designation module between the reference partial region and each of the object partial regions, a size of the reference partial region being different from a size of each of the object partial regions, and
(b) when the second mode is selected by the link setting user interface, a link of the flexible type a link of the flexible type designated by the designation module between the reference partial region and the object partial region, a size of the reference partial region being different from a size of the object partial region; and
a layout control module which controls the layout processing between the reference partial region and each of the object partial regions or between the reference partial region and the object partial region to be laid out on a page,
wherein the layout control module changes:
(a) when the first mode is selected by the link setting user interface, the size of the reference partial region and each size of the object partial regions connected to the reference partial region by the link set by the setting module so that the amount of change of the reference partial region and the amount of change of each of the object partial regions, which are generated based on the data to be assigned to the reference partial region and each of the object partial regions, are equal, and
(b) when the second mode is selected by the link setting user interface, the size of the reference partial region and the size of the object partial region connected to the reference partial region by the link set by the setting module, so that the amount of change of the reference partial region and the amount of change of the object partial region, which are generated based on the data to be assigned to the reference partial region and the object partial region, are equal.

10. The computer-readable storage medium according to claim 9, wherein the layout control module flexibly controls (i) a length of the link in accordance with a change of a size of each of the partial regions when the first mode is selected by the link setting user interface, and (ii) a length of the link in accordance with a change of size of the object partial region when the second mode is selected by link setting user interface.

11. The computer-readable storage medium according to claim 9,
wherein the layout control module determines, when the first mode is selected by the link setting user interface whether each layout position of the object partial regions, after change of the size, is located at a position on the page where the layout has a constraint, and if each layout position of the object partial regions is located at the position with the constraint, sets each size of the object partial regions again without causing violation of the constraint, and wherein the layout control module determines, when the second mode is selected by the link setting user interface, whether a layout position of the object partial region, after change of size, is located at a position on the page where the layout has a constraint, and if the layout position of the object partial region is located at the position with the constraint, the size of the object partial region is set again without causing violation of the constraint.

12. The computer-readable storage medium according to claim 11, wherein the layout control module, when the first mode is selected by the link setting user interface, fixes a side included in each of the partial regions whose size is set again, to inhibit movement of the side, and wherein the layout control module, when the second mode is selected by the link setting user interface, fixes a side included in the object partial region, whose size is set again, to inhibit movement of the side.

* * * * *